(12) United States Patent
Todo et al.

(10) Patent No.: US 8,755,410 B2
(45) Date of Patent: Jun. 17, 2014

(54) INFORMATION PROCESSING APPARATUS, INFORMATION PROCESSING METHOD, AND PROGRAM

(75) Inventors: Shin Todo, Toyko (JP); Motomu Ueta, Kanagawa (JP); Jun Onuki, Kanagawa (JP); Masaki Nishikawa, Kanagawa (JP); Masafumi Kurashige, Kanagawa (JP); Junichi Ogikubo, Kanagawa (JP)

(73) Assignee: Sony Corporation, Tokyo (JP)

( * ) Notice: Subject to any disclaimer, the term of this patent is extended or adjusted under 35 U.S.C. 154(b) by 404 days.

(21) Appl. No.: 12/986,367

(22) Filed: Jan. 7, 2011

(65) Prior Publication Data

US 2011/0170003 A1 Jul. 14, 2011

(30) Foreign Application Priority Data

Jan. 14, 2010 (JP) .............................. P2010-006135
Jan. 14, 2010 (JP) .............................. P2010-006136

(51) Int. Cl.
*H04N 7/04* (2006.01)

(52) U.S. Cl.
USPC .......................................... 370/493; 348/484

(58) Field of Classification Search
None
See application file for complete search history.

(56) References Cited

U.S. PATENT DOCUMENTS

| | | | | |
|---|---|---|---|---|
| 4,468,710 A | * | 8/1984 | Hashimoto et al. | 386/264 |
| 5,610,659 A | * | 3/1997 | Maturi et al. | 375/240.24 |
| 7,003,790 B1 | * | 2/2006 | Inoue et al. | 725/10 |
| 7,129,991 B2 | * | 10/2006 | Ejima et al. | 348/482 |
| 7,313,031 B2 | | 12/2007 | Shiga | |
| 8,289,445 B2 | * | 10/2012 | Yamashita | 348/441 |
| 2003/0031248 A1 | * | 2/2003 | Yurt et al. | 375/240.01 |
| 2005/0198686 A1 | * | 9/2005 | Krause et al. | 725/118 |
| 2008/0056680 A1 | * | 3/2008 | Saeki | 386/109 |
| 2009/0073320 A1 | * | 3/2009 | Todo et al. | 348/705 |

FOREIGN PATENT DOCUMENTS

| | | |
|---|---|---|
| JP | 2006 236056 | 9/2006 |
| JP | 2009 71701 | 4/2009 |

\* cited by examiner

*Primary Examiner* — Gregory Sefcheck
*Assistant Examiner* — Steve Young
(74) *Attorney, Agent, or Firm* — Frommer Lawrence & Haug LLP; William S. Frommer; Ellen Marcie Emas

(57) ABSTRACT

An information processing apparatus includes the following elements. A generation unit generates a multiplexed video frame having a predetermined screen size. A dividing unit divides input audio data into audio data items each having samples for one frame period of the multiplexed video frame. A multiplexing unit multiplexes audio data items obtained by dividing each stream of input audio data and number-of-samples information representing the number of samples thereof. A processing unit processes audio data items multiplexed in a multiplexed video frame input from an input video port, and outputs from an output video port thereof a multiplexed video frame in which the resulting audio data items and the number-of-samples information thereof are multiplexed. An extraction unit extracts the audio data items multiplexed in the multiplexed video frame output from the processing unit in accordance with the number-of-samples information. A transmission unit outputs the extracted audio data items to outside.

15 Claims, 42 Drawing Sheets

INFORMATION PROCESSING APPARATUS, INFORMATION PROCESSING METHOD, AND PROGRAM

BACKGROUND OF THE INVENTION

1. Field of the Invention

The present invention relates to an information processing apparatus, an information processing method, and a program. More specifically, the present invention relates to an information processing apparatus, an information processing method, and a program which allow efficient input of audio data to a processor and efficient output of audio data from a processor using a video port.

2. Description of the Related Art

Video Interfaces

One-way transmission schemes with which timing signals, such as clocks, horizontal synchronization signals, and vertical Synchronization signals, and image data are transmitted are called "video interfaces". Society of Motion Picture and Television Engineers (SMPTE) 125M and SMPTE 274M are typical examples of video interfaces.

Other examples of video interfaces include schemes in which data enable signals are added, such as Digital Video Interactive (DVI)/Video Electronics Standard Association (VESA), schemes in which video data is serialized, such as High-Definition Multimedia Interface (HDMI), and schemes in which timing information is further multiplexed into a data line, such as SMPTE 259M and SMPTE 292M.

Hereinafter, a signal set transmitted via a video interface is referred to as a "video signal", and a set of input pins and output pins of a video interface is referred to as a "video port", as appropriate.

Video Port Bandwidth

Video ports provide wide bandwidth and effective speed with stability. For example, a 24-bit HD (1920×1080 at 30 frames per second (fps)) video port ensures stable data transfer with a rate of 1920×1080×30 pixels per second=186 megabytes per second (MB/s).

The recent rapid increase of video port bandwidth is due to the improvement of display resolution, switching of broadcast quality from standard definition (SD) (720×480) to high definition (HD) (1920×1080), diversity of the display performance of displays (480i/480p/1080i/720p/1080p), and other reasons. In the present situation, the HD (1920×1080 at 30 fps) and wide ultra extended graphics array (WUXGA) (1920×1200 at 60 fps) bandwidths have become generally available.

Multi-Channel Video and Audio

Recent audio visual devices can handle multiple video/audio signals.

For example, home digital recorders can handle data of the output system, which includes:

Output of video without a menu or guide (video output)
Output of video with a menu or guide (monitor output)
Output of video obtained by decoding a bit stream from an antenna (decoder output)

Further, there is a demand for professional devices for use in processing of video, in many cases, capable of handling and also outputting data of the output system, which includes:

Output of standard video (program output, video output)
Output of superimposed video (monitor output)
Video of a scene several seconds ago (preview output)
Screens to be displayed on external displays
Display on device displays In particular, data handled in professional devices for use in processing of video may contain data of various display sizes, various frame frequencies (refresh rates), such as SD/HD, 4:2:2/4:4:4, RGB/YCbCr, interlaced or progressive.

There is also a demand for an input system capable of simultaneously inputting multiple video streams to a processor, such as simultaneously inputting and simultaneously recording asynchronous video signals in different formats, switching the video signals while simultaneously inputting them, or processing or modifying the video signals and combining resulting signals when switching them. The number of channels of audio attached to video has also significantly increased, such as 5.1 ch, 7.1 ch, 9.1 ch, and multiple languages across multiple channels.

Accordingly, it is requested that a processor of an audio visual device be capable of simultaneously inputting or outputting a plurality of video streams and a plurality of audio streams.

Japanese Unexamined Patent Application Publications No. 2006-236056 and No. 2009-71701 are examples of related art.

SUMMARY OF THE INVENTION

Video and Audio Input/Output Port of General Processor

Before several years ago, it had been well established that signal lines of address signals and control signals and bidirectional data lines, or signal lines of control signals and bidirectional address/data multiplexed lines were used as input/output lines of central processing units (CPUs), digital signal processors (DSPs), or the like. The provision of video interface input/output ports had been less common.

Audio-specific DSPs provided with audio input/output ports have been available, and non-audio-specific DSPs provided with audio input/output ports are becoming increasingly available. With the recent improvement of the performance of processors and the development of system-on-a-chip (SoC) design based on use, processors including video interface input/output ports, such as media processors, graphics processing units (GPUs), and video application specific DSPs, have become increasingly available.

The input of a plurality of video streams, as described above, via serial transmission is attained in a band ranging from several hundreds of MHz to several GHz. However, it may not be practical to input such a broadband signal to a general-purpose processor. Parallel input involves several tens of signal lines per port.

Serial transmission of audio may be practical, but involves three signal lines per port (generally, two channels). For both video and audio, the number of pins to be provided for a processor increases in proportion to the increase in the number of channels.

Thus, even in a processor including a video and audio input/output port, generally, one input port and one output port may be provided for video, and up to one or two multichannel input/output ports may be provided for audio.

In order to cause a processor to process a plurality of video streams and a plurality of audio streams as described above, such a small number of input/output ports are used to efficiently input and output data.

It is therefore desirable to provide efficient input of audio data to a processor and efficient output of audio data from the processor using a video port.

Furthermore, particularly in professional devices, it is preferable that the input and output of a plurality of video streams and a plurality of audio streams, as described above, be performed with a reduced delay. The delay includes, for example, an input delay represented by the difference between the time at which data is input to a device and the time at which the data is input to a processor.

It is therefore desirable to reduce the data delay caused by, for example, multiplexing a plurality of streams of input data so as to be simultaneously input to a processor from a video port.

According to an embodiment of the present invention, an information processing apparatus includes the following elements. Generating means generates a multiplexed video frame that is a video frame having a predetermined screen size. Dividing means divides input audio data into audio data items, each having samples input during a period of time corresponding to a period of one frame of the multiplexed video frame, in order, starting from a top sample of the audio data. Multiplexing means multiplexes, as data of the multiplexed video frame, a plurality of audio data items and number-of-samples information representing the number of samples included in the audio data items, the audio data items being obtained by division from audio data that is input as each of a plurality of streams of data. Processing means performs processing on the audio data items obtained by division, which are multiplexed in a multiplexed video frame obtained after multiplexing, the multiplexed video frame obtained after multiplexing being input to the processing means from an input video port thereof, and outputs from an output video port thereof a multiplexed video frame in which the audio data items obtained by division, on which processing has been performed, and the number-of-samples information are multiplexed. Extracting means extracts each stream of audio data items obtained by division, which is multiplexed in the multiplexed video frame output from the processing means, in accordance with the number-of-samples information. Transmitting means outputs the extracted streams of audio data items obtained by division to outside in order, starting from a top sample of the audio data items.

The dividing means may be provided in a number equal to the number of streams of audio data to be input, and the transmitting means may be provided in a number equal to the number of streams of audio data to be input. Each of the dividing means and each of the transmitting means may perform processing on one stream of audio data.

The multiplexing means may be configured to multiplex, as data at a predetermined position for each stream, a plurality of audio data items obtained by division and number-of-samples information associated therewith.

The extracting means may be configured to extract each stream of audio data items obtained by division by extracting samples, the number of which is represented by the number-of-samples information multiplexed as the data at the predetermined position.

The multiplexed video frame may be configured to have a screen size that is greater than or equal to a sum of screen sizes of frame images of a plurality of video data items having different formats, the screen sizes being defined by the formats of the plurality of video data items, the frame images being configured to be attached so as not to overlap each other.

The multiplexing means may be configured to further multiplex the plurality of video data items by attaching the frame images of the plurality of video data items to the multiplexed video frame so as not to overlap each other with the screen sizes defined by the formats being maintained.

According to another embodiment of the present invention, an information processing method includes the steps of generating a multiplexed video frame that is a video frame having a predetermined screen size; dividing input audio data into audio data items, each having samples input during a period of time corresponding to a period of one frame of the multiplexed video frame, in order, starting from a top sample of the audio data; multiplexing, as data of the multiplexed video frame, a plurality of audio data items and number-of-samples information representing the number of samples included in the audio data items, the audio data items being obtained by division from audio data that is input as each of a plurality of streams of data; performing, by processing means, processing on the audio data items obtained by division, which are multiplexed in a multiplexed video frame obtained after multiplexing, the multiplexed video frame obtained after multiplexing being input to the processing means from an input video port thereof, and outputting from an output video port of the processing means a multiplexed video frame in which the audio data items obtained by division, on which processing has been performed, and the number-of-samples information are multiplexed; extracting each stream of audio data items obtained by division, which is multiplexed in the multiplexed video frame output from the processing means, in accordance with the number-of-samples information; and outputting the extracted streams of audio data items obtained by division to outside in order, starting from a top sample of the audio data items.

According to another embodiment of the present invention, a program causes a computer to execute a process including the steps of generating a multiplexed video frame that is a video frame having a predetermined screen size; dividing input audio data into audio data items, each having samples input during a period of time corresponding to a period of one frame of the multiplexed video frame, in order, starting from a top sample of the audio data; multiplexing, as data of the multiplexed video frame, a plurality of audio data items and number-of-samples information representing the number of samples included in the audio data items, the audio data items being obtained by division from audio data that is input as each of a plurality of streams of data; performing, by processing means, processing on the audio data items obtained by division, which are multiplexed in a multiplexed video frame obtained after multiplexing, the multiplexed video frame obtained after multiplexing being input to the processing means from an input video port thereof, and outputting from an output video port of the processing means a multiplexed video frame in which the audio data items obtained by division, on which processing has been performed, and the number-of-samples information are multiplexed; extracting each stream of audio data items obtained by division, which is multiplexed in the multiplexed video frame output from the processing means, in accordance with the number-of-samples information; and outputting the extracted streams of audio data items obtained by division to outside in order, starting from a top sample of the audio data items.

In an embodiment of the present invention, a multiplexed video frame that is a video frame having a predetermined screen size is generated, and input audio data is divided into audio data items, each having samples input during a period of time corresponding to a period of one frame of the multiplexed video frame, in order, starting from a top sample of the audio data. Further, a plurality of audio data items that is obtained by division from audio data that is input as each of a plurality of streams of data, and number-of-samples information representing the number of samples included in the audio data items are multiplexed as data of the multiplexed video frame. Processing means performs processing on the audio data items obtained by division, which are multiplexed in a multiplexed video frame obtained after multiplexing, the multiplexed video frame obtained after multiplexing being input to the processing means from an input video port thereof, and outputs from an output video port thereof a multiplexed video frame in which the audio data items obtained by division, on which processing has been performed, and the number-of-samples information are multiplexed. Further, each stream of audio data items obtained by division, which is multiplexed in the multiplexed video frame output from the processing means, is extracted in accordance with the number-of-samples information. The extracted streams of audio data items obtained by division is output to outside in order, starting from a top sample of the audio data items.

According to an embodiment of the present invention, the input of audio data to a processor and the output of audio data from the processor can be efficiently using a video port.

According to another embodiment of the present invention, the data delay caused by multiplexing a plurality of streams of input data so as to be simultaneously input to a processor from a video port can be reduced.

DESCRIPTION OF THE PREFERRED EMBODIMENTS

Overall Configuration of Information Processing Apparatus

Figure 1:
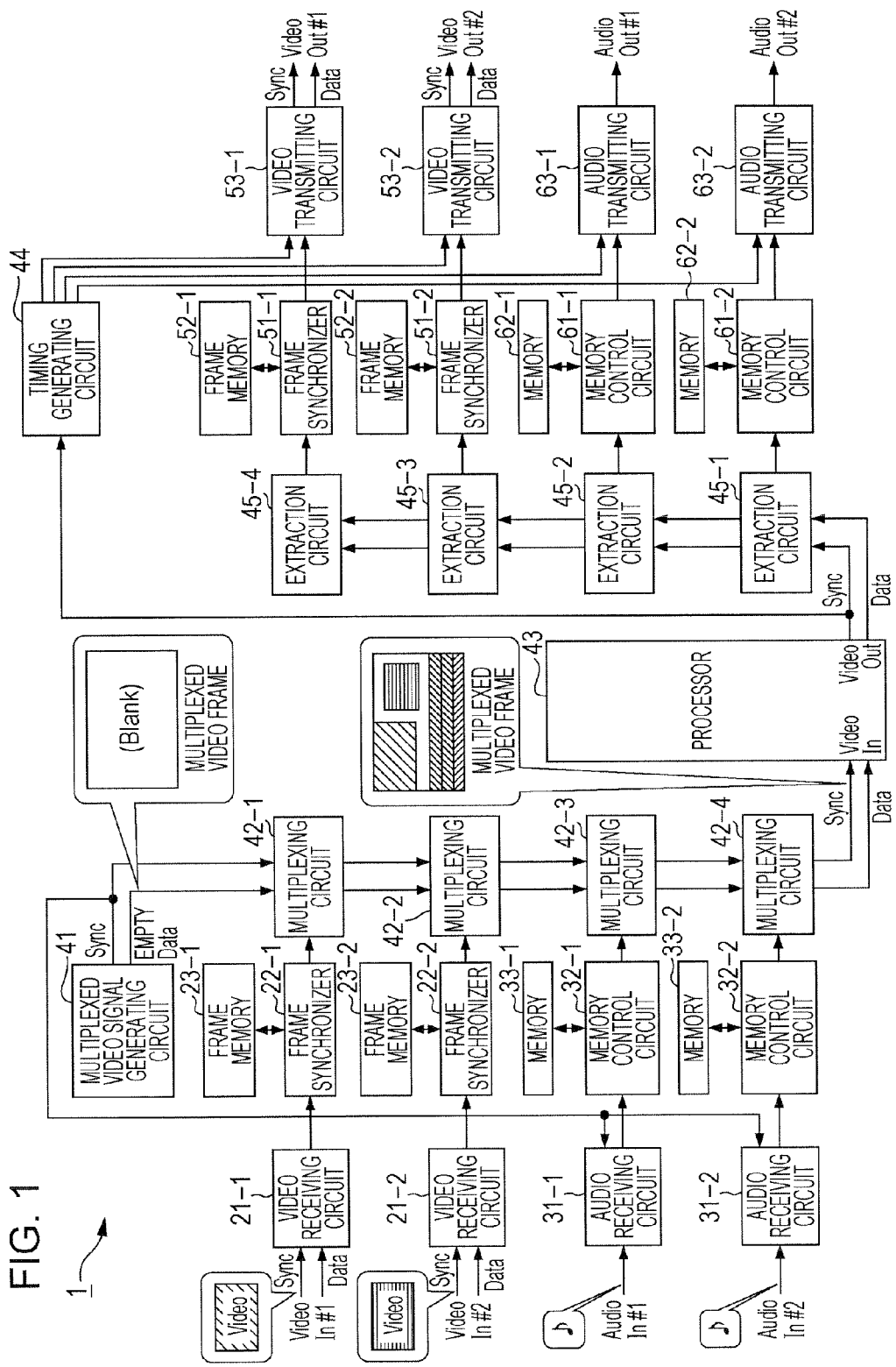
FIG. 1 is a block diagram illustrating an example configuration of an information processing apparatus according to an embodiment of the present invention.

FIG. 1 is a block diagram illustrating an example configuration of an information processing apparatus 1 according to an embodiment of the present invention.

The information processing apparatus 1 may be a device configured to perform processing on two streams of video data and audio data input using a processor 43 having a one-input and one-output video port and to output two streams of video data and audio data.

A video signal of a video stream #1 supplied from the outside is input to a video receiving circuit 21-1 together with a synchronization signal, and a video signal of a video stream #2 is input to a video receiving circuit 21-2 together with a synchronization signal.

The video streams #1 and #2 may have the same format or different formats, such as resolution, frame rate, scanning scheme, transmission scheme, and compression scheme. The input timings of frames of the video streams #1 and #2 may not necessarily be synchronous with each other.

An audio signal of an audio stream #1 supplied from the outside is input to an audio receiving circuit 31-1, and an audio signal of an audio stream #2 is input to an audio receiving circuit 31-2. Audio signals may be input to the audio receiving circuits 31-1 and 31-2 in the form of, for example, three-line audio having a clock signal, a data signal, and a signal representing a sampling frequency.

The audio streams #1 and #2 may also have the same format or different formats, such as sampling frequency, the number of bits, and the number of channels. Also, the input timings of the audio streams #1 and #2 may not be necessarily be synchronous with each other. The audio may be attached to or may be independent from the video.

The video receiving circuit 21-1 includes a cable equalizer, a deserializer, various decoders, a 4:2:2/4:4:4 decoder, an analog/digital (A/D) converter, and any other suitable device. The video receiving circuit 21-1 performs various processing, such as A/D conversion, on the input video signal, and generates data of the frames of the video signal of the video stream #1. The video receiving circuit 21-1 outputs the generated data of the frames to a frame synchronizer 22-1.

The frame synchronizer 22-1 synchronizes the timing of frames between the streams of video, and causes data of one frame supplied from the video receiving circuit 21-1 to be stored in a frame memory 23-1. In accordance with a request from a multiplexing circuit 42-1, the frame synchronizer 22-1 reads frame data from the frame memory 23-1, and outputs the frame data.

In terms of implementation, if clocks having different frequencies are used as the operating clocks of the video receiving circuit 21-1, the frame synchronizer 22-1, and the multiplexing circuit 42-1, a first-in-first-out (FIFO) such as a dual-port random access memory (RAM) is provided between the video receiving circuit 21-1 and the frame synchronizer 22-1 and between the frame synchronizer 22-1 and the multiplexing circuit 42-1. Data passing through the FIFOs can be reliably transmitted and received. In addition, the data rate bias during memory access can also be reduced.

A FIFO is also provided as appropriate between the video receiving circuit 21-2 and a frame synchronizer 22-2 and between the frame synchronizer 22-2 and a multiplexing circuit 42-2. Also in a configuration for processing audio data, a FIFO is provided as appropriate between the audio receiving circuit 31-1 and a memory control circuit 32-1, between the memory control circuit 32-1 and a multiplexing circuit 42-3, between the audio receiving circuit 31-2 and a memory control circuit 32-2, and between the memory control circuit 32-2 and a multiplexing circuit 42-4.

Here, it is not guaranteed that the frame frequency of the input video signal of the video stream #1 and the frame frequency of a multiplexed video signal described below match. The frame synchronizer 22-1 absorbs the difference between the frame frequencies by redundantly supplying the video data stored in the frame memory 23-1 (continuously supplying data of the same frame) to the multiplexing circuit 42-1 or by skipping reading of data. Matching between the frame frequency of the video signal of the video stream #1 and the frame frequency of the multiplexed video signal is described in Japanese Unexamined Patent Application Publication No. 2009-71701.

Similarly to the video receiving circuit 21-1, the video receiving circuit 21-2 performs various processing on the input video signal, and generates data of the frames of the video stream #2. The video receiving circuit 21-2 outputs the generated data of the frames to the frame synchronizer 22-2.

Similarly to the frame synchronizer 22-1, the frame synchronizer 22-2 synchronizes the timing of frames between the individual streams of video signals, and causes the frame data supplied from the video receiving circuit 21-2 to be stored in the frame memory 23-2. In accordance with a request from the multiplexing circuit 42-2, the frame synchronizer 22-2 reads the frame data from the frame memory 23-2, and outputs the frame data. The frame synchronizer 22-2 also redundantly reads the frame data stored in the frame memory 23-2 or skips reading, as necessary.

The audio receiving circuit 31-1 performs various processing, such as A/D conversion, sampling rate conversion, and serial/parallel (S/P) conversion, on the input audio signal, and generates audio data of the audio stream #1. The generated audio data is composed of a time sequence of audio samples.

The audio receiving circuit 31-1 divides (cuts out) the audio data of the audio stream #1 into audio data items each having samples input during a period of time corresponding to one frame period of the multiplexed video frame. The audio receiving circuit 31-1 further outputs each of the resulting audio data items to the memory control circuit 32-1, together with number-of-samples information that is information indicating the number of audio samples thereof. A synchronization signal indicating one frame period of the multiplexed video frame is supplied to the audio receiving circuit 31-1 from a multiplexed video signal generating circuit 41. The multiplexed video frame will be described below.

Figure 2:
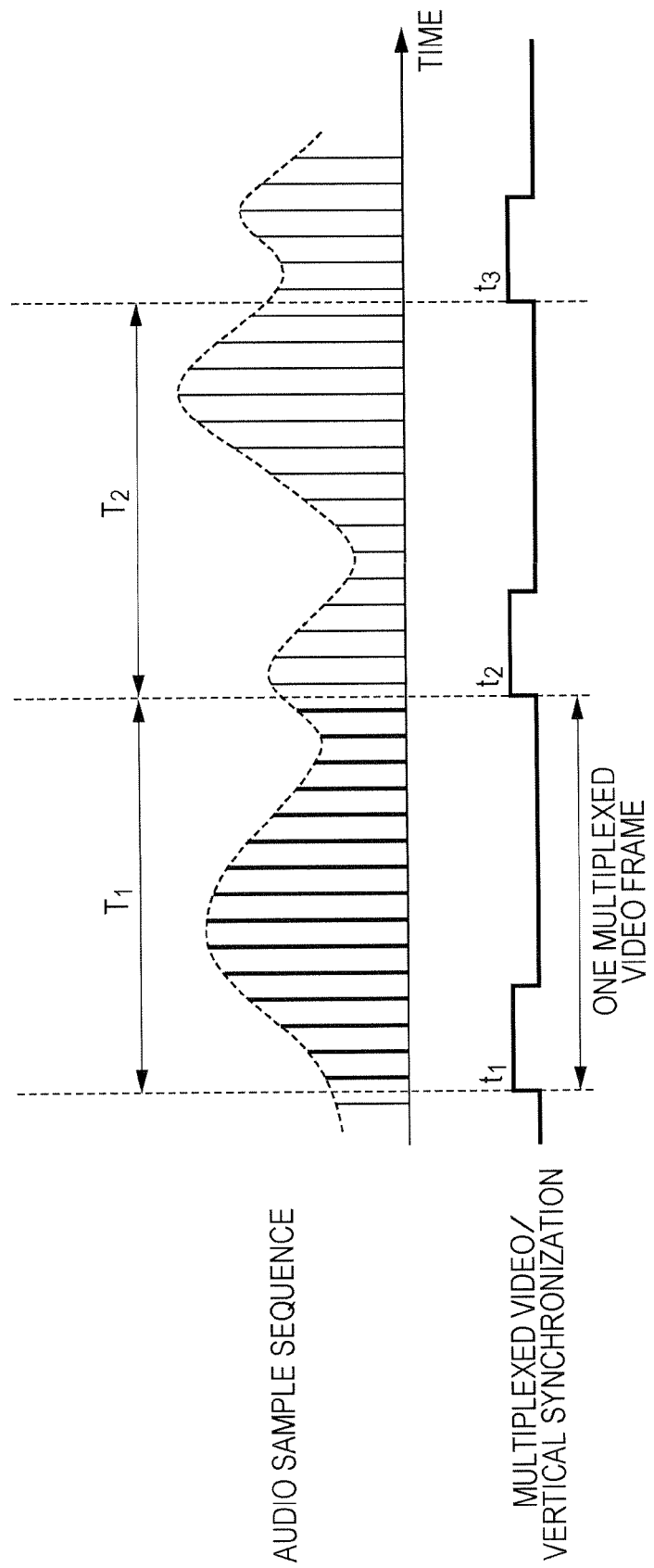
FIG. 2 is a diagram illustrating an example of audio samples that are cut out.

FIG. 2 is a diagram illustrating an example of audio samples that are cut out.

In FIG. 2, the abscissa represents time, and solid lines on the time axis represent audio samples. In the example of FIG. 2, a synchronization signal (vertical synchronization signal) supplied from the multiplexed video signal generating circuit 41 defines that each of a period of time $T_1$, which is the period of time from time $t_1$ to time $t_2$, and a period of time $T_2$, which is the period of time from time $t_2$ to time $t_3$, is one frame period of the multiplexed video frame.

The audio receiving circuit 31-1 counts the number of audio samples input during the period of time $T_1$, and cuts out the audio samples input during the period of time $T_1$ at the timing of time $t_2$. The audio receiving circuit 31-1 outputs the data of the cut out audio samples, as data to be multiplexed into a multiplexed video frame output from the multiplexed video signal generating circuit 41 during the period of time $T_1$, to the memory control circuit 32-1 together with the number-of-samples information.

Similarly, the audio receiving circuit 31-1 cuts out the audio samples input during the period of time $T_2$, and outputs the data of the cut out audio samples, as data to be multiplexed into a multiplexed video frame output from the multiplexed video signal generating circuit 41 during the period of time $T_2$, together with the number-of-samples information.

The processing for the audio data is different from that for the video data in that the frame synchronizer function is not used. In principle, no redundancy or missing of audio data is allowed. Therefore, in the audio receiving circuit 31-1, based on the synchronization signal of the multiplexed video frame, audio samples input during one frame period are cutout as they are as audio data to be multiplexed into one multiplexed video frame.

If the sampling frequency of the audio data is not an integer multiple of the frame frequency of the multiplexed video frame, variation may occur in the number of audio samples input to the audio receiving circuit 31-1 during one frame period. The number-of-samples information is also multiplexed into the multiplexed video frame, thereby enabling the processor 43 or the like, which has received the multiplexed video frame, to determine the number of audio samples that has been multiplexed in the multiplexed video frame.

Referring back to FIG. 1, the memory control circuit 32-1 causes the audio data and the number-of-samples information supplied from the audio receiving circuit 31-1 to be stored in the memory 33-1. In accordance with a request from the multiplexing circuit 42-3, the memory control circuit 32-1 reads the audio data and the number-of-samples information from the memory 33-1, and outputs the audio data and the number-of-samples information.

Similarly to the audio receiving circuit 31-1, the audio receiving circuit 31-2 performs various processing on the input audio signal, and generates the audio data of the audio stream #2. The audio receiving circuit 31-2 divides the audio data of the audio stream #2 into audio data items each having samples input during a period of time corresponding to one frame period of the multiplexed video frame, and outputs each of the resulting audio data items to the memory control circuit 32-2 together with number-of-samples information.

The memory control circuit 32-2 causes the audio data and the number-of-samples information supplied from the audio receiving circuit 31-2 to be stored in the memory 33-2. In accordance with a request from the multiplexing circuit 42-4, the memory control circuit 32-2 reads the audio data and the number-of-samples information from the memory 33-2, and outputs the audio data and the number-of-samples information.

The multiplexed video signal generating circuit 41 may be a frequency multiplier having an oscillator and a phase locked loop (PLL). The multiplexed video signal generating circuit 41 generates a video frame to be input to the processor 43 or output from the processor 43, in which the individual streams of video data and audio data are multiplexed. The video frame generated by the multiplexed video signal generating circuit 41 may be a frame having a maximum size (number of pixels) that is allowed within a range in which, for example, the bandwidth used for transmission does not exceed the bandwidth of the video port of the processor 43.

Hereinafter, a video frame used for multiplexing data to be input to the processor 43, such as video data and audio data, is referred to as a "multiplexed video frame". Further, the signal of the multiplexed video frame is referred to as the "multiplexed video signal".

Figure 3:
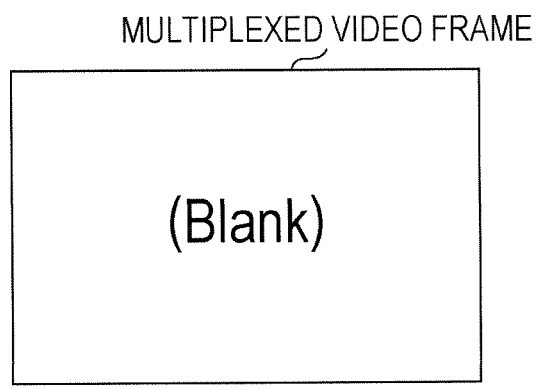
FIG. 3 is a diagram illustrating an example of a multiplexed video frame.

FIG. 3 is a diagram illustrating an example of a multiplexed video frame.

As illustrated in FIG. 3, a multiplexed video frame generated by the multiplexed video signal generating circuit 41 may be a blank image in which no video data or audio data is multiplexed.

The size of the multiplexed video frame is larger than the sum of the frame size of video of the individual streams and the size of audio data of audio of the individual streams that is input during one frame period of the multiplexed video frame. It is possible to attach the frames of video of the individual streams to the multiplexed video frame so as not to overlap each other. It is also possible to insert audio data of audio of the individual streams that is input during one frame period of the multiplexed video frame.

The multiplexed video signal generating circuit 41 outputs data and a synchronization signal of the multiplexed video frame to the multiplexing circuit 42-1. The synchronization signal of the multiplexed video frame is supplied to each circuit provided after the multiplexing circuit 42-1, together with the data of the multiplexed video frame. The synchronization signal output from the multiplexed video signal generating circuit 41 is also supplied to the audio receiving circuits 31-1 and 31-2.

The multiplexing circuit 42-1 attaches a frame of the video stream #1 whose data has been supplied from the frame synchronizer 22-1 in accordance with a request to the multiplexed video frame supplied from the multiplexed video signal generating circuit 41. The multiplexing circuit 42-1 outputs the data of the multiplexed video frame in which the frame of the video stream #1 has been attached to the multiplexing circuit 42-2.

The multiplexing circuit 42-2 attaches a frame of the video stream #2 whose data has been supplied from the frame synchronizer 22-2 in accordance with a request to the multiplexed video frame supplied from the multiplexing circuit 42-1. One frame of the video stream #2 is attached at a position that does not overlap the frame of the video stream #1. The multiplexing circuit 42-2 outputs the data of the multiplexed video frame in which the frame of the video stream #2 has been attached to the multiplexing circuit 42-3.

The data of the multiplexed video frame output from the multiplexing circuit 42-2 is data in which the data of one frame of the video stream #1 and the data of one frame of the video stream #2 have been multiplexed.

The multiplexing circuit 42-3 inserts the audio data of the audio stream #1 and the number-of-samples information supplied from the memory control circuit 32-1 in accordance with a request into the multiplexed video frame supplied from the multiplexing circuit 42-2. The multiplexing circuit 42-3 outputs the data of the multiplexed video frame in which the audio data of the audio stream #1 and the number-of-samples information have been inserted to the multiplexing circuit 42-4.

The multiplexing circuit 42-4 inserts the audio data of the audio stream #2 and the number-of-samples information supplied from the memory control circuit 32-2 in accordance with a request into the multiplexed video frame supplied from the multiplexing circuit 42-3. The multiplexing circuit 42-4 outputs the data of the multiplexed video frame in which the audio data of the audio stream #2 and the number-of-samples information have been inserted to the processor 43. The input to the processor 43 is one stream of video data.

Figure 4:
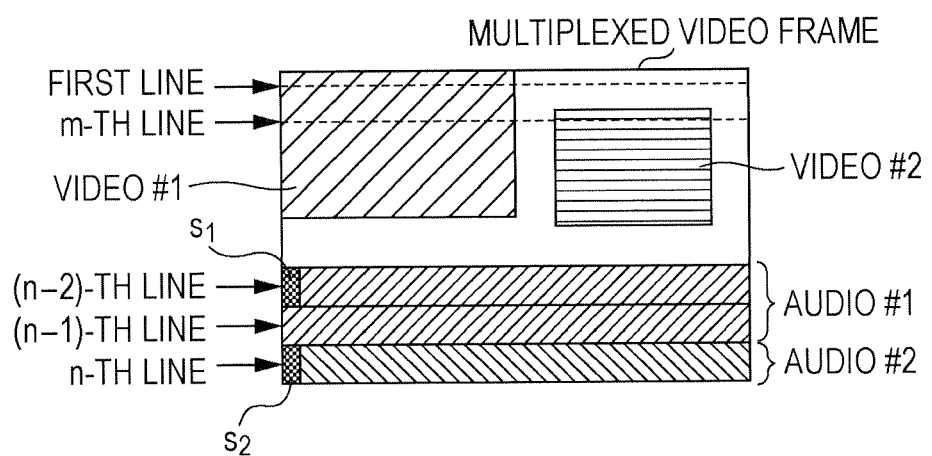
FIG. 4 is a diagram illustrating an example of a multiplexed video frame obtained after multiplexing.

FIG. 4 is a diagram illustrating an example of a multiplexed video frame obtained after multiplexing.

A multiplexed video frame input to the processor 43 is an image in which one frame of the video stream #1 and one frame of the video stream #2 have been attached and in which the audio data of the audio streams #1 and #2 that is input during one frame period of the multiplexed video frame are inserted. In the following description, pixels arranged in a horizontal line are represented by a line, as necessary.

In the example of FIG. 4, the frame of the video stream #1 is attached in such a manner that the upper left corner of the frame coincides with the upper left end of an effective image frame of the multiplexed video frame. The first line of the frame of the video stream #1 matches the first line of the multiplexed video frame.

Further, the frame of the video stream #2 is attached so as not to overlap the frame of the video stream #1 in such a manner that the first line of the frame of the video stream #2 coincides with the m-th line of the multiplexed video frame.

Further, the audio data of the audio stream #1 is inserted into the (n−2)-th line and the next line, namely, the (n−1)-th line, of the multiplexed video frame, and the audio data of the audio stream #2 is inserted into the bottom line, namely, the n-th line, of the multiplexed video frame.

For example, as illustrated in FIG. 4, number-of-samples information $s_1$ indicating the number of audio samples of the audio stream #1 inserted in the multiplexed video frame is inserted at the beginning of the (n−2)-th line which is the beginning of the line allocated to the audio stream #1.

Further, for example, number-of-samples information $s_2$ indicating the number of audio samples of the audio stream #2 is inserted at the beginning of the n-th line which is the beginning of the line allocated to the audio stream #2.

Information regarding the multiplexing positions of the individual data items is set in advance in the multiplexing circuits 42-1 to 42-4, the processor 43, and the extraction circuits 45-1 to 45-4. The information regarding the multiplexing positions includes information indicating what data and where that data is attached to the multiplexed video frame, such as the horizontal position, vertical position, lateral size, longitudinal size, and line interval.

Figure 5:
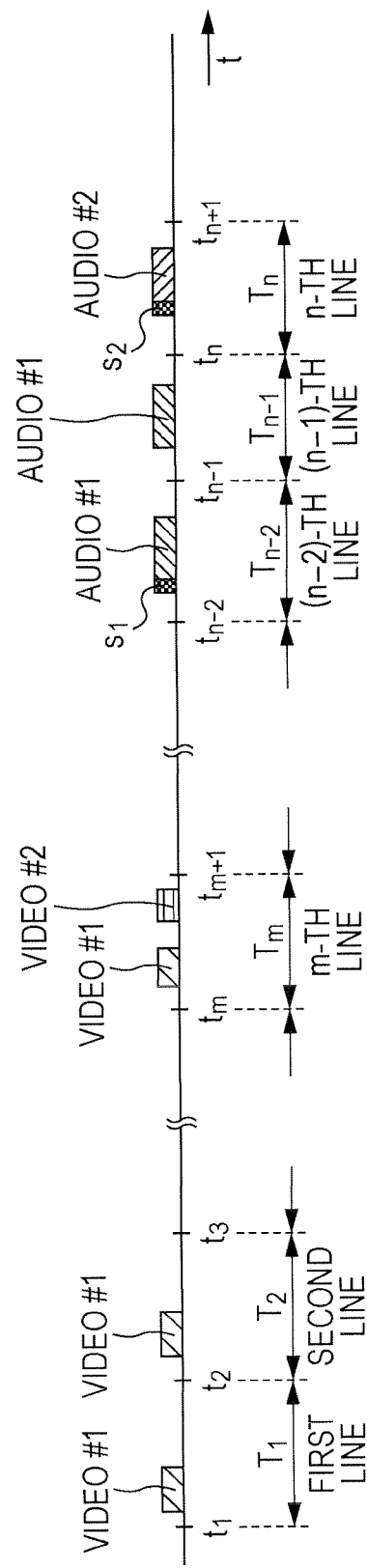
FIG. 5 is a diagram illustrating an example of video signals of the multiplexed video frame.

FIG. 5 is a diagram illustrating an example of video signals of a multiplexed video frame in which individual data items are attached in the manner illustrated in FIG. 4.

As illustrated in FIG. 5, the multiplexed video signal is composed of, when plotted on the time axis, signals for the respective periods for which the data of the lines ranging from the first line to the n-th line of the multiplexed video frame is transmitted.

In the example of FIG. 5, a period $T_1$, which is the period from time $t_1$ to time $t_2$, is a period for which the data of the first line of the multiplexed video frame is transmitted, and a period $T_2$, which is the period from time $t_2$ to time $t_3$, is a period for which the data of the second line of the multiplexed video frame is transmitted.

Further, a period $T_m$, which is the period from time $t_m$ to time $t_{m+1}$, is a period for which the data of the m-th line of the multiplexed video frame is transmitted, and a period $T_{n-2}$, which is the period from time $t_{n-2}$ to time $t_{n-1}$, is a period for which the data of the (n−2)-th line of the multiplexed video frame is transmitted. A period which is the period from time $t_{n-1}$ to time $t_n$, is a period for which the data of the (n−1)-th line of the multiplexed video frame is transmitted, and a period $T_n$, which is the period from time $t_n$ to time $t_{n+1}$, is a period for which the data of the n-th line of the multiplexed video frame is transmitted.

If the individual data items are attached in the manner illustrated in FIG. 4, the signal of the first line of the frame of the video stream #1 is inserted in the period $T_1$ of the multiplexed video signal. Further, the signal of the second line of the frame of the video stream #1 is inserted in the period $T_2$ of the multiplexed video signal.

Further, the signal of the m-th line of the frame of the video stream #1 and the signal of the first line of the frame of the video stream #2 are inserted in the first half and the second half of the period $T_m$ of the multiplexed video frame, respectively, with a predetermined interval therebetween.

The number-of-samples information $s_1$ is inserted at the beginning of the period $T_{n-2}$ of the multiplexed video frame. In the periods $T_{n-2}$ and $T_{n-1}$, subsequently to the number-of-samples information $s_1$, the signal of the audio samples of the audio stream #1, the number of which is indicated by the number-of-samples information $s_1$, is inserted.

The number-of-samples information $s_2$ is inserted at the beginning of the period $T_n$ of the multiplexed video frame, and, subsequently to the audio number-of-samples information $s_2$, the signals of the audio samples of the audio stream #2, the number of which is indicated by the number-of-samples information $s_2$, is inserted.

In this manner, the multiplexing of data to be input to the processor 43 is implemented by inserting the signal of the data to be input into a period, which corresponds to the attachment position in the multiplexed video frame, among all the periods of the multiplexed video signal.

Referring back to FIG. 1, the processor 43 extracts each stream of video data and each stream of audio data, which have been multiplexed in the data of the multiplexed video frame input to the video port (Video In), and performs predetermined processing on the extracted data. The processor 43 may be an arithmetic unit such as a CPU, a GPU, a DSP, or a SoC device.

For example, the extraction of video data is performed in a manner similar to that of the extraction performed by extraction circuits 45-3 and 45-4 described below, and the extraction of audio data is performed in a manner similar to that of the extraction performed by extraction circuits 45-1 and 45-2.

The processor 43 further attaches the frames of video and the samples of audio of the individual streams on which the processing has been performed to the multiplexed video frame, and multiplexes these data items.

The multiplexing positions of the individual video data items and audio data items in the multiplexed video frame output from the processor 43 may be different from multiplexing positions in the multiplexed video frame input to the processor 43. In addition, the processing may be performed on the entire multiplexed video frame rather than on the individual streams of video data and the individual streams of audio data.

The processor 43 outputs the multiplexed video frame in which the data items obtained after processing have been multiplex from the video port (Video Out). The output from the processor 43 is also one stream of video data. The data of the multiplexed video frame output from the processor 43 is supplied to the extraction circuit 45-1 together with the synchronization signal. The synchronization signal output from the processor 43 is also supplied to a timing generating circuit 44.

The timing generating circuit 44 generates a synchronization signal, based on which the output timing of the frames of video and audio samples of the individual streams is determined, in accordance with the synchronization signal supplied from the processor 43 or the format of video and audio of the individual streams. For example, the data of one frame of the video stream #1 and the data of one frame of the video stream #2 are synchronized and output at the same timing.

In the timing generating circuit 44, information regarding the format of video of the individual streams, such as frame frequency, and information regarding the format of audio of the individual streams, such as sampling frequency, are set in advance.

The timing generating circuit 44 outputs the synchronization signal for the video stream #1 to the video transmitting circuit 53-1, and outputs the synchronization signal for the video stream #2 to the video transmitting circuit 53-2. The timing generating circuit 44 further outputs the synchronization signal for the audio stream #1 to the audio transmitting circuit 63-1, and outputs the synchronization signal for the audio stream #2 to the audio transmitting circuit 63-2.

The extraction circuit 45-1 extracts the audio data of the audio stream #2 from the data of the multiplexed video frame supplied from the processor 43.

As described with reference to FIG. 4, the multiplexing position of the audio data of the audio stream #2 to be extracted by the extraction circuit 45-1 is set in advance as, for example, the n-th line of the multiplexed video frame. Further, the number of audio samples of the audio stream #2 inserted in the n-th line is represented by the number-of-samples information $s_2$ inserted at the beginning of the n-th line.

The extraction circuit 45-1 extracts, when the multiplexed video frame is supplied, data of a predetermined number of bits inserted at the beginning of the n-th line as the number-of-samples information $s_2$, and specifies the number of audio samples of the audio stream #2 inserted in the n-th line. The extraction circuit 45-1 further extracts, as the audio samples of the audio stream #2, data inserted in the n-th line subsequent to the number-of-samples information $s_2$, the amount of which corresponds to the specified number of samples.

The extraction circuit 45-1 outputs the extracted audio samples of the audio stream #2 to the memory control circuit 61-2, and outputs the data of the multiplexed video frame supplied from the processor 43 to the extraction circuit 45-2.

The extraction circuit 45-2 extracts the audio data of the audio stream #1 from the multiplexed video frame supplied from the extraction circuit 45-1 in a manner similar to that of the extraction circuit 45-1.

Specifically, the extraction circuit 45-2 extracts, as the number-of-samples information $s_1$, data of a predetermined number of bits inserted at the beginning of the (n−2)-th line, and specifies the number of audio samples of the audio stream #1 inserted in the (n−2)-th line and the (n−1)-th line. The extraction circuit 45-2 further extracts, as the audio samples of the audio stream #1, data inserted in the (n−2)-th line and the (n−1)-th line subsequent to the number-of-samples information $s_1$, the amount of which corresponds to the specified number of samples.

The extraction circuit 45-2 outputs the extracted audio samples of the audio stream #1 to the memory control circuit 61-1, and outputs the data of the multiplexed video frame supplied from the extraction circuit 45-1 to the extraction circuit 45-3.

The extraction circuit 45-3 extracts the frame data of the video stream #2 from the data of the multiplexed video frame supplied from the extraction circuit 45-2.

As described with reference to FIG. 4, the multiplexing position of the frame of the video stream #2 to be extracted by the extraction circuit 45-3 is set in advance. The extraction circuit 45-3 extracts, as the frame data of the video stream #2, the data at the position set in advance as the multiplexing position of the frame of the video stream #2 from the multiplexed video frame.

The extraction circuit 45-3 outputs the extracted frame data of the video stream #2 to the frame synchronizer 51-2, and outputs the data of the multiplexed video frame supplied from the extraction circuit 45-2 to the extraction circuit 45-4.

The extraction circuit 45-4 extracts the frame data of the video stream #1 from the data of the multiplexed video frame supplied from the extraction circuit 45-3 in a manner similar to that of the extraction circuit 45-3. The extraction circuit 45-4 outputs the extracted frame data of the video stream #1 to the frame synchronizer 51-1.

The frame synchronizer 51-1 causes the frame data of the video stream #1 supplied from the extraction circuit 45-4 to be stored in the frame memory 52-1. In accordance with a request from the video transmitting circuit 53-1, the frame synchronizer 51-1 reads the frame data from the frame memory 52-1, and outputs the frame data.

The video transmitting circuit 53-1 includes a cable driver, a serializer, various encoders, a 4:2:2/4:4:4 converter, a digital/analog (D/A) converter, and any other suitable device. The video transmitting circuit 53-1 outputs the frame data of the video stream #1 supplied from the frame synchronizer 51-1 in response to a request, together with the synchronization signal, to the outside of the information processing apparatus 1 in accordance with the synchronization signal supplied from the timing generating circuit 44. The video transmitting circuit 53-1 performs predetermined processing, such as D/A conversion, on the frame data supplied from the frame synchronizer 51-1, as necessary, before outputting it to the outside of the information processing apparatus 1.

In terms of implementation, if clocks having different frequencies are used as the operating clocks of the extraction circuit 45-4, the frame synchronizer 51-1, and the video transmitting circuit 53-1, a FIFO such as a dual-port RAM is provided between the extraction circuit 45-4 and the frame synchronizer 51-1 and between the frame synchronizer 51-1 and the video transmitting circuit 53-1. Data passing through the FIFOs can be reliably transmitted and received. In addition, the data rate bias during memory access can also be reduced.

A FIFO is also provided as appropriate between the extraction circuit 45-3 and the frame synchronizer 51-2 and between the frame synchronizer 51-2 and the video transmitting circuit 53-2. Also in a configuration for processing audio data, a FIFO is provided as appropriate between the extraction circuit 45-2 and the memory control circuit 61-1, between the memory control circuit 61-1 and the audio transmitting circuit 63-1, between the extraction circuit 45-1 and the memory control circuit 61-2, and between the memory control circuit 61-2 and the audio transmitting circuit 63-2.

Here, it is not guaranteed that the frame frequency of the output video signal of the video stream #1 and the frame frequency of the multiplexed video signal match. The frame synchronizer 51-1 absorbs the difference between the frame frequencies by redundantly supplying the video data stored in the frame memory 52-1 (continuously supplying video data of the same frame) to the video transmitting circuit 53-1 or by skipping reading of data.

The frame synchronizer 51-2 causes the frame data of the video stream #2 supplied from the extraction circuit 45-3 to be stored in the frame memory 52-2. In accordance with a request from the video transmitting circuit 53-2, the frame synchronizer 51-2 reads the frame data from the frame memory 52-2, and outputs the frame data.

Similarly to the video transmitting circuit 53-1, the video transmitting circuit 53-2 outputs the frame data of the video stream #2 supplied from the frame synchronizer 51-2 in response to a request, together with the synchronization signal, to the outside in accordance with the synchronization signal supplied from the timing generating circuit 44. The video transmitting circuit 53-2 performs predetermined processing, such as D/A conversion, on the frame data supplied from the frame synchronizer 51-2, as necessary, before outputting it to the outside of the information processing apparatus 1.

The memory control circuit 61-1 causes the audio data of the audio stream #1 supplied from the extraction circuit 45-2 to be temporarily stored in a memory 62-1. The memory 62-1 stores the audio data of the audio stream #1 in units of audio samples input during one frame period of the multiplexed video frame. In accordance with a request from the audio transmitting circuit 63-1, the memory control circuit 61-1 reads the audio data from the memory 62-1, and outputs the audio data.

The audio transmitting circuit 63-1 outputs the audio data of the audio stream #1 supplied from the memory control circuit 61-1 in accordance with a request, in units of the data of one sample, to the outside of the information processing apparatus 1 in accordance with the synchronization signal supplied from the timing generating circuit 44. The audio transmitting circuit 63-1 performs predetermined processing, such as sampling frequency conversion and D/A conversion, on the audio data supplied from the memory control circuit 61-1, as necessary, before outputting it to the outside of the information processing apparatus 1.

The memory control circuit 61-2 causes the audio data of the audio stream #2 supplied from the extraction circuit 45-1 to be temporarily stored in the memory 62-2. In accordance with a request from the audio transmitting circuit 63-2, the memory control circuit 61-2 reads the audio data stored in the memory 62-2, and outputs the audio data.

The audio transmitting circuit 63-2 outputs the audio data of the audio stream #2 supplied from the memory control circuit 61-2 in accordance with a request, in units of the data of one sample, to the outside of the information processing apparatus 1 in accordance with the synchronization signal supplied from the timing generating circuit 44. The audio transmitting circuit 63-2 performs predetermined processing, such as D/A conversion, on the audio data supplied from the memory control circuit 61-2, as necessary, before outputting it to the outside of the information processing apparatus 1.

Video Interface

Figure 6:
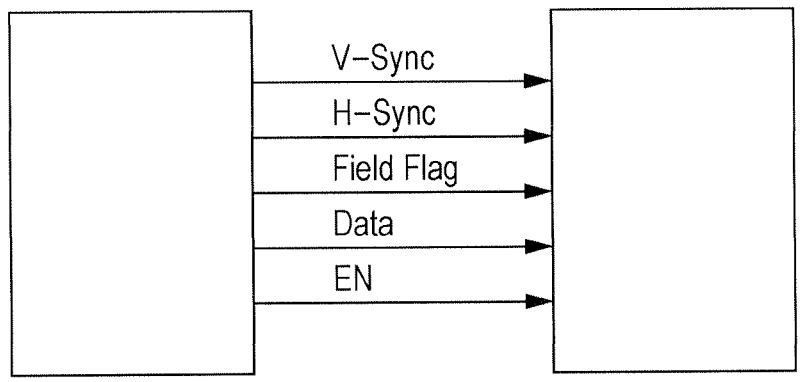
FIG. 6 is a schematic diagram illustrating a video interface.

FIG. 6 is a schematic diagram illustrating a video interface.

In the video interface, a horizontal synchronization signal (H-Sync), a vertical synchronization signal (V-Sync), a field flag signal (Field Flag), a data signal (Data) including images and sound, an enable signal (EN) indicating a clock, and the like are transmitted from the transmitter side to the receiver side. The field flag signal indicates a first field or a second field.

Figure 7:
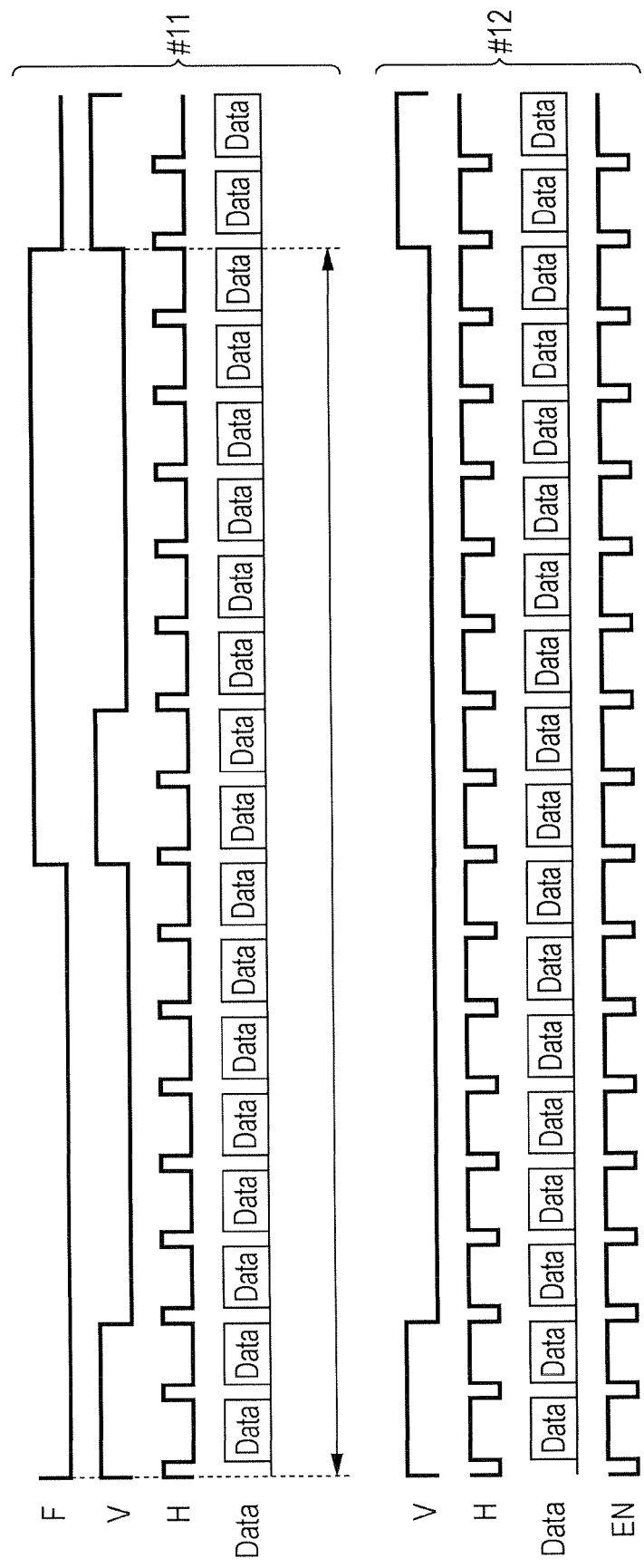
FIG. 7 is a diagram illustrating an example of waveforms of video signals.

An example of the waveforms of the video signals transmitted using the video interface illustrated in FIG. 6 is illustrated in FIG. 7. In a signal group #11 in the upper portion of FIG. 7, an example of the waveforms of interlaced video signals is illustrated, and in a signal group #12 in the lower portion of FIG. 7, an example of the waveforms of progressive video signals is illustrated.

Figure 8:
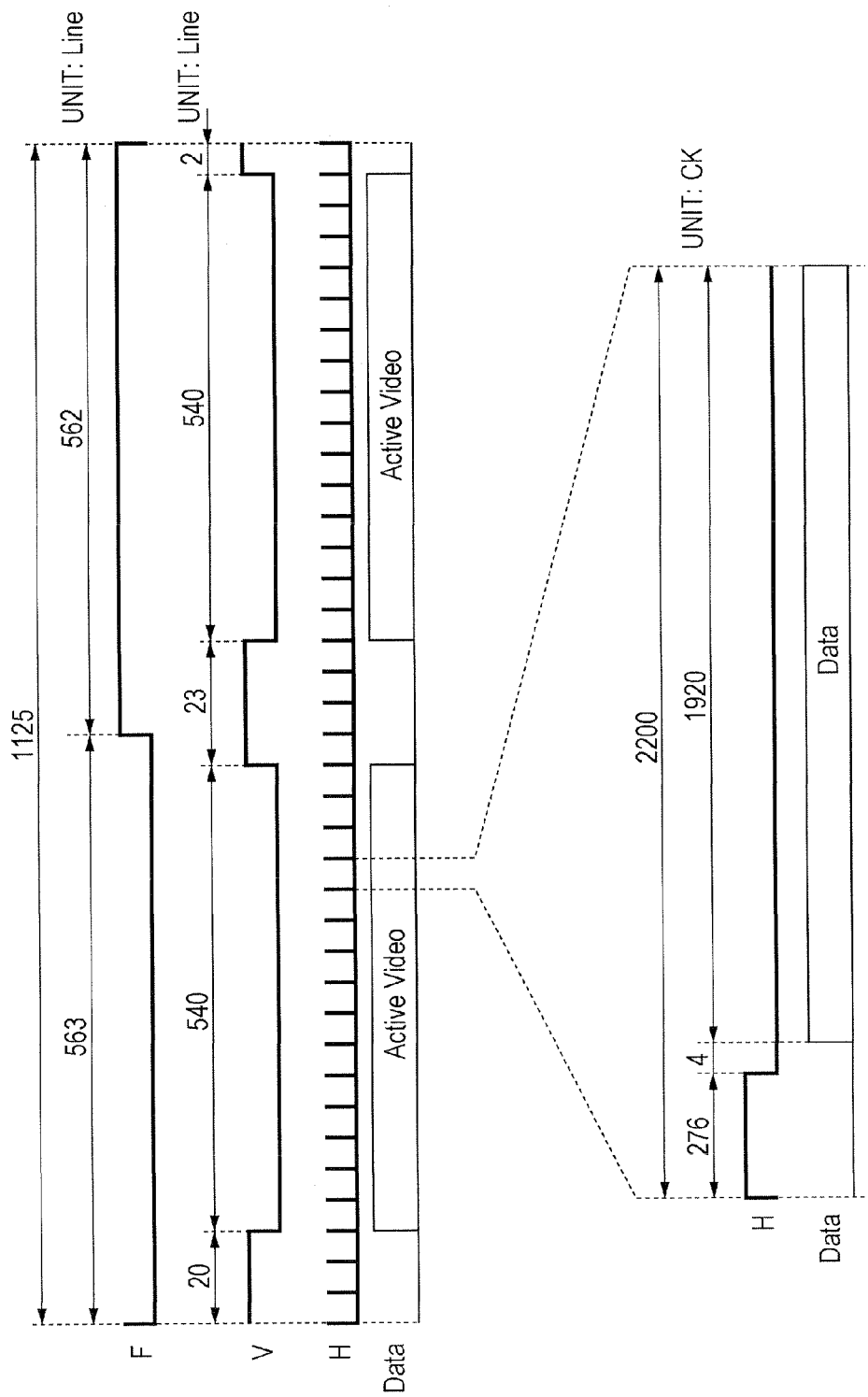
FIG. 8 is a diagram illustrating in detail the waveforms within a range indicated by a solid line arrow in FIG. 7.

The details of the waveforms within a range indicated by a solid line arrow among the waveforms illustrated in the signal group #11 in FIG. 7 are illustrated in FIG. 8. FIG. 8 illustrates an example of the waveforms of video signals of high-definition (HD) images.

As illustrated in FIG. 8, data (Data) for one field (540 lines) is transmitted during one period of a vertical synchronization signal (V) (Active Video). Also, data (Data) for one line (1920 pixels) is transmitted during one period of a horizontal synchronization signal (H).

Operation of Information Processing Apparatus

Here, a process of the information processing apparatus 1 will be described with reference to a flowchart of FIG. 9.

In step S1, the video receiving circuits 21-1 and 21-2 perform a video receiving process. The data of the frames of the video stream #1 received by the video receiving circuit 21-1 is stored in the frame memory 23-1. Further, the data of the frames of the video stream #2 received by the video receiving circuit 21-2 is stored in the frame memory 23-2.

In step S2, the audio receiving circuits 31-1 and 31-2 perform an audio receiving process. The audio samples of the audio stream #1 input during one frame period of the multiplexed video frame and the number-of-samples information, which are cut out by the audio receiving circuit 31-1, are stored in the memory 33-1. Further, the audio samples of the audio stream #2 input during one frame period of the multiplexed video frame and the number-of-samples information, which are cut out by the audio receiving circuit 31-2, are stored in the memory 33-2.

In step S3, the multiplexed video signal generating circuit 41 generates a multiplexed video frame, and outputs data and a synchronization signal of the multiplexed video frame.

In step S4, a multiplexing process is performed. Specifically, one frame of the video stream #1 is attached to the multiplexed video frame by the multiplexing circuit 42-1, and one frame of the video stream #2 is attached to the multiplexed video frame by the multiplexing circuit 42-2. Further, the audio data of the audio stream #1 and the number-of-samples information are inserted into the multiplexed video frame by the multiplexing circuit 42-3, and the audio data of the audio stream #2 and the number-of-samples information are inserted into the multiplexed video frame by the multiplexing circuit 42-4.

In step S5, the processor 43 performs predetermined processing on the video data and audio data multiplexed in the data of the multiplexed video frame input to the video port. Further, the processor 43 outputs the multiplexed video frame in which the data obtained after processing has been multiplexed from the video port.

In step S6, an extraction process is performed. Specifically, the audio data of the audio stream #2 is extracted from the data of the multiplexed video frame by the extraction circuit 45-1, and the audio data of the audio stream #1 is extracted from the data of the multiplexed video frame by the extraction circuit 45-2. Further, the video data of the video stream #2 is extracted from the data of the multiplexed video frame by the extraction circuit 45-3, and the video data of the video stream #1 is extracted from the data of the multiplexed video frame by the extraction circuit 45-4.

In step S7, an audio output process is performed. The data of the audio stream #1 extracted from the data of multiplexed video frame is temporarily stored in the memory 62-1, and is then output to the outside sample-by-sample. Further, the data of the audio stream #2 is temporarily stored in the memory 62-2, and is then output to the outside sample-by-sample.

In step S8, a video output process is performed. The frame data of the video stream #1 extracted from the multiplexed video frame is temporarily stored in the frame memory 52-1, and is then output to the outside. Further, the frame data of the video stream #2 is temporarily stored in the frame memory 52-2, and is then output to the outside. After the video output process has been completed, the process ends.

Next, the video receiving process performed in step S1 of FIG. 9 will be described with reference to a flowchart of FIG. 10.

In step S11, the video receiving circuit 21-1 receives an input video signal, and performs various processing such as A/D conversion to generate data of frames of the video stream #1. The video receiving circuit 21-2 also performs similar processing to generate data of frames of the video stream #2.

In step S12, the frame synchronizer 22-1 causes the frame data of the video stream #1 generated by the video receiving circuit 21-1 to be stored in the frame memory 23-1. The frame synchronizer 22-2 also causes the frame data of the video stream #2 to be stored in the frame memory 23-2.

Figure 9:
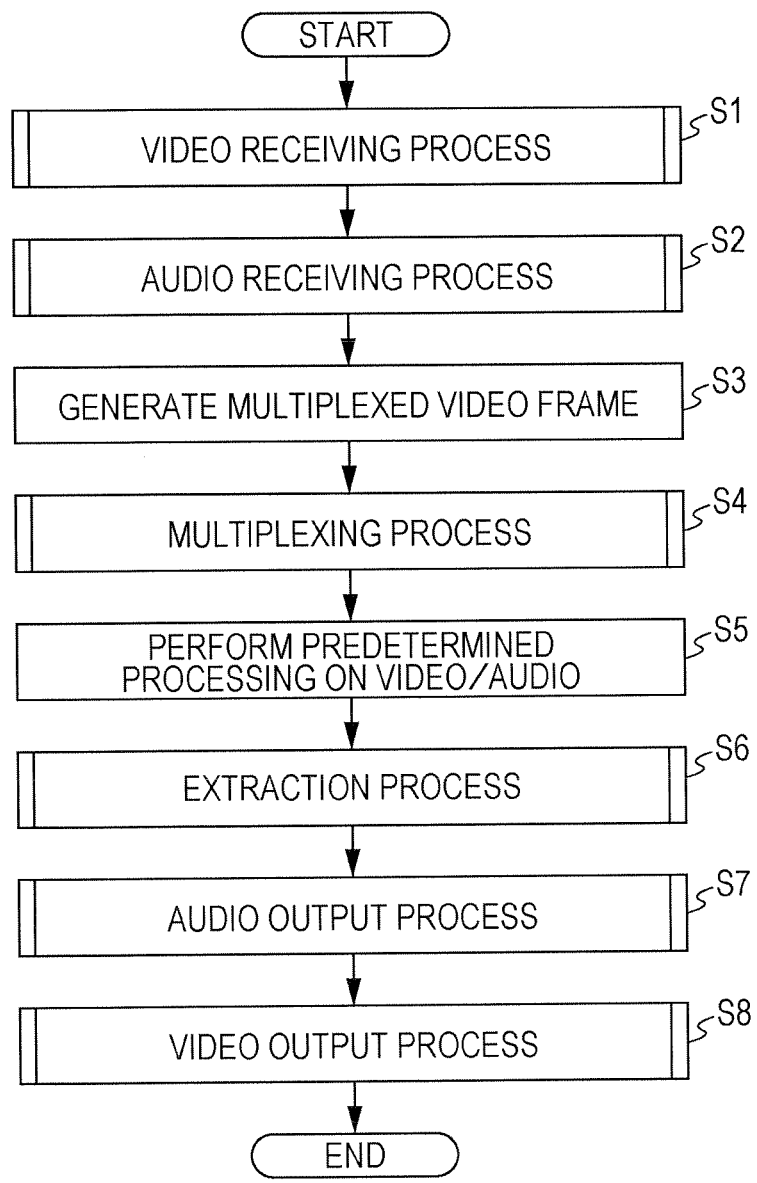
FIG. 9 is a flowchart illustrating a process of the information processing apparatus.
Figure 10:
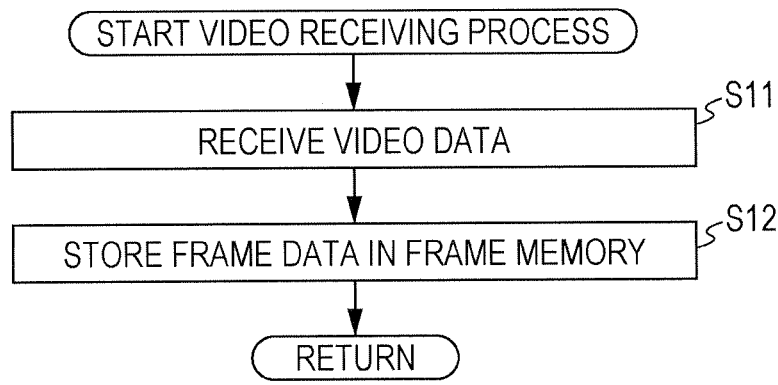
FIG. 10 is a flowchart illustrating a video receiving process performed in step S1 of FIG. 9.

After the frame data of the video stream #1 and the frame data of the video stream #2 are stored in the frame memories 23-1 and 23-2, respectively, the process returns to step S1 of FIG. 9, and the subsequent processing is performed.

Figure 11:
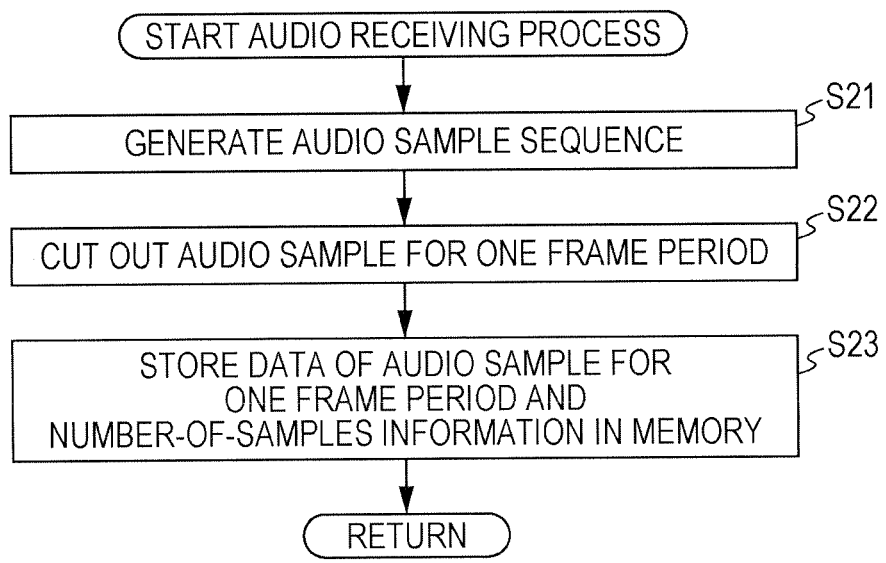
FIG. 11 is a flowchart illustrating an audio receiving process performed in step S2 of FIG. 9.

Next, the audio receiving process performed in step S2 of FIG. 9 will be described with reference to a flowchart of FIG. 11.

In step S21, the audio receiving circuit 31-1 receives an input audio signal, and performs processing such as A/D conversion to generate audio data of the audio stream #1 composed of a time sequence of audio samples. The audio receiving circuit 31-2 also performs similar processing to generate audio data of the audio stream #2.

In step S22, the audio receiving circuit 31-1 cuts out, while counting the number of samples, audio samples of the audio stream #1 that are input within one frame period of the multiplexed video frame. The audio receiving circuit 31-2 also performs similar processing, and cuts out audio samples of the audio stream #2 that are input within one frame period of the multiplexed video frame.

In step S23, the memory control circuit 32-1 causes the cut out audio samples of the audio stream #1 and the number-of-samples information to be stored in the memory 33-1. The memory control circuit 32-2 also causes the cut out audio samples of the audio stream #2 and the number-of-samples information to be stored in the memory 33-2.

After the audio samples of the audio stream #1 and the audio samples of the audio stream #2 are stored in the memories 33-1 and 33-2, respectively, the process returns to step S2 of FIG. 9, and the subsequent processing is performed.

Figure 12:
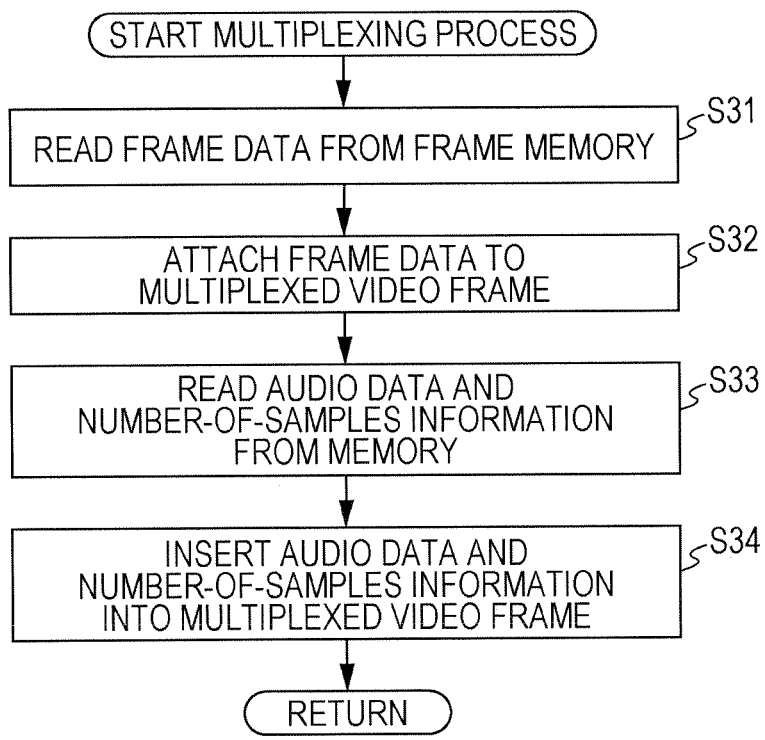
FIG. 12 is a flowchart illustrating a multiplexing process performed in step S4 of FIG. 9.

Next, the multiplexing process performed in step S4 of FIG. 9 will be described with reference to a flowchart of FIG. 12. The data of the multiplexed video frame generated in step S3 of FIG. 9 is supplied to the multiplexing circuit 42-1.

In step S31, the multiplexing circuit 42-1 requests the frame synchronizer 22-1 to read the frame data of the video stream #1 from the frame memory 23-1.

In step S32, the multiplexing circuit 42-1 attaches a frame of the video stream #1 whose data has been read from the frame memory 23-1 to a predetermined position of the multiplexed video frame supplied from the multiplexed video signal generating circuit 41.

Processing similar to that of steps S31 and S32 is also performed by the multiplexing circuit 42-2, and a frame of the video stream #2 whose data has been read from the frame memory 23-2 is attached to the multiplexed video frame supplied from the multiplexing circuit 42-1.

In step S33, the multiplexing circuit 42-3 requests the memory control circuit 32-1 to read the audio data of the audio stream #1 and the number-of-samples information from the memory 33-1.

In step S34, the multiplexing circuit 42-3 inserts the audio data of the audio stream #1 and the number-of-samples information read from the memory 33-1 into the multiplexed video frame supplied from the multiplexing circuit 42-2.

Processing similar to that of steps S33 and S34 is also performed by the multiplexing circuit 42-4, and the audio data of the audio stream #2 read from the memory 33-2 is inserted, together with the number-of-samples information, into the multiplexed video frame supplied from the multiplexing circuit 42-3.

After all the streams of video data and audio data have been multiplexed into the data of the multiplexed video frame, the process returns to step S4 of FIG. 9, and the subsequent processing is performed. The processor 43 performs processing on the video data and audio data multiplexed as the data of the multiplexed video frame, and the data of the multiplexed video frame in which the data obtained after processing has been multiplex is supplied to the extraction circuit 45-1.

Figure 13:
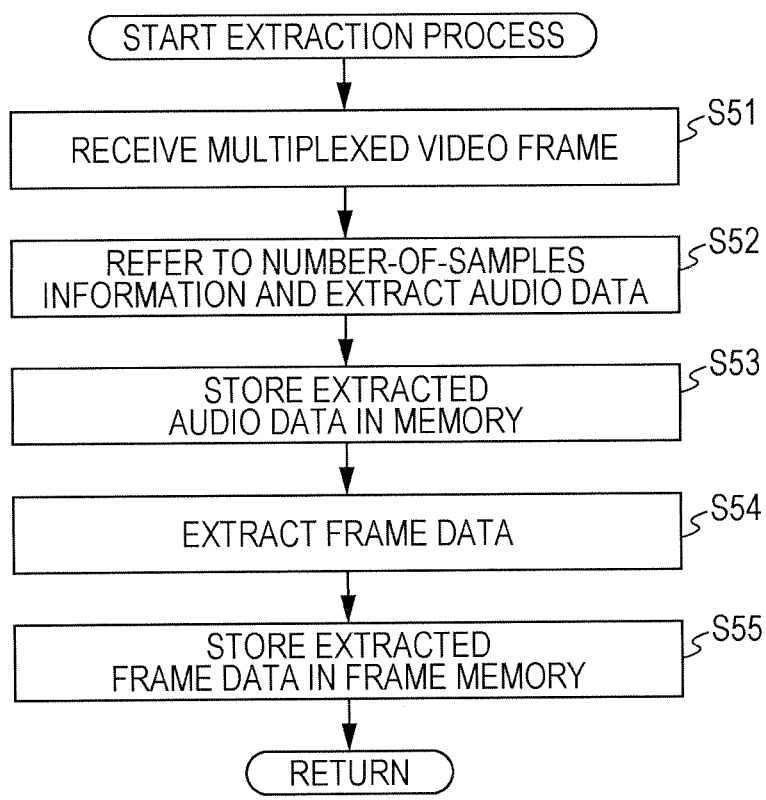
FIG. 13 is a flowchart illustrating an extraction process performed in step S6 of FIG. 9.

Next, the extraction process performed in step S6 of FIG. 9 will be described with reference to a flowchart of FIG. 13.

In step S51, the extraction circuit 45-1 receives the data of the multiplexed video frame output from the processor 43.

In step S52, as described above, the extraction circuit 45-1 refers to the number-of-samples information, and extracts the audio data of the audio stream #2 from the data of the multiplexed video frame.

In step S53, the memory control circuit 61-2 causes the audio data of the audio stream #2 extracted by the extraction circuit 45-1 to be stored in the memory 62-2.

Processing similar to that of steps S52 and S53 is also performed by the extraction circuit 45-2 and the memory control circuit 61-1, and the audio data of the audio stream #1 extracted from the data of the multiplexed video frame is stored in the memory 62-1.

In step S54, the extraction circuit 45-3 extracts the frame data of the video stream #2 from the data of the multiplexed video frame.

In step S55, the frame synchronizer 51-2 causes the frame data of the video stream #2 extracted by the extraction circuit 45-3 to be stored in the frame memory 52-2.

Processing similar to that of steps S54 and S55 is also performed by the extraction circuit 45-4 and the frame synchronizer 51-1, and the frame data of the video stream #1 extracted from the data of the multiplexed video frame is stored in the frame memory 52-1.

After all the streams of video data and audio data have been extracted from the multiplexed video frame, the process returns to step S6 of FIG. 9, and the subsequent processing is performed.

Figure 14:
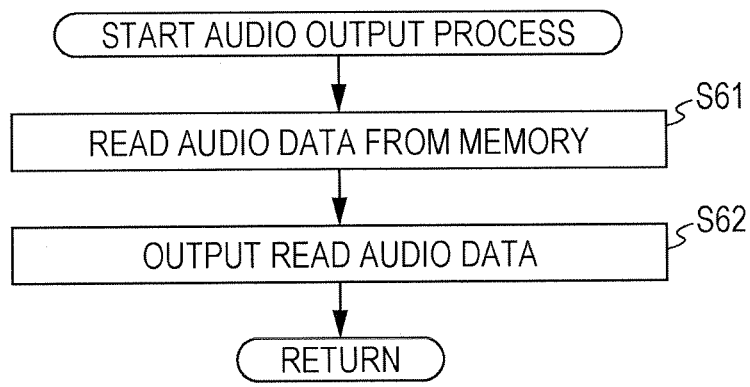
FIG. 14 is a flowchart illustrating an audio output process performed in step S7 of FIG. 9.

Next, the audio output process performed in step S7 of FIG. 9 will be described with reference to a flowchart of FIG. 14.

In step S61, the audio transmitting circuit 63-2 requests the memory control circuit 61-2 to read the audio data of the audio stream #2 from the memory 62-2.

In step S62, the audio transmitting circuit 63-2 outputs the audio data of the audio stream #2 read from the memory 62-2 to the outside in units of the data of one sample.

Processing similar to that of steps S61 and S62 is also performed by the audio transmitting circuit 63-1, and the audio data of the audio stream #1 read from the memory 62-1 is output to the outside.

After all the streams of audio data have been output, the process returns to step S7 of FIG. 9, and the subsequent processing is performed.

Figure 15:
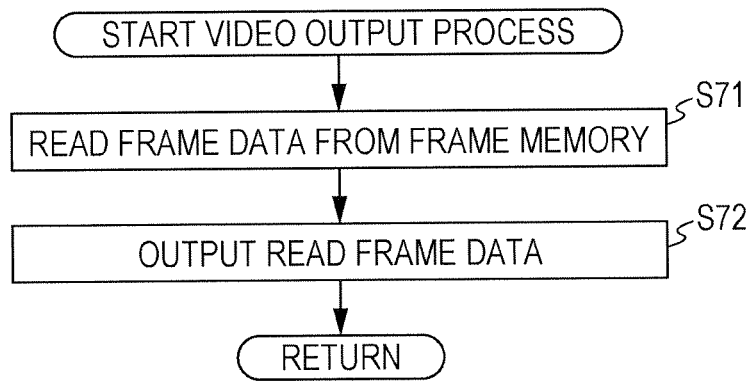
FIG. 15 is a flowchart illustrating a video output process performed in step S8 of FIG. 9.

Next, the video output process performed in step S8 of FIG. 9 will be described with reference to a flowchart of FIG. 15.

In step S71, the video transmitting circuit 53-2 requests the frame synchronizer 51-2 to read the frame data of the video stream #2 from the frame memory 52-2.

In step S72, the video transmitting circuit 53-2 outputs the frame data of the video stream #2 read from the frame memory 52-2 to the outside.

Processing similar to that of steps S71 and S72 is also performed by the video transmitting circuit 53-1, and the frame data of the video stream #1 read from the frame memory 52-1 is output to the outside.

After the frame data of all the streams of video has been output, the process returns to step S8 of FIG. 9, and the subsequent processing is performed.

The processing of the steps described above may not necessarily be performed in the order illustrated in the figures, and may be performed in parallel to the processing of other steps or before or after the processing of other steps, as appropriate.

With the series of processes described above, a plurality of streams of audio data can be input to the processor 43 including one input video port. Further, a plurality of streams of audio data can be output from the processor 43 including one output video port. In other words, the input of audio data to the processor 43 and the output of audio data from the processor 43 can be efficiently performed using one video port.

Examples of Multiplexing

In the foregoing description, two streams of video signals and two streams of audio signal are input to the information processing apparatus 1. However, the number of signals to be input can be changed as desired. For example, four streams of video signals and four streams of audio signals may be input.

Figure 16:
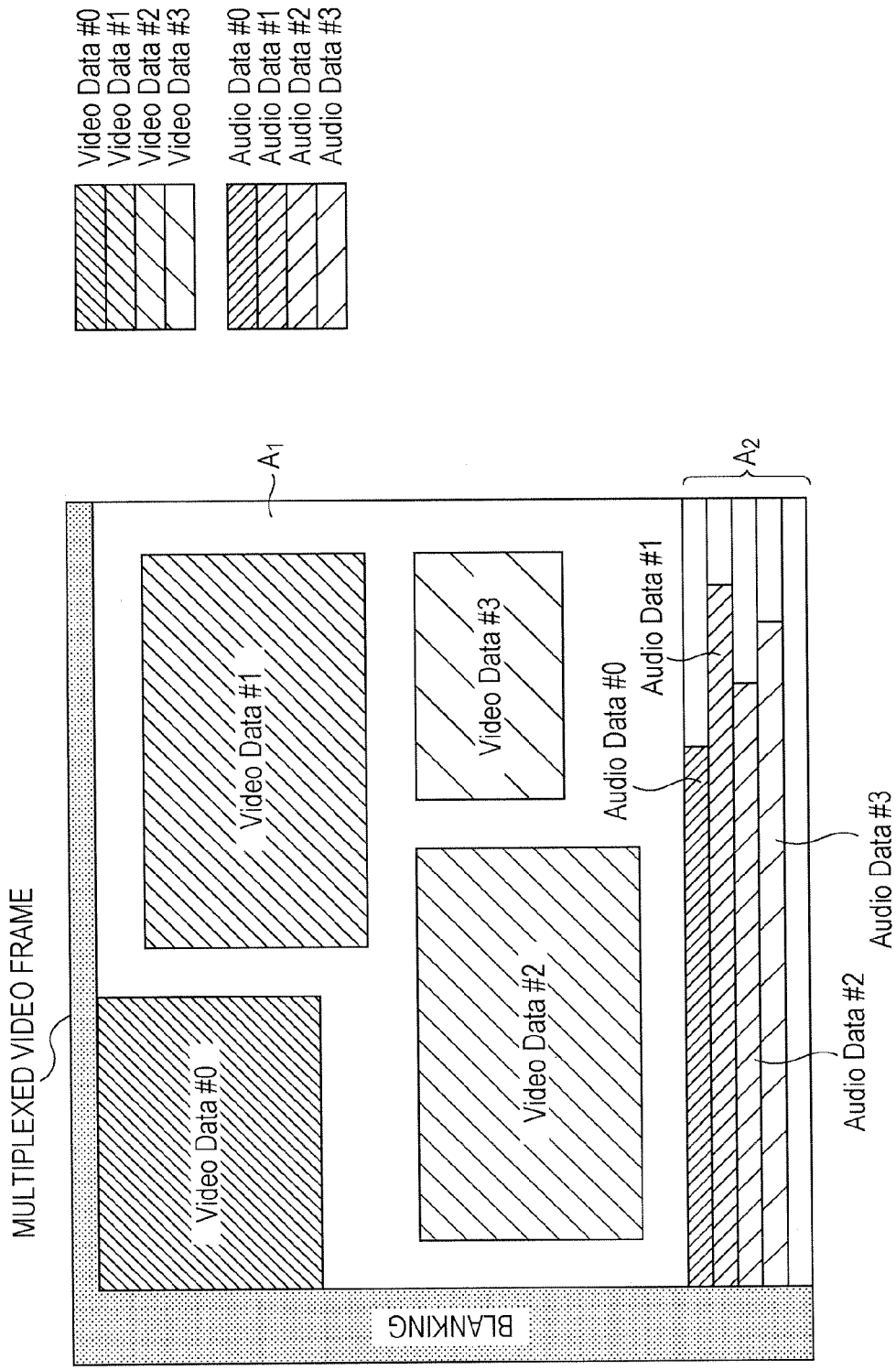
FIG. 16 is a diagram illustrating an example of a multiplexed video frame.

FIG. 16 is a diagram illustrating an example of a multiplexed video frame in a case where four streams of video signals and four streams of audio signals are input.

In the example of FIG. 16, the frames of the video streams #0 to #3 are attached in an effective image frame of a multiplexed video frame so as not to overlap each other with their frame sizes being maintained. In the multiplexed video frame illustrated in FIG. 16, a blanking region is provided so as to extend in the horizontal and vertical directions, and an area from the first line to a predetermined line within the effective image frame is set as a video area $A_1$ that is an area for video.

An audio area $A_2$ that is an area for audio data is also defined below the video area $A_1$. The audio data of the audio streams #0 to #3 is inserted tightly into the respective lines of the audio data area $A_2$ in the order input to the information processing apparatus 1, starting from the left end of each line.

At the beginning of each line, number-of-samples information representing the number of audio samples inserted in the line is inserted. The number-of-samples information may not necessarily be inserted at the beginning of a line allocated to each stream of audio data, and may be inserted in another location such as the blanking period of the multiplexed video frame.

In FIG. 16, different horizontal lengths of portions of audio data inserted in the respective lines indicate that the amount of audio data inserted differs depending on the stream. As described above, audio data multiplexed into the same multiplexed video frame is input during a frame period of the multiplexed video frame. Therefore, if each audio data item has a different sampling frequency or a different quantization accuracy, variation may occur in the amount of audio data multiplexed into the same multiplexed video frame.

Figure 17:
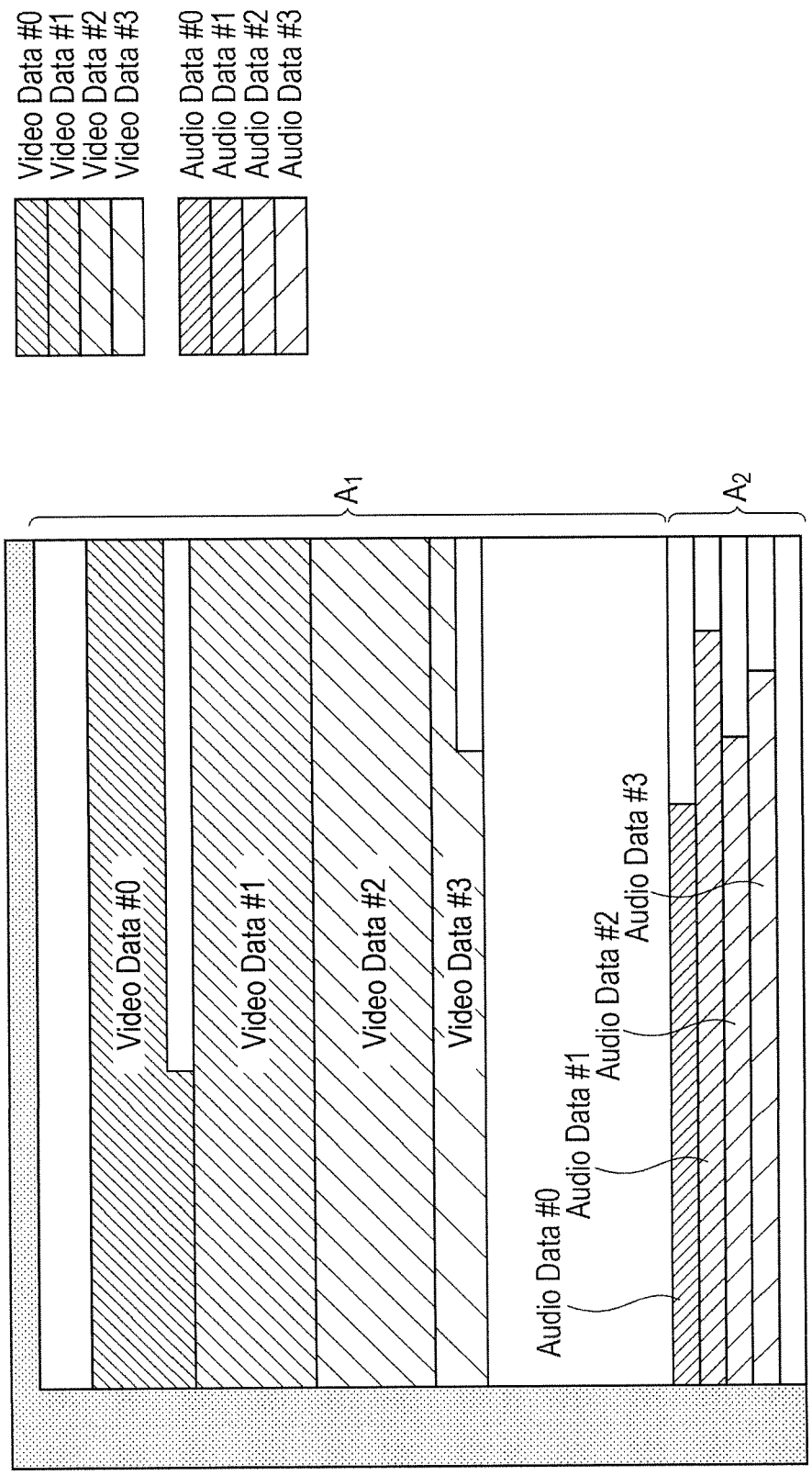
FIG. 17 is a diagram illustrating another example of the multiplexed video frame.

FIG. 17 is a diagram illustrating another example of a multiplexed video frame in a case where four streams of video signals and four streams of audio signals are input.

In a video area $A_1$ of the multiplexed video frame illustrated in FIG. 17, an area having pixels located in the horizontal direction, the number of which is equal to the number of pixels in the horizontal direction of an effective image frame, and pixels located in the vertical direction, the number of which corresponds to a predetermined number of lines, is set as an area where data of frames of each video stream is to be inserted. In the example of FIG. 17, areas where the data of the frames of the video streams #0 to #3 is to be inserted are set in order, starting from the top.

In this manner, instead of being attached to a multiplexed video frame with the input size being maintained, a frame of each video stream may be attached in a shape different from that when it is input. Depending on the setting of an area where a frame of each video stream is to be attached, efficient multiplexing of data can be achieved.

Multiplexing Operation Using Multiplexed Video Frame for Input

Here, a method for multiplexing video data and audio data using a multiplexed video frame will be described.

First, a multiplexing operation using a multiplexed video frame for input to the processor 43, which is performed by a multiplexing circuit 42 (in the example of FIG. 1, the multiplexing circuits 42-1 to 42-4), will be described.

Figure 18:
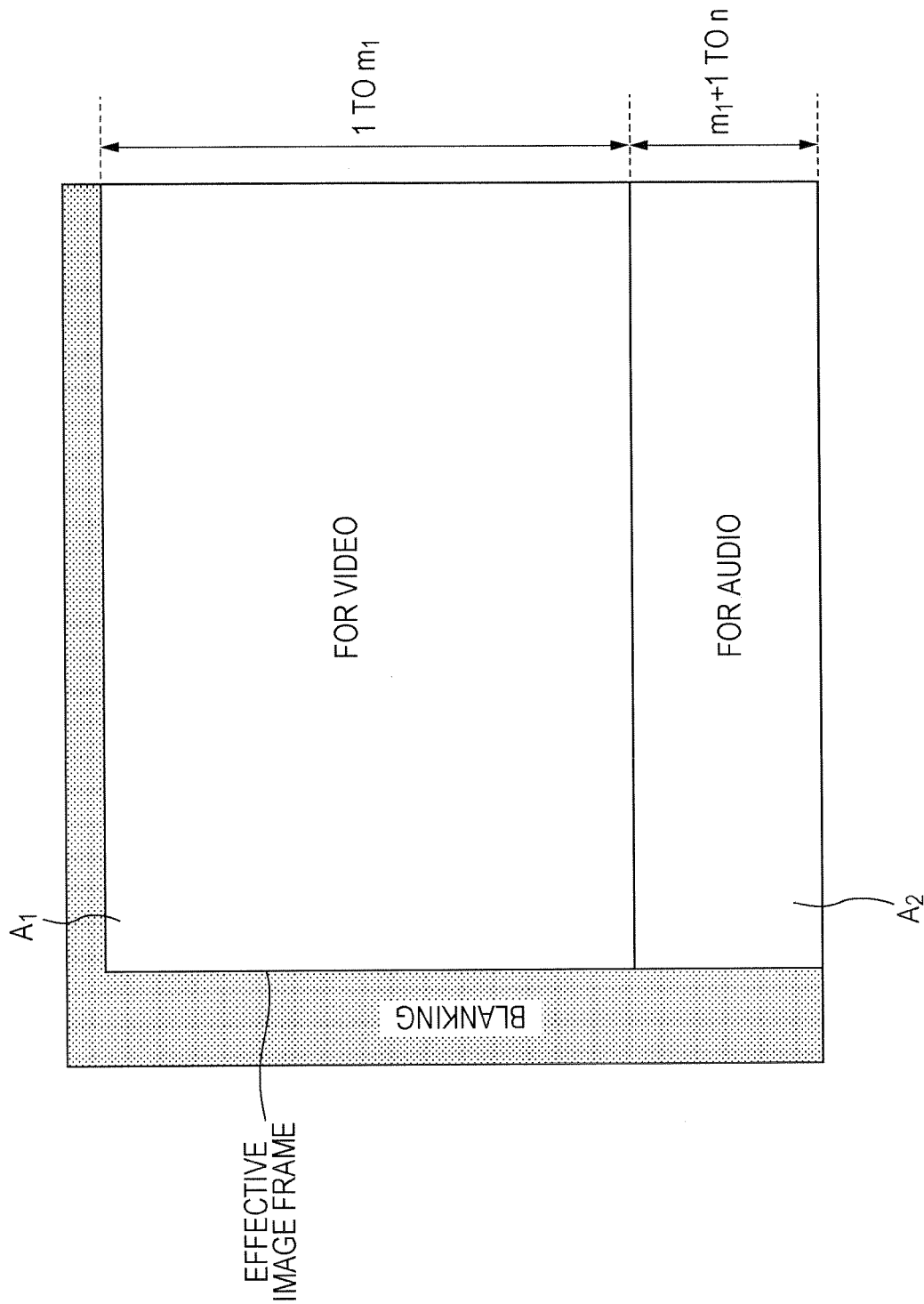
FIG. 18 is a diagram illustrating an example of the area configuration of a multiplexed video frame for input.

FIG. 18 is a diagram illustrating an example of the area configuration of a multiplexed video frame for input.

As illustrated in FIG. 18, a blanking region is provided so as to extend in the horizontal and vertical directions of the multiplexed video frame for input. In the example of FIG. 18, an area from the first line to the $m_1$-th line within an effective image frame is set as a video area $A_1$ that is an area for video. Further, an area from the $(m_1+1)$-th line to the n-th line that is the last line within the effective image frame is set as an audio area $A_2$ that is an area for audio.

In this manner, the video area $A_1$ is defined in the upper portion of the multiplexed video frame for input, and the audio area $A_2$ is defined below the video area $A_1$. When the multiplexed video frame for input is plotted on the time axis, processing is performed in the order from the upper portion of the multiplexed video frame for input to the lower portion.

Figure 19:
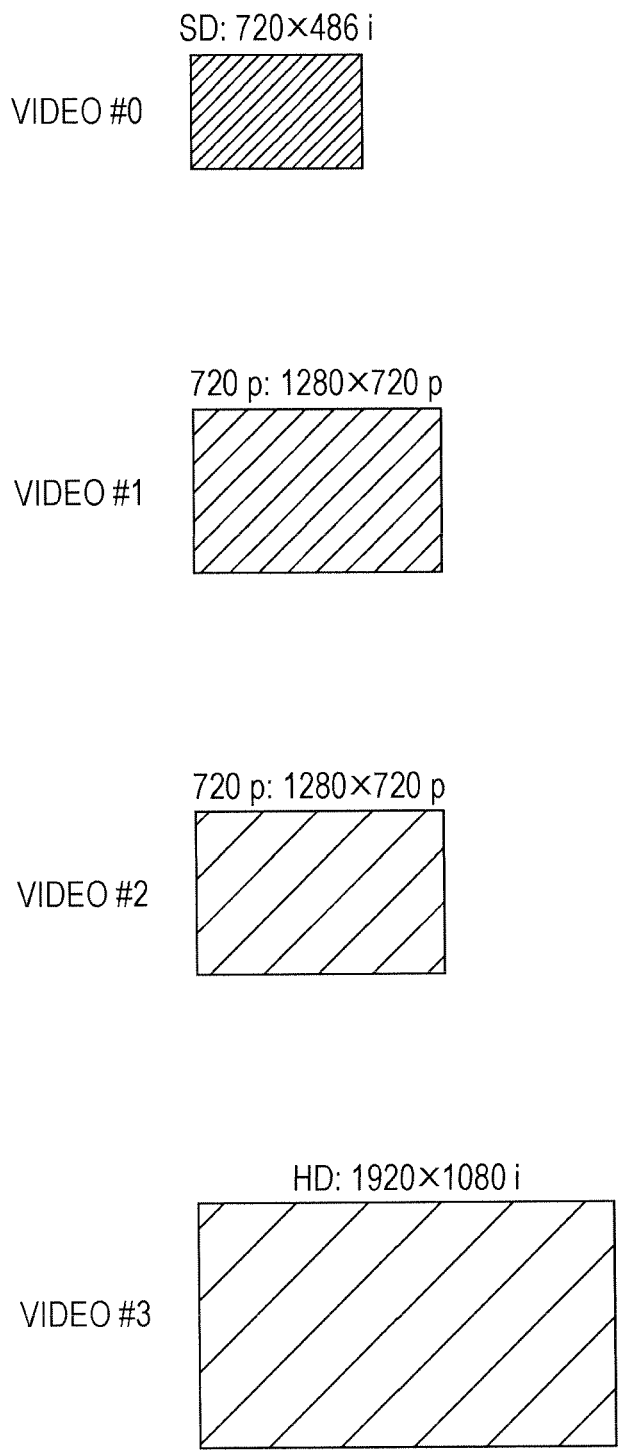
FIG. 19 is a diagram illustrating an example of video frames to be multiplexed.

FIG. 19 is a diagram illustrating an example of video frames to be attached to the multiplexed video frame for input illustrated in FIG. 18.

The following description will be given in the context of the multiplexing of four streams of video data, namely, the video streams #0 to #3.

In the example of FIG. 19, the video stream #0 has a frame size of 720×486i (SD), and the video stream #1 has a frame size of 1280×720p (720p). Further, the video stream #2 has a frame size of 1280×720p (720p), which is the same as the frame size of the video stream #1, and the video stream #3 has a frame size of 1920×1080i (HD).

A frame to be attached to the multiplexed video frame for input is divided into, for example, lines, and each line is attached to a different line on the multiplexed video frame for input.

Further, the data of frames to be attached are attached so as not to overlap each other and so as to be interleaved. Interleaving is a method for arranging lines of the same frame in a non-contiguous manner in the vertical direction on a multiplexed video frame for input.

A case where the frames of the video streams #0 to #3 are attached to the multiplexed video frame for input in this order will be described. The frames of the video streams #0 and #3 are interlaced frames. In the video streams #0 and #3, actually, lines forming one field are attached to one multiplexed video frame for input. In the following description, however, it is assumed that a frame is attached.

Figure 20:
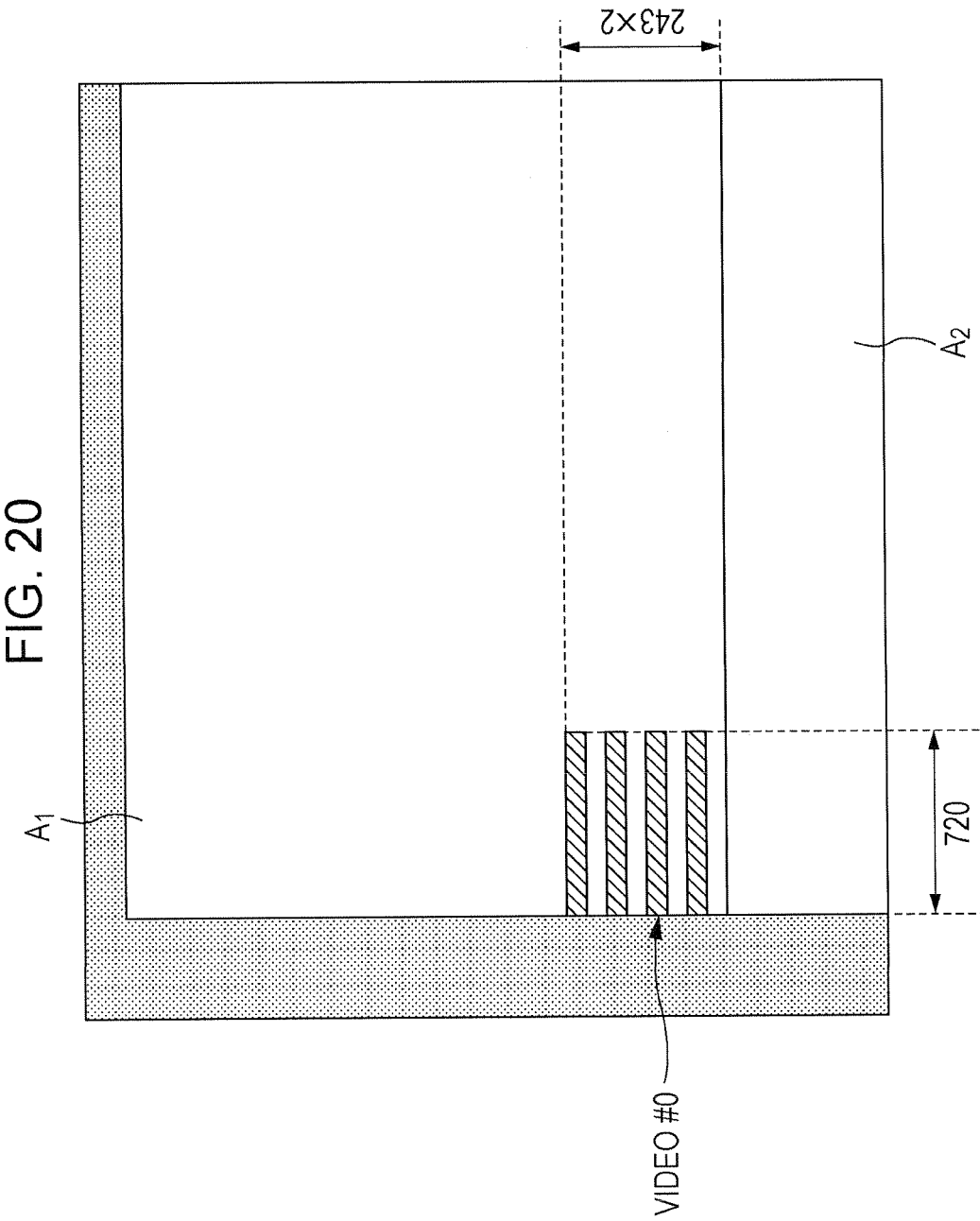
FIG. 20 is a diagram illustrating an example of the attachment of a frame of a video stream #0.

FIG. 20 is a diagram illustrating an example of a multiplexed video frame for input in which the frame (field) of the video stream #0 has been attached.

In the example of FIG. 20, the lines of the frame of the video stream #0 are inserted in the horizontal direction within a range of 720 pixels to the right from the left end of the effective image frame, and are inserted in the vertical direction within a range of 243×2 lines upward from the $m_1$-th line, which is the last line of the video area $A_1$. The number of lines in one field, i.e., 243 lines, are inserted every other line although, in FIG. 20, four lines are illustrated as lines of the frame of the video stream #0.

Information regarding the insertion positions (multiplexing positions) of the lines of the frame of the video stream #0 is set in advance in the multiplexing circuit 42 that receives the multiplexed video frame for input and that attaches the frame of the video stream #0.

Figure 21:
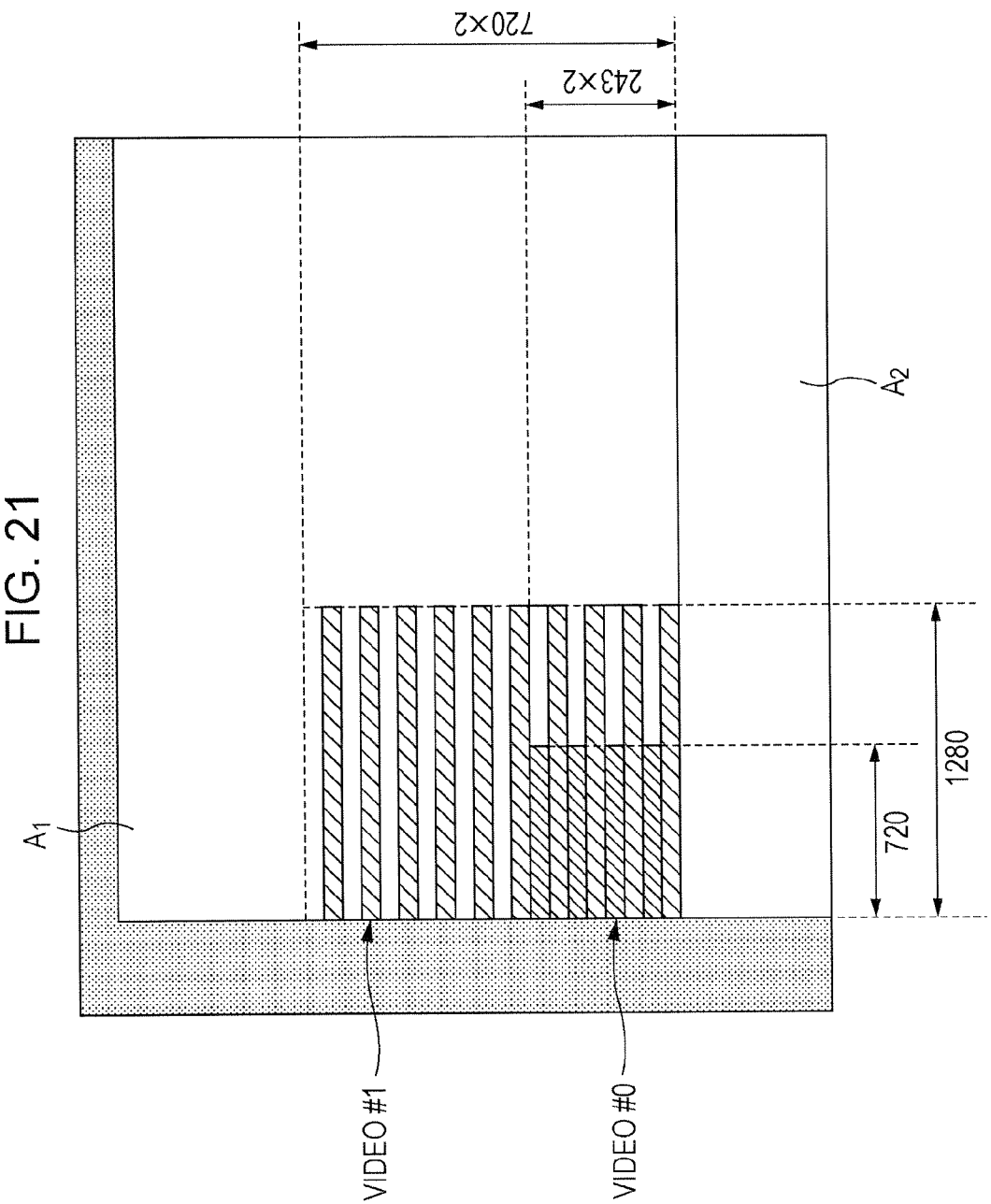
FIG. 21 is a diagram illustrating an example of the attachment of a frame of a video stream #1.

FIG. 21 is a diagram illustrating an example of a multiplexed video frame for input in which the frame of the video stream #1 has been attached subsequently to the frame of the video stream #0.

In the example of FIG. 21, the lines of the frame of the video stream #1 are inserted in the horizontal direction within a range of 1280 pixels to the right from the left end of the effective image frame, and are inserted in the vertical direction within a range of 720×2 lines upward from the $m_1$-th line that is the last line of the video area $A_1$. The number of lines of one frame, i.e., 720 lines, are inserted every other line so as not to overlap the lines of the frame of the video stream #0 although, in FIG. 21, ten lines are illustrated as lines of the frame of the video stream #1.

In the range of 243×2 lines upward from the $m_1$-th line that is the last line of the video area $A_1$, the lines of the frame of the video stream #0 and the lines of the frame of the video stream #1 are alternately inserted.

Information regarding the insertion positions of the lines of the frame of the video stream #1 is set in advance in the multiplexing circuit 42 that receives the multiplexed video frame for input and that attaches the frame of the video stream #1.

Figure 22:
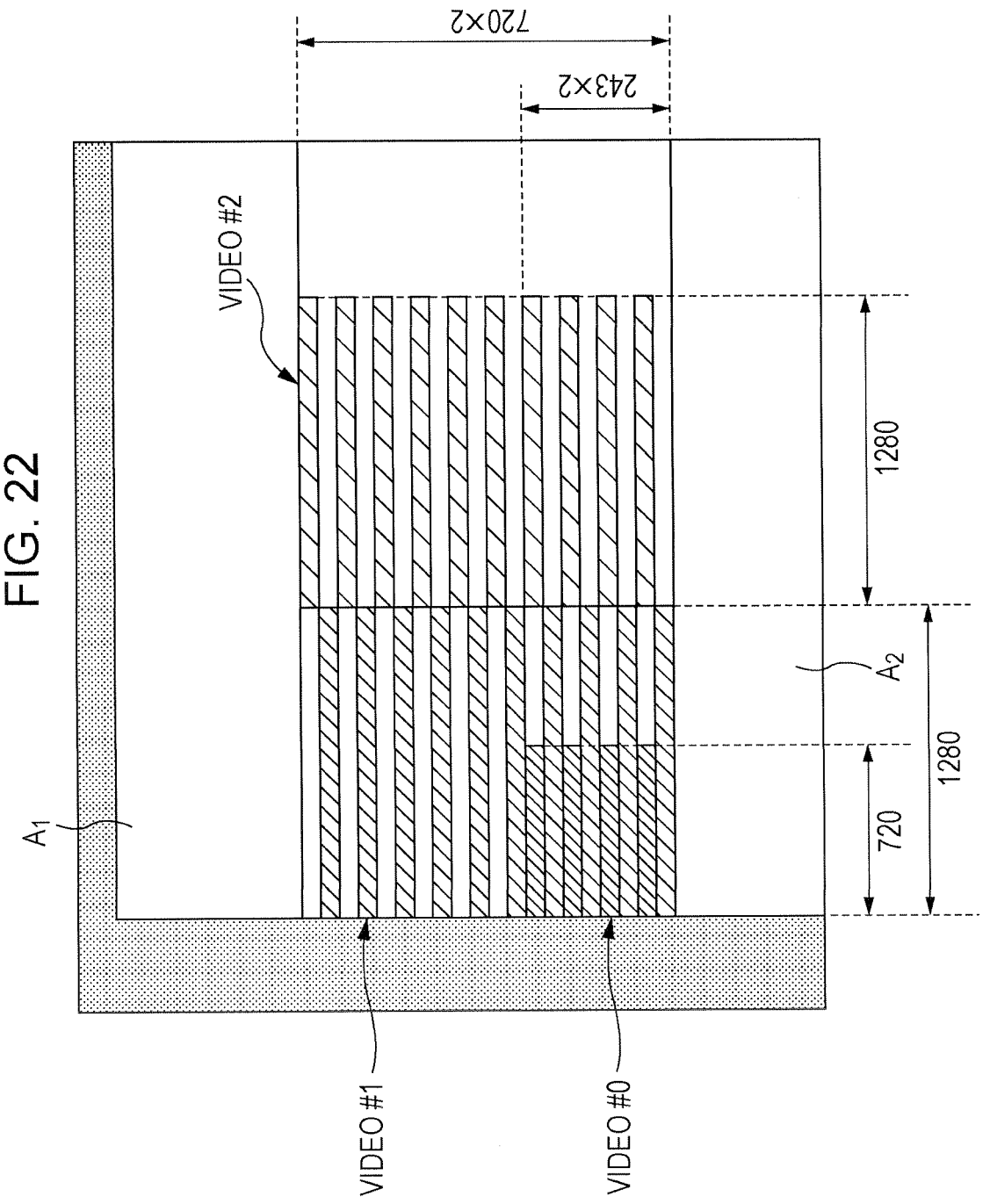
FIG. 22 is a diagram illustrating an example of the attachment of a frame of a video stream #2.

FIG. 22 is a diagram illustrating an example of a multiplexed video frame for input in which the frame of the video stream #2 has been attached subsequently to the frames of the video streams #0 and #1.

In the example of FIG. 22, the lines of the frame of the video stream #2 are inserted in the horizontal direction within a range of 1280 pixels to the right from the 1281st pixel, where the pixel at the left end of the effective image frame is used as the first pixel. Further, the lines of the frame of the video stream #2 are inserted in the vertical direction within a range of 720×2 lines upward from the $m_1$-th line, which is the last line of the video area $A_1$. The number of lines of one frame, i.e., 720 lines, are inserted every other line although, in FIG. 22, ten lines are illustrated as lines of the frame of the video stream #2.

Information regarding the insertion positions of the lines of the frame of the video stream #2 is set in advance in the multiplexing circuit 42 that receives the multiplexed video frame for input and that attaches the frame of the video stream #2.

Figure 23:
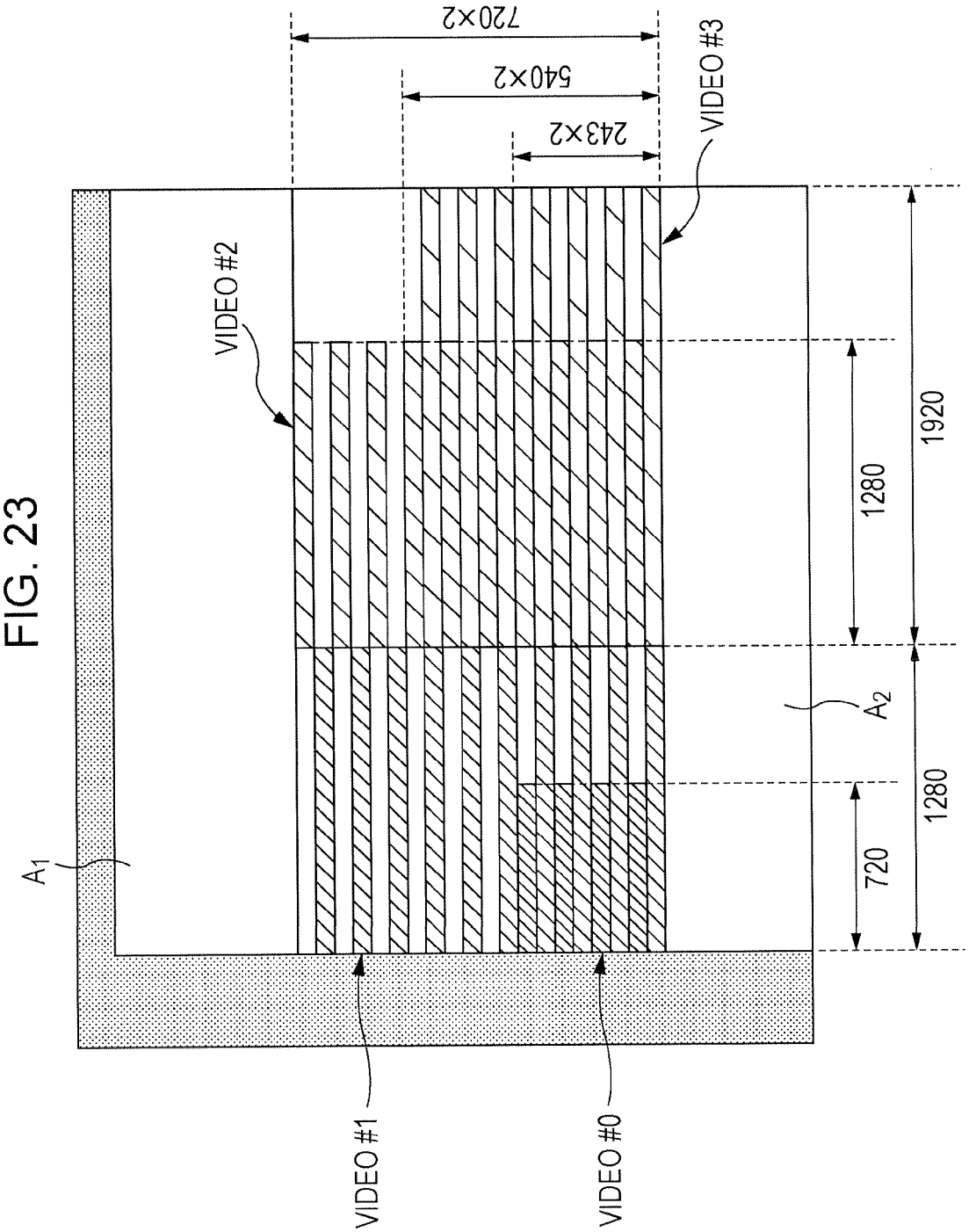
FIG. 23 is a diagram illustrating an example of the attachment of a frame of a video stream #3.

FIG. 23 is a diagram illustrating an example of a multiplexed video frame for input in which the frame (field) of the video stream #3 has been attached subsequently to the frames of the video streams #0, #1, and #2.

In the example of FIG. 23, the lines of the frame of the video stream #3 are inserted in the horizontal direction within a range of 1920 pixels to the right from the 1281st pixel, where the pixel at the left end of the effective image frame is used as the first pixel. Further, the lines of the frame of the video stream #3 are inserted in the vertical direction within a range of 540×2 lines upward from the $m_1$-th line, which is the last line of the video area $A_1$. The number of lines in one field, i.e., 540 lines, are inserted every other line so as not to overlap the lines of the frame of the video stream #2 although, in FIG. 23, seven lines are illustrated as lines of the frame of the video stream #3.

Information regarding the insertion positions of the lines of the frame of the video stream #3 is set in advance in the multiplexing circuit 42 that receives the multiplexed video frame for input and that attaches the frame of the video stream #3.

In the illustrated example, the number of pixels per horizontal line of the effective image frame of the multiplexed video frame for input is set to 3200 pixels (1280+1920 pixels).

Figure 24:
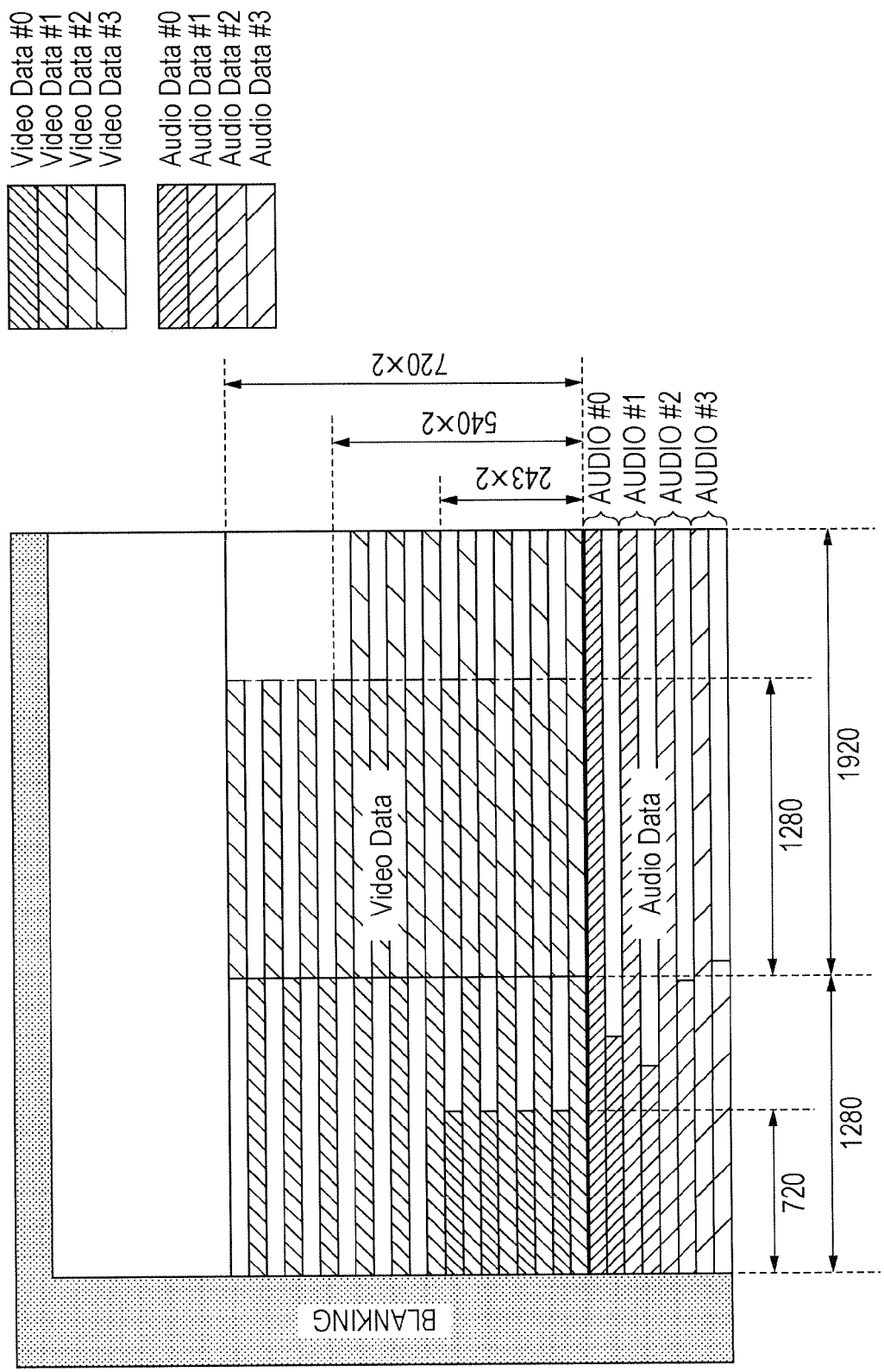
FIG. 24 is a diagram illustrating an example of the insertion of audio data.

FIG. 24 is a diagram illustrating an example of a multiplexed video frame for input in which audio data has been insert.

The following description will be given in the context of the multiplexing of four streams of audio data, namely, audio streams #0 to #3.

As illustrated in FIG. 24, the audio data of the audio streams #0 to #3 are inserted tightly into the audio area $A_2$ of the multiplexed video frame for input, in the order input to the information processing apparatus 1, starting from the left end of each line.

In the example of FIG. 24, the $(m_1+1)$-th line, which is the start position of the audio area $A_2$, and the $(m_1+2)$-th line are allocated to the audio data of the audio stream #0.

At the beginning (left end) of the $(m_1+1)$-th line among the $(m_1+1)$-th line and the $(m_1+2)$-th line, number-of-samples information representing the number of audio samples of the audio stream #0 multiplexed in the multiplexed video frame for input illustrated in FIG. 24 is inserted. Further, subsequently to the number-of-samples information, the audio data of the audio stream #0 is inserted in the entirety of the $(m_1+1)$-th line and up to the middle of the $(m_1+2)$-th line.

Further, in the example of FIG. 24, the $(m_1+3)$-th line and the $(m_1+4)$-th line are allocated to the audio data of the audio stream #1.

At the beginning of the $(m_1+3)$-th line among the $(m_1+3)$-th line and the $(m_1+4)$-th line, number-of-samples information representing the number of audio samples of the audio stream #1 multiplexed in the multiplexed video frame for input illustrated in FIG. 24 is inserted. Further, subsequently to the number-of-samples information, the audio data of the audio stream #1 is inserted in the entirety of the $(m_1+3)$-th line and up to the middle of the $(m_1+4)$-th line.

The $(m_1+5)$-th line and the $(m_1+6)$-th line are allocated to the audio data of the audio stream #2.

At the beginning of the $(m_1+5)$-th line among the $(m_1+5)$-th line and the $(m_1+6)$-th line, number-of-samples information representing the number of audio samples of the audio stream #2 multiplexed in the multiplexed video frame for input illustrated in FIG. 24 is inserted. Further, subsequently to the number-of-samples information, the audio data of the audio stream #2 is inserted in the entirety of the $(m_1+5)$-th line and up to the middle of the $(m_1+6)$-th line.

The $(m_1+7)$-th line and the $(m_1+8)$-th line (the n-th line) are allocated to the audio data of the audio stream #3.

At the beginning of the $(m_1+7)$-th line among the $(m_1+7)$-th line and the $(m_1+8)$-th line, number-of-samples information representing the number of audio samples of the audio stream #3 multiplexed in the multiplexed video frame for input illustrated in FIG. 24 is inserted. Further, subsequently to the number-of-samples information, the audio data of the audio stream #3 is inserted in the entirety of the $(m_1+7)$-th line and up to the middle of the $(m_1+8)$-th line.

Information regarding the insertion positions of the respective streams of audio data is set in advance in the multiplexing circuit 42 that receives the multiplexed video frame for input and that inserts the audio data.

The size of the audio data to be inserted into the multiplexed video frame for input is determined using the data rate of the audio data to be processed by the individual multiplexing circuits 42, the frame frequency (one frame period) of the multiplexed video frame for input, and the like.

Therefore, the number of lines to be allocated as the number of lines into which each stream of audio data is to be inserted can be determined at the time of design. In the example of FIG. 24, two lines are allocated to each stream of audio data.

For example, the number of lines of the audio area $A_2$ may be set so as to be the same as the sum of lines allocated to the individual streams of audio data. Also in the example of FIG. 24, the number of lines of the audio area $A_2$ is set accordingly.

As described above, the frames to be attached are interleaved line by line of a frame so as not to overlap each other, and are attached from bottom to top in the video area $A_1$ of the multiplexed video frame for input. Further, the audio data items to be inserted are inserted into the audio area $A_2$ defined below the video area $A_1$ using, for example, all the lines of the audio area $A_2$.

As viewed in the entire multiplexed video frame for input, the individual streams of data are arranged from bottom to top.

Therefore, even when a plurality of streams of data are multiplexed using a multiplexed video frame for input and are input to the processor 43, the input delay can be reduced. The input delay is represented by the difference between the time at which the data to be processed by the processor 43 is input to the information processing apparatus 1 and the time at which the data is input to the processor 43.

Figure 25:
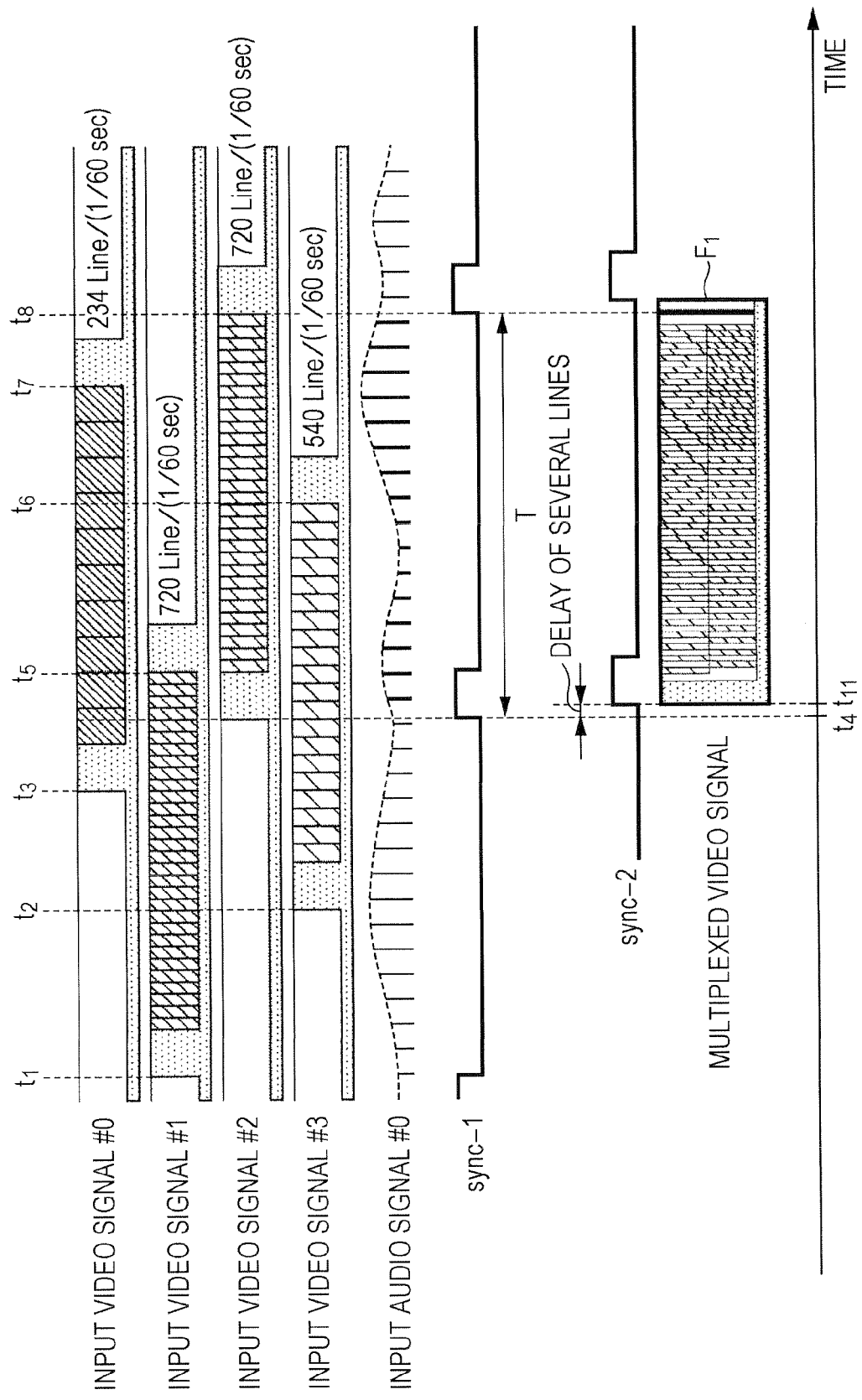
FIG. 25 is a diagram illustrating the advantages of bottom-to-top arrangement.

FIG. 25 is a diagram illustrating the advantages of bottom-to-top arrangement. In FIG. 25, the abscissa represents time.

In the example of FIG. 25, the video data (input video signals) of the video streams #0 to #3 are input at different timings.

For example, the data of one certain frame of the video stream #0 is input to the information processing apparatus 1 at the timing of time $t_3$ to time $t_7$. Further, the data of one certain frame of the video stream #1 is input to the information processing apparatus 1 at the timing of time $t_1$ to time $t_5$.

The data of one certain frame of the video stream #2 is input to the information processing apparatus 1 at the timing of time $t_4$ to time $t_8$. The data of one certain frame of the video stream #3 is input to the information processing apparatus 1 at the timing of time $t_2$ to time $t_6$.

For example, for video, a video frame for which the data of the last line is input within the period of one frame of the multiplexed video frame for input is attached to a multiplexed video frame for input that is generated during the same period.

Therefore, in this case, the frames of the video streams #0 to #3, which are indicated by hatching in the respective lines in FIG. 25, are multiplexed into a multiplexed video frame $F_1$ that is a multiplexed video frame for input (multiplexed video signal) generated during a period of time T from time $t_4$ to time $t_8$.

The data of the last line of the frame of the video stream #0, which is indicated by hatching in the respective line, is input at a time immediately before the time $t_7$ within the period of time T. Similarly, the data of the last line of the frames of the video streams #1 to #3, which are indicated by hatching in the respective lines, is input at a time within the period of time T.

For audio, as described above, audio samples input during the period of one frame of the multiplexed video frame for input are inserted together with the number-of-samples information into a multiplexed video frame for input that is generated during the same period.

Therefore, in the example of FIG. 25, audio samples that are indicated by bold lines, which are included in the period of time T, among the audio samples of the audio stream #0 are inserted into the multiplexed video frame $F_1$. While in FIG. 25, only the audio stream #0 is illustrated, the other streams of audio data are also inserted into the multiplexed video frame $F_1$ in a similar manner.

The period of one frame of the multiplexed video frame for input is defined by a synchronization signal generated by the multiplexed video signal generating circuit 41. In FIG. 25, a synchronization signal sync-1 represents a synchronization signal generated by the multiplexed video signal generating circuit 41.

In the example of FIG. 25, the synchronization signal sync-1 is synchronized with the synchronization signal for the video stream #2. As described below, a video synchronization signal input from the outside may also be used as a synchronization signal for defining one frame period of a multiplexed video frame for input.

A synchronization signal sync-2 represents a synchronization signal for defining one frame period of the multiplexed video frame for input, which is output from the multiplexing circuit 42 in the last stage that outputs the multiplexed video frame for input to the processor 43. In accordance with the synchronization signal sync-2, a multiplexed video frame for input in which each stream of data has been multiplexed is output from the multiplexing circuit 42 in the last stage to the processor 43. In the example of FIG. 1, the multiplexing circuit 42-2 serves as the multiplexing circuit in the last stage.

Each of the multiplexing circuits 42 performs multiplexing after waiting for the input of data to be multiplexed. There is a difference between the time at which a multiplexed video frame for input is input from the multiplexed video signal generating circuit 41 or from the multiplexing circuit 42 in the preceding stage and the time at which the multiplexed video frame for input obtained after multiplexing by multiplexing data into the multiplexed video frame for input is output from a certain multiplexing circuit 42, in accordance with the time at which the last data item of the data to be multiplexed is input. Here, it is assumed that the time involved for the video receiving circuits 21 or the audio receiving circuits 31 to receive data or the time involved for the frame memories 23 or the memories 33 to temporarily store data is negligible.

The timings (the time of a value of 1) of the synchronization signals sync-1 and sync-2 which are close to each other mean a small difference between the time at which a multiplexed video frame for input is output from the multiplexed video signal generating circuit 41 and the time at which a multiplexed video frame for input obtained after multiplexing is input to the processor 43. In other words, the timings of the synchronization signals sync-1 and sync-2 which are close to each other mean that the input delay is reduced.

Based on this assumption, the bottom-to-top insertion of data into a multiplexed video frame for input will now be described.

The multiplexed video frame $F_1$ illustrated in FIG. 25 represents a multiplexed video frame for input obtained after multiplexing in which the respective data items have been inserted from bottom to top in the manner as described with reference to FIGS. 20 to 24.

As illustrated in FIG. 25, when plotted on the time axis running from left to right, the video area $A_1$ is indicated in the left portion in the multiplexed video frame $F_1$, and the audio area $A_2$ in the right portion. In FIG. 25, a bold line in the right portion of the multiplexed video frame $F_1$ indicates the audio data of the audio stream #0 inserted in the audio area $A_2$.

The data of the last line of the frame of the video stream #0 to be attached to the multiplexed video frame $F_1$ can be inserted after the time immediately before the time $t_7$ at which the data is input. If the data of the last line of the frame of the video stream #0 is to be inserted into the upper portion (earlier in time) of the video area $A_1$ of the multiplexed video frame $F_1$, the time of the line of the multiplexed video frame $F_1$, which corresponds to the insertion position, may be later than the time $t_7$. As an image, the entire multiplexed video frame $F_1$ is at a position to the right relative to the position illustrated in FIG. 25.

Therefore, in order to reduce the input delay, it is preferable that the data of the last line of the frame of the video stream #0 be inserted at a position corresponding to a time later than the time immediately before the time $t_7$ of the multiplexed video frame $F_1$. The data input before the time at which the data is actually inserted is recorded on a memory until the insertion time.

Further, the data of the last line of the frame of the video stream #2 to be multiplexed into the multiplexed video frame $F_1$ can be inserted after the time immediately before the time $t_8$ at which the data is input (including the time immediately before the time $t_8$). If the data of the last line of the frame of the video stream #2 is to be inserted into the upper portion of the video area $A_1$ of the multiplexed video frame $F_1$, the time of the line of the multiplexed video frame $F_1$, which corresponds to the insertion position, may be later than the time immediately before the time $t_8$. As an image, the entire multiplexed video frame $F_1$ is at a position to the right relative to the position illustrated in FIG. 25.

Therefore, in order to reduce the input delay, it is preferable that the data of the last line of the frame of the video stream #2 be inserted at a position of the multiplexed video frame $F_1$ corresponding to a time later than the time immediately before the time $t_8$.

The same applies to the data of the last line of the frames of the video streams #1 and #3.

The data of the audio samples of the audio stream #0 to be inserted into the multiplexed video frame $F_1$ and the number-of-samples information are determined by the synchronization signal sync-1. After the time $t_8$ (including the time $t_8$) that is the end time of the period of time T, the audio data of the audio stream #0 can be inserted.

If the audio data of the audio stream #0 is to be inserted into the area defined in the upper portion of the multiplexed video frame $F_1$, the time of the line of the multiplexed video frame $F_1$, which corresponds to the insertion position, may be later than the time $t_8$. As an image, the entire multiplexed video frame $F_1$ is at a position to the right relative to the position illustrated in FIG. 25.

Therefore, in order to reduce the input delay, it is preferable that the audio data of the audio stream #0 be inserted at a position corresponding to a time later than the time $t_8$ of the multiplexed video frame $F_1$.

Accordingly, frames of video data of individual video streams are interleaved line-by-line and are inserted from bottom to top in the video area $A_1$, and audio data of individual audio streams is inserted into the audio area $A_2$ defined below the video area $A_1$, so that the data of the entire multiplexed video frame for input can be arranged from bottom to top, thus allowing reduction in input delay.

In the example of FIG. 25, the input delay is reduced to the time corresponding to several lines, which is the difference between time $t_4$ and time $t_{11}$ at which the multiplexed video frame $F_1$ starts to be input to the processor 43.

As illustrated in FIG. 25, if the frame data of the video streams #0 to #3 are input at different timings, the video data of the stream for which the data of the last line is input earlier is processed by a multiplexing circuit 42 in an earlier stage. The video data of the stream for which the data of the last line is input later is processed by a multiplexing circuit 42 in a later stage. Therefore, as described above, the lines of the video frames can be inserted from bottom to top.

Further, the audio data is processed by a multiplexing circuit 42 in a later stage than the multiplexing circuits 42 that process the video data. Therefore, as described above, audio data can be inserted into the audio area $A_2$ defined in the lower portion of the multiplexed video frame for input.

The multiplexing circuits 42-1 to 42-4 illustrated in FIG. 1 may be integrated into a single circuit. The resulting single circuit may multiplex all the data items, without taking into account which stream of data and which multiplexing circuit 42 among the plurality of multiplexing circuits 42 connected in series in the manner as illustrated in FIG. 1 is to process that stream of data.

Figure 26:
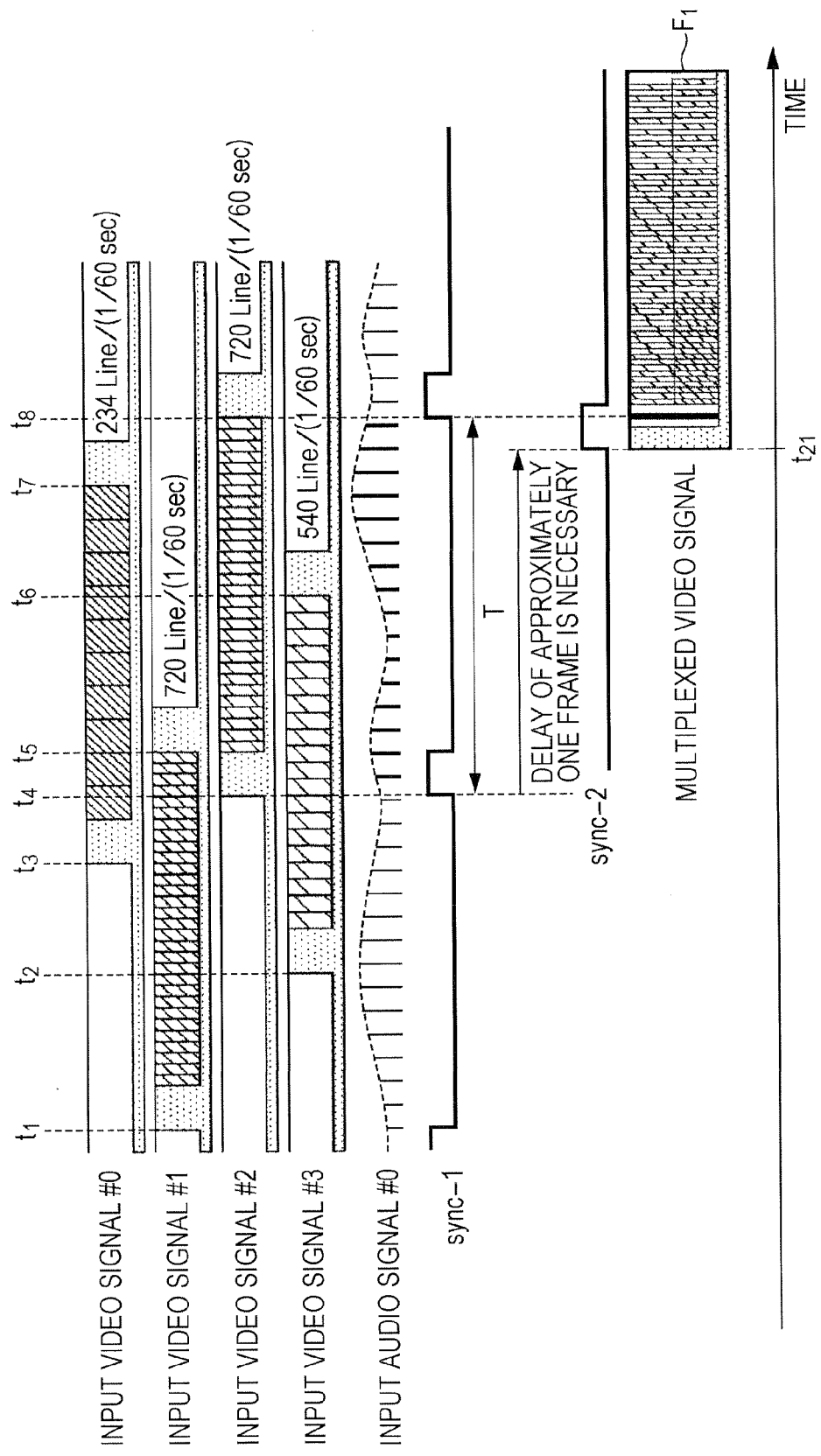
FIG. 26 is a diagram illustrating the disadvantages of the insertion of audio data above video data.

FIG. 26 is a diagram illustrating the disadvantages of the insertion of audio data above video data.

In FIG. 26, the input timings of the individual data items and the timing of the synchronization signal sync-1 are the same as the timings illustrated in FIG. 25. That is, the data to be inserted into the multiplexed video frame for input generated by the multiplexed video signal generating circuit 41 during the period of time T is the same as the data described with reference to FIG. 25. Redundant description will be omitted as appropriate.

In the example of FIG. 26, an area for audio is defined in the upper portion of the multiplexed video frame for input, and an area for video is defined below the area for audio.

In this case, after time $t_8$, as described above, the audio data of the audio stream #0 can be inserted. Thus, the insertion position of the audio data of the audio stream #0 defined in the upper portion of the multiplexed video frame $F_1$ is a position corresponding to a time after time $t_8$.

Therefore, as illustrated in FIG. 26, time $t_{21}$ at which the multiplexed video frame $F_1$ starts to be input to the processor 43 is later than the time $t_{11}$ illustrated in FIG. 25. The input delay is substantially equal to the time corresponding to one frame period of the multiplexed video frame $F_1$, which is equal to the difference between time $t_4$ and time $t_{21}$.

Figure 27:
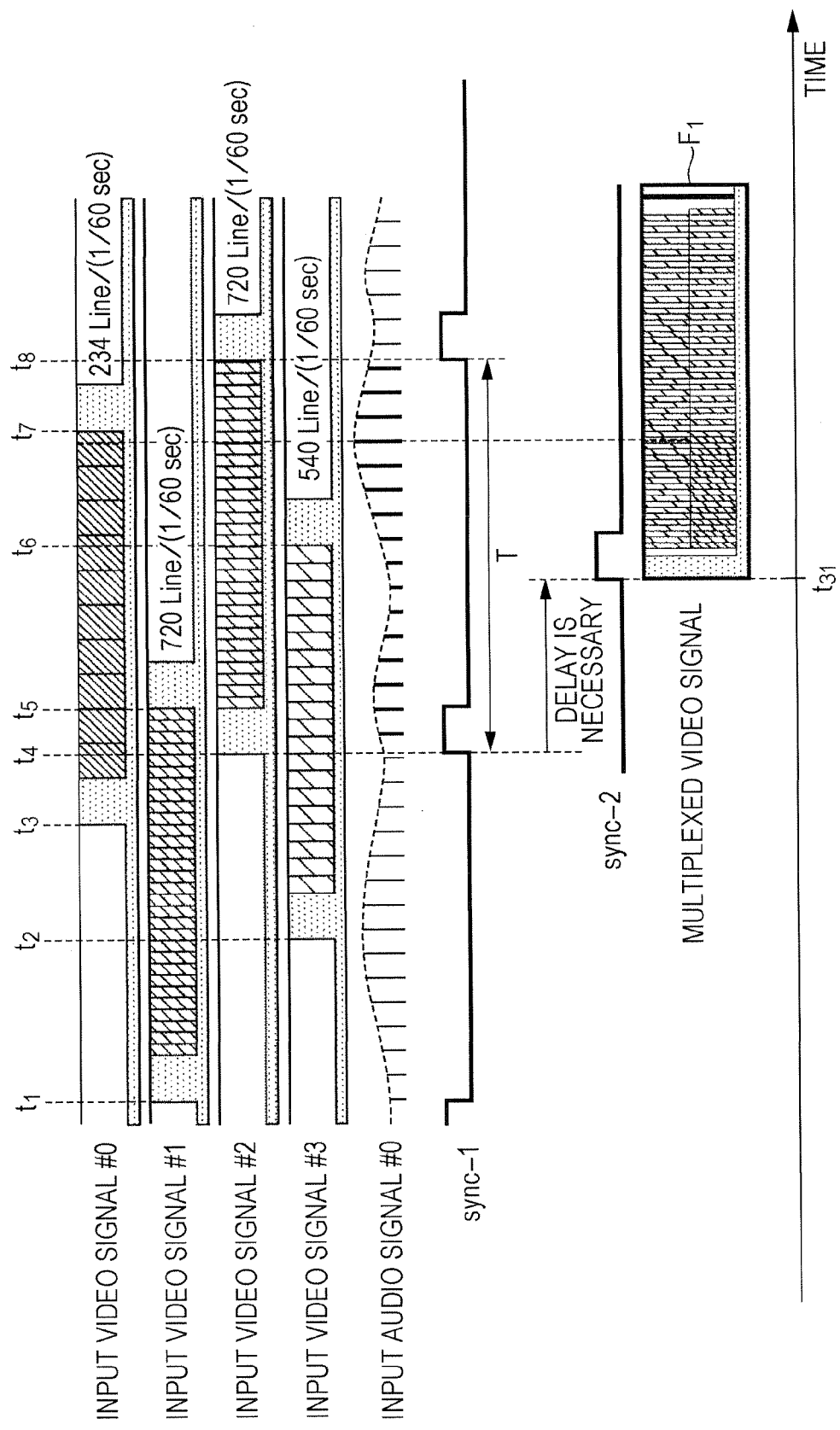
FIG. 27 is a diagram illustrating the disadvantages of top-to-bottom arrangement of video.

FIG. 27 is a diagram illustrating the disadvantages of the top-to-bottom attachment of video frames.

In FIG. 27, the input timings of the individual data items and the timing of the synchronization signal sync-1 are the same as the timings illustrated in FIG. 25. Redundant description will be omitted as appropriate.

In the example of FIG. 27, similarly to the case of FIG. 25, a video area $A_1$ is defined in the upper portion of a multiplexed video frame for input, and an audio area $A_2$ is defined below the video area $A_1$.

It is assumed that the lines of the frame of the video stream #0 are inserted from top to bottom in the video area $A_1$ of the multiplexed video frame for input. In this case, the insertion position of the data of the last line of the frame of the video stream #0 in the multiplexed video frame $F_1$ is a position corresponding to the time immediately before the time $t_7$ at which the data of the last line is input (including the time immediately before the time $t_7$).

Thus, as illustrated in FIG. 27, time $t_{31}$ at which the multiplexed video frame $F_1$ starts to be input to the processor 43 is later than the time $t_{11}$ illustrated in FIG. 25. The input delay is the time represented by the difference between time $t_4$ and time $t_{31}$.

Multiplexing Operation Using Multiplexed Video Frame for Output

Next, a multiplexing operation using a multiplexed video frame for output will be described.

In a multiplexed video frame for output, individual streams of data that have been extracted from the multiplexed video frame for input and that have been subjected to various processing are multiplexed. That is, the multiplexing of data (data obtained after processing) using a multiplexed video frame for output is performed by the processor 43.

In the processor 43, unlike the multiplexing operation using a multiplexed video frame for input, individual streams of data are inserted from top to bottom.

Figure 28:
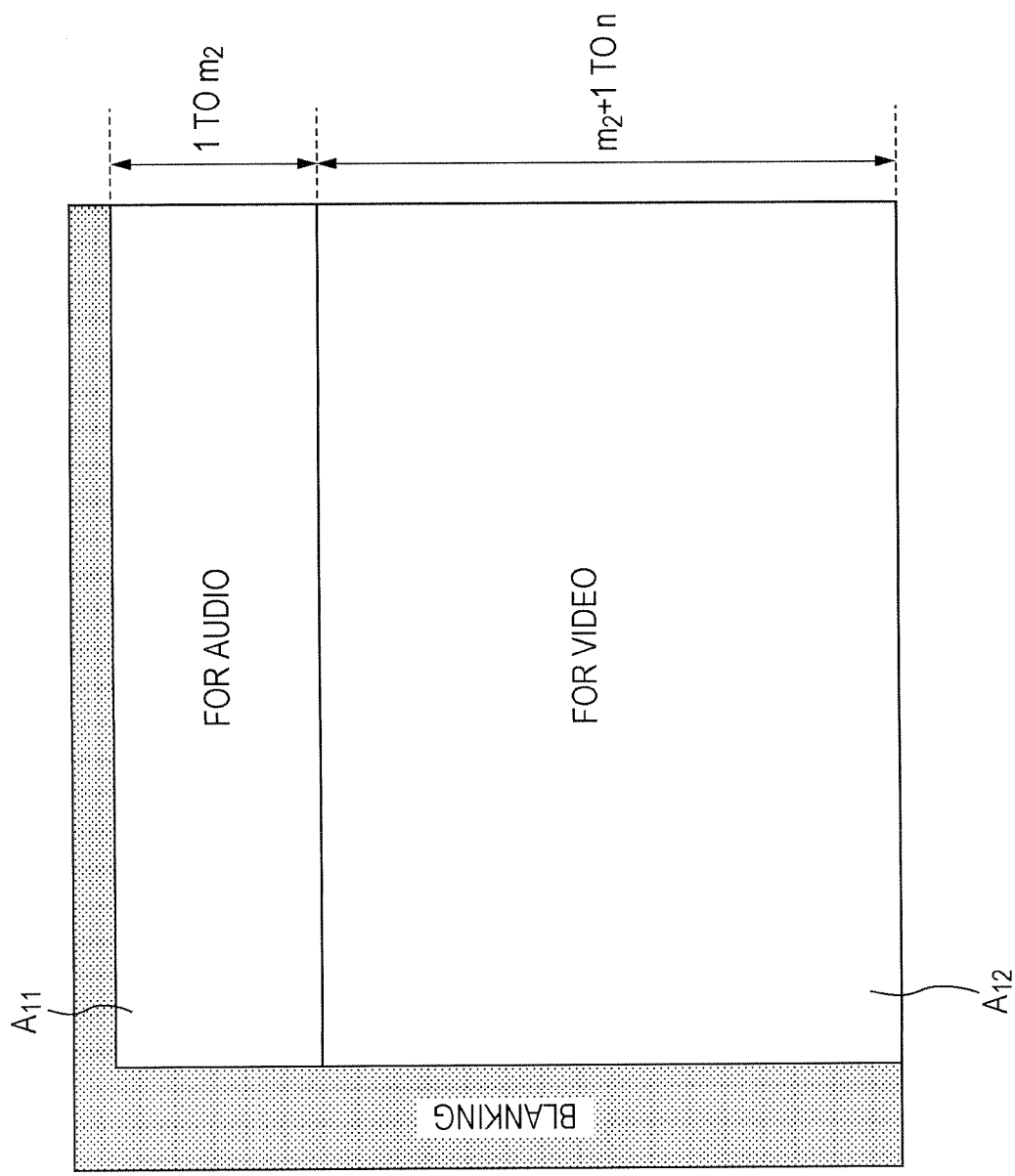
FIG. 28 is a diagram illustrating an example of the area configuration of a multiplexed video frame for output.

FIG. 28 is a diagram illustrating an example of the area configuration of a multiplexed video frame for output.

As illustrated in FIG. 28, the multiplexed video frame for output is provided with a blanking region extending in the horizontal and vertical directions thereof. In the example of FIG. 28, an area from the first line to the $m_2$-th line within an effective image frame is set as an audio area $A_{11}$ that is an area for video. Further, an area from the $(m_2+1)$-th line to the n-th line that is the last line within the effective image frame is set as a video area $A_{12}$ that is an area for video.

In this manner, the audio area $A_{11}$ is defined in the upper portion of the multiplexed video frame for output, and the video area $A_{12}$ is defined below the audio area $A_{11}$.

Figure 29:
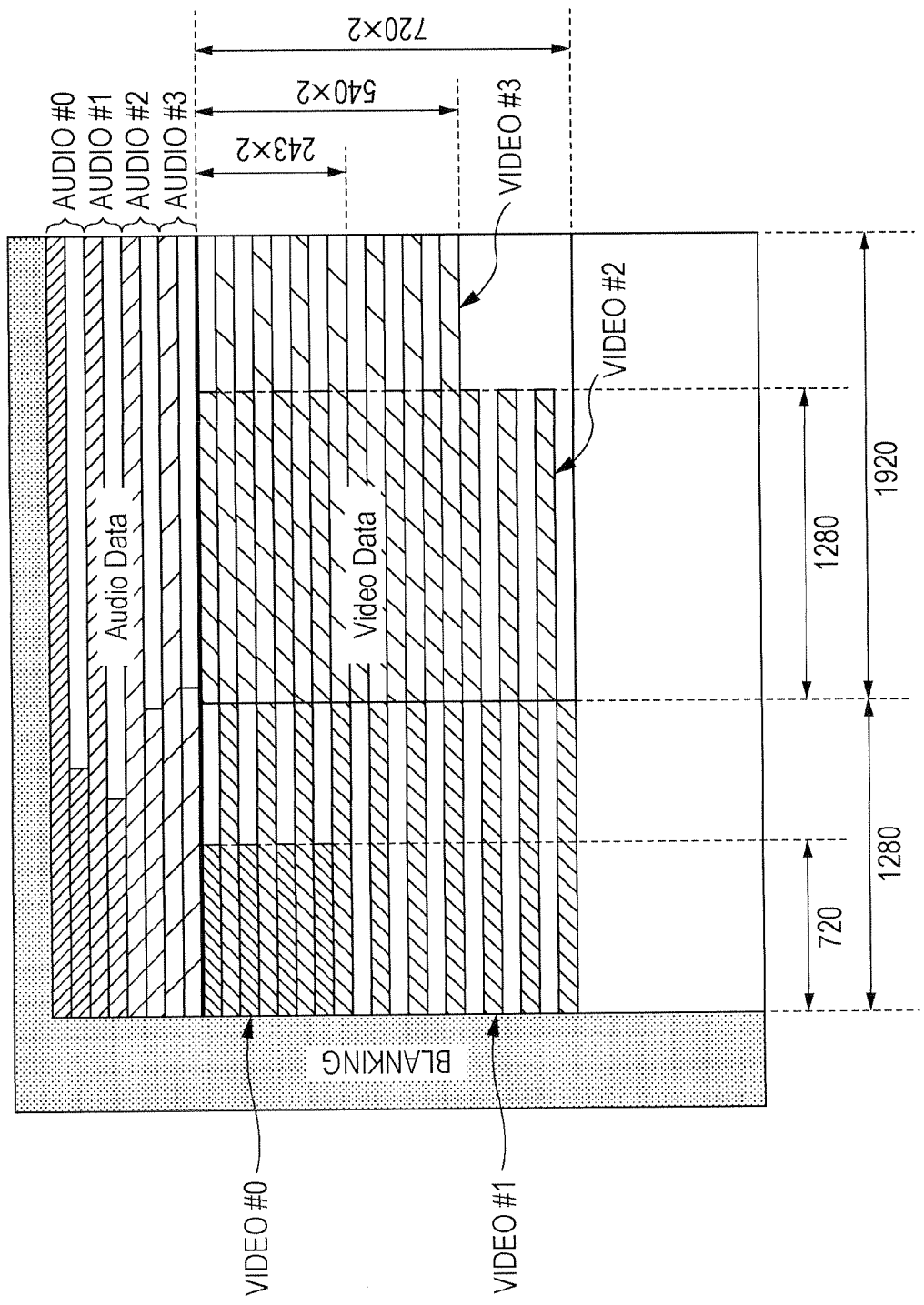
FIG. 29 is a diagram illustrating an example of a multiplexed video frame obtained after multiplexing.

FIG. 29 is a diagram illustrating an example of a multiplexed video frame for output which is obtained after multiplexing by the processor 43.

When a multiplexed video frame for input is input, the processor 43 extracts the data of the frames of the video streams #0 to #3 and the audio data of the audio streams #0 to #3, and performs processing as desired. The data of the frames of the video streams #0 to #3 and the audio data of the audio streams #0 to #3 on which processing has been performed as desired are inserted into a multiplexed video frame for output.

As illustrated in FIG. 29, the audio data of the audio streams #0 to #3 is inserted tightly into the audio area $A_{11}$ of the multiplexed video frame for output, starting from the left end of each line.

In the example of FIG. 29, the first line, which is the start position of the audio area $A_{11}$, and the second line are allocated to the audio data of the audio stream #0.

At the beginning (left end) of the first line among the first line and the second line, number-of-samples information representing the number of audio samples of the audio stream #0 multiplexed in the multiplexed video frame for output illustrated in FIG. 29 is inserted. Further, subsequently to the number-of-samples information, the audio data of the audio stream #0 is inserted in the entirety of the first line and up to the middle of the second line.

In the example of FIG. 29, furthermore, the third line and the fourth line are assigned to the audio data of the audio stream #1.

At the beginning of the third line among the third line and the fourth line, number-of-samples information representing the number of audio samples of the audio stream #1 multiplexed in the multiplexed video frame for output illustrated in FIG. 29 is inserted. Further, subsequently to the number-of-samples information, the audio data of the audio stream #1 is inserted in the entirety of the third line and up to the middle of the fourth line.

The fifth line and the sixth line are allocated to the audio data of the audio stream #2.

At the beginning of the fifth line among the fifth line and the sixth line, number-of-samples information representing the number of audio samples of the audio stream #2 multiplexed in the multiplexed video frame for output illustrated in FIG. 29 is inserted. Further, subsequently to the number-of-samples information, the audio data of the audio stream #2 is inserted in the entirety of the fifth line and up to the middle of the sixth line.

The seventh line and the eighth line (the $m_2$-th line) are allocated to the audio data of the audio stream #3.

At the beginning of the seventh line among the seventh line and the eighth line, number-of-samples information representing the number of audio samples of the audio stream #3 multiplexed in the multiplexed video frame for output illustrated in FIG. 29 is inserted. Further, subsequently to the number-of-samples information, the audio data of the audio stream #3 is inserted in the entirety of the seventh line and up to the middle of the eighth line.

Information regarding the insertion positions of the individual streams of audio data is set in advance in the processor 43.

The size of the audio data to be inserted into the multiplexed video frame for output is determined using the data rate of the audio data, the frame frequency of the multiplexed video frame for input, the content of the processing performed by the processor 43, and the like.

Therefore, the number of lines to be allocated as the number of lines into which each stream of audio data is to be inserted can be determined at the time of design. In the example of FIG. 29, two lines are allocated to each stream of audio data.

For example, the number of lines of the audio area $A_{11}$ may be set so as to be the same as the sum of lines allocated to the individual streams of audio data. Also in the example of FIG. 29, the number of lines of the audio area $A_{11}$ is set accordingly.

Further, the frames to be attached are interleaved line by line of a frame so as not to overlap each other, and are attached from top to bottom in the video area $A_{12}$ of the multiplexed video frame for output.

In the example of FIG. 29, the lines of the frame of the video stream #0 are inserted in the horizontal direction within a range of 720 pixels to the right from the left end of the effective image frame. Further, the lines of the frame of the video stream #0 are inserted in the vertical direction within a range of 243×2 lines downward from the $(m_2+1)$-th line (in the example described above, the ninth line) that is the top line of the video area $A_{12}$. The number of lines in one field, i.e., 243 lines, are inserted every other line although, in FIG. 29, four lines are illustrated as lines of the frame of the video stream #0.

Further, the lines of the frame of the video stream #1 are inserted in the horizontal direction within a range of 1280 pixels to the right from the left end of the effective image frame, and are inserted in the vertical direction within a range of 720×2 lines downward from the $(m_2+1)$-th line that is the top line of the video area $A_{12}$. The number of lines of one frame, i.e., 720 lines, are inserted every other line so as not to overlap the lines of the frame of the video stream #0 although, in FIG. 29, ten lines are illustrated as lines of the frame of the video stream #1.

The lines of the frame of the video stream #2 are inserted in the horizontal direction within a range of 1280 pixels to the right from the 1281st pixel, where the pixel at the left end of the effective image frame is used as the first pixel. Further, the lines of the frame of the video stream #2 are inserted in the vertical direction within a range of 720×2 lines downward from the $(m_2+1)$-th line that is the top line of the video area $A_{12}$. The number of lines of one frame, i.e., 720 lines, are inserted every other line although, in FIG. 29, ten lines are illustrated as lines of the frame of the video stream #2.

The lines of the frame of the video stream #3 are inserted in the horizontal direction within a range of 1920 pixels to the right from the 1281st pixel, where the pixel at the left end of the effective image frame is used as the first pixel. Further, the lines of the frame of the video stream #3 are inserted in the vertical direction within a range of 540×2 lines downward from the $(m_2+1)$-th line that is the top line of the video area $A_{12}$. The number of lines in one field, i.e., 540 lines, are inserted every other line so as not to overlap the lines of the frame of the video stream #2 although, in FIG. 29, seven lines are illustrated as lines of the frame of the video stream #3.

In the illustrated example, the number of pixels per horizontal line of the effective image frame of the multiplexed video frame for output is also set to 3200. The size of the multiplexed video frame for input may be made different from the size of the multiplexed video frame for output.

Information regarding the insertion positions of lines of each frame is set in advance in the processor 43.

In this manner, as viewed in the entire multiplexed video frame for output, the individual streams of data are inserted from top to bottom.

Therefore, even when a plurality of streams of data are multiplexed using a multiplexed video frame for output and are output from the processor 43, the output delay can be reduced. The output delay is represented by the difference between the time at which data obtained after processing is output from the processor 43 and the time at which the data obtained after processing is output to the outside of the information processing apparatus 1.

Figure 30:
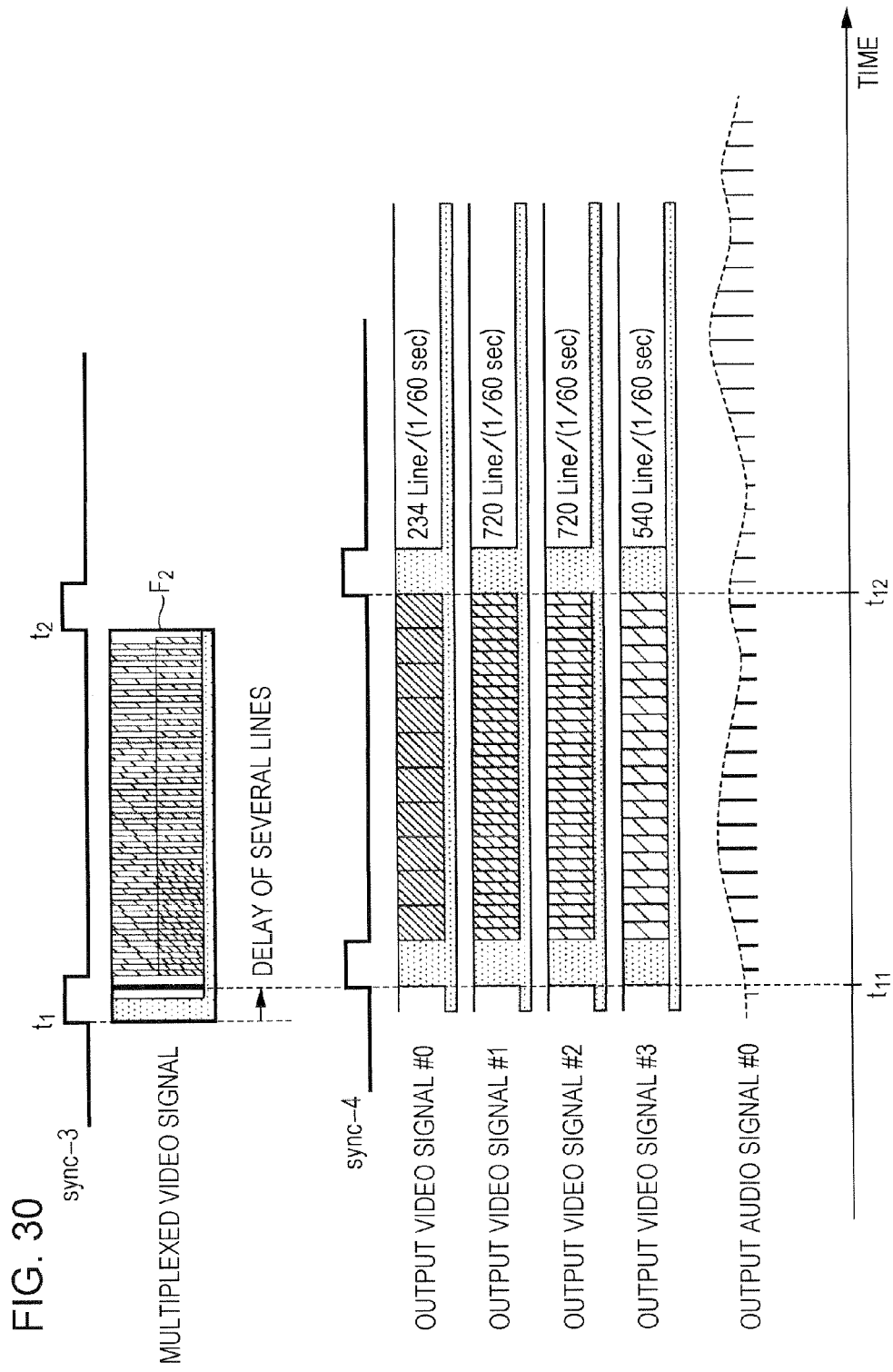
FIG. 30 is a diagram illustrating the advantages of top-to-bottom arrangement.

FIG. 30 is a diagram illustrating the advantages of top-to-bottom arrangement. In FIG. 30, the abscissa represents time.

A multiplexed video frame $F_2$ illustrated in FIG. 30 represents a multiplexed video frame for output that is output from the processor 43. A synchronization signal sync-3 is a synchronization signal output from the processor 43, and defines one frame period of the multiplexed video frame $F_2$. The multiplexed video frame $F_2$ is output from the processor 43 during a period of time from time $t_1$ to time $t_2$.

The data of the frames of the video sequences streams #0 to #3, which are indicated by hatching in the respective lines, represents data (output video signals) that have been extracted from the multiplexed video frame $F_2$ and that have been output from the video transmitting circuits 53 to the outside of the information processing apparatus 1. Further, the data of the audio samples of the audio stream #0, which is indicated by a bold line, represents data (output audio signals) that have been extracted from the multiplexed video frame $F_2$ and that have been output from the audio transmitting circuits 63 to the outside of the information processing apparatus 1.

For example, data multiplexed in the same multiplexed video frame for output is output to the outside of the information processing apparatus 1 at the same timing in accordance with the synchronization signal output from the timing generating circuit 44.

A synchronization signal sync-4 illustrated in FIG. 30 is a synchronization signal that is generated by the timing generating circuit 44 and that is supplied to the video transmitting circuits 53 and the audio transmitting circuits 63. The individual streams of data extracted from the multiplexed video frame $F_2$ are output to the outside of the information processing apparatus 1 during a period of time from time $t_{11}$ to time $t_{12}$.

In each of the video transmitting circuits 53, after the data of a frame to be output is extracted from the multiplexed video frame for output, the data can be output.

Further, in each of the audio transmitting circuits 63, after the data of audio samples to be output is extracted from the multiplexed video frame for output, the data can be output.

If data multiplexed in the same multiplexed video frame for output is output at the same timing, in order to allow the video transmitting circuits 53 and the audio transmitting circuits 63 to output the data, all the video transmitting circuits 53 and the audio transmitting circuits 63 receive data to be output which has been extracted from the same multiplexed video frame for output.

There is a difference between the time at which a multiplexed video frame for output is output from the processor 43 and the time at which the data is output to the outside, in accordance with the time at which the top data item in the data to be output is input to each of the video transmitting circuits 53 and each of the audio transmitting circuits 63. Here, it is assumed that the time involved for the extraction circuits 45 to extract data or the time involved for the frame memories 52 or the memories 62 to temporarily store data is negligible.

The timings (the time of a value of 1) of the synchronization signals sync-3 and sync-4 which are close to each other mean a small difference between the time at which a multiplexed video frame for output is output from the processor 43 and the time at which each stream of data is output to the outside. In other words, the timings of the synchronization signals sync-3 and sync-4 which are close to each other mean that the output delay is reduced.

Based on this assumption, the insertion of data from top to bottom in a multiplexed video frame for output will now be described.

If the audio data of the audio stream #0 is to be inserted in an area defined in the lower portion of the multiplexed video frame $F_2$, the time at which the audio data of the audio stream #0 starts to be output may be later than the time corresponding to the insertion position.

As an image, the output timing of the audio stream #0 may be at a position to the right relative to the position illustrated in FIG. 30. Since data extracted from the same multiplexed video frame for output is output at the same timing, the output timings of the video streams #0 to #3 are also at a position to the right relative to the position illustrated in FIG. 30.

Therefore, in order to reduce the output delay, it is preferable that the audio data of the audio stream #0 be inserted at a position early in the multiplexed video frame for output. Furthermore, the number of audio samples multiplexed in the multiplexed video frame for output is specified on the basis of the number-of-samples information and audio samples are extracted after the number of audio samples has been specified. Therefore, it is preferable that the number-of-samples information be inserted at the beginning of the corresponding line.

Furthermore, it is assumed that frames of individual video streams are interleaved line-by-line and are inserted from bottom to top in a multiplexed video frame for output. In this case, the output time of the data of the top line of the frame of the video stream #0 may be later than the time corresponding to the insertion position. In particular, the smaller the total number of lines of the frame of the video stream #0, the later the output time.

As an image, the output timing of the video stream #0 is at a position to the right relative to the position illustrated in FIG. 30. Since data extracted from the same multiplexed video frame for output is output at the same timing, the output timings of the video streams #1 to #3 and the output timing of the audio stream #0 are also at positions to the right relative to the positions illustrated in FIG. 30.

Therefore, in order to reduce the output delay, it is preferable that the data of the top line of the frame of the video stream #0 be inserted at an upper position in the upper portion of the video area $A_{12}$ of the multiplexed video frame $F_2$. The same applies to the video streams #1 to #3.

As can be seen from above, audio data of individual audio streams is inserted into the audio area $A_{11}$ defined in the upper portion of a multiplexed video frame for output, and, for video data of individual video streams, frames are interleaved line-by-line and are inserted from top to bottom in the video area $A_{12}$ defined below the audio area $A_{11}$ so that, as the entire multiplexed video frame for output, data can be arranged from top to bottom. Therefore, the output delay can be reduced.

In the example of FIG. 30, the output delay is reduced to the time corresponding to several lines, which is the difference between time $t_1$ at which the multiplexed video frame $F_2$ starts to be output from the processor 43 and time $t_{11}$ at which the data starts to be output to the outside.

Figure 31:
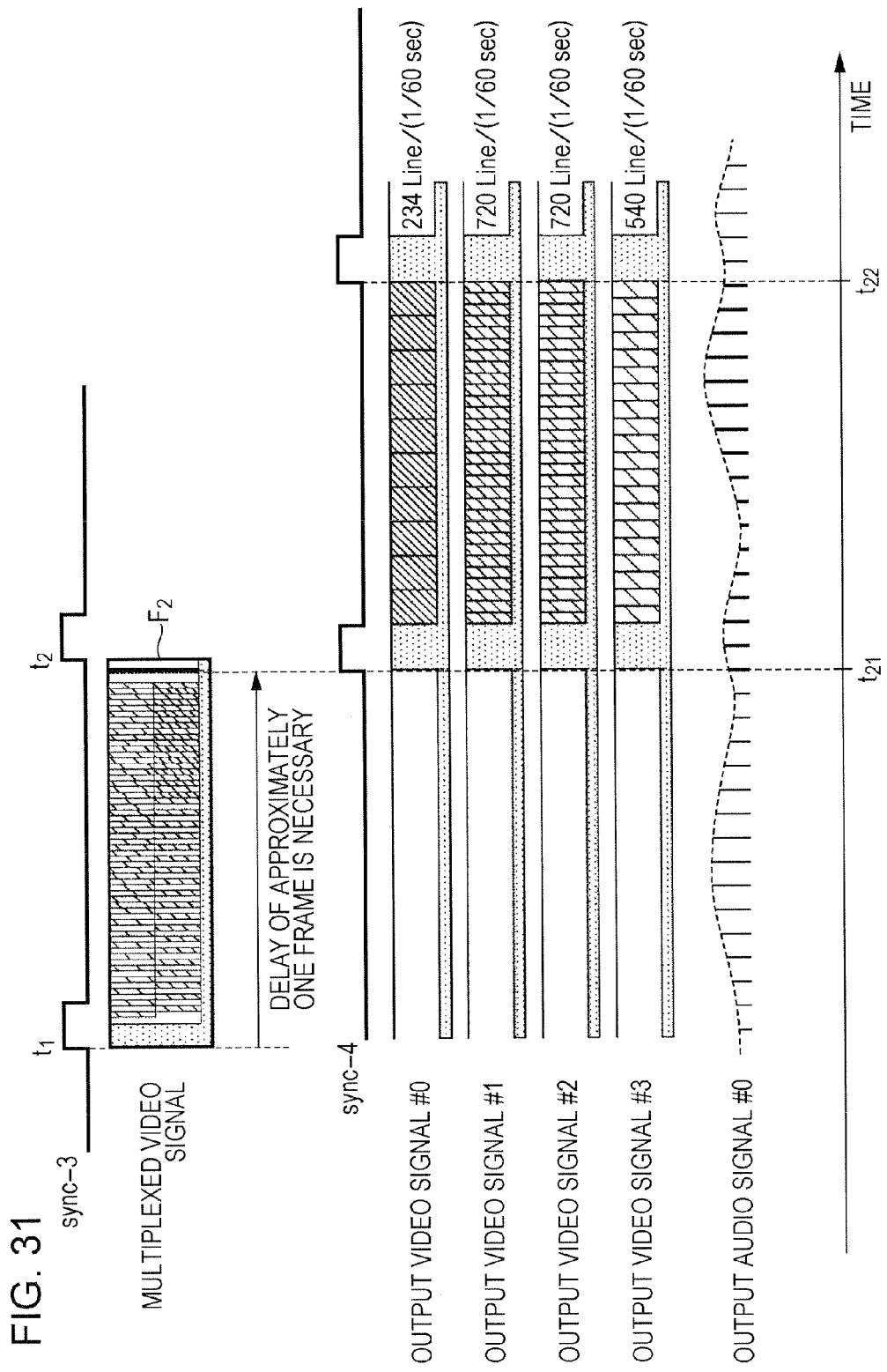
FIG. 31 is a diagram illustrating the disadvantages of the insertion of audio data below video data.

FIG. 31 is a diagram illustrating the disadvantages of the insertion of audio data below video data.

In FIG. 31, the timing of the synchronization signal sync-3 is the same as the timing illustrated in FIG. 30. Redundant description will be omitted as appropriate.

In the example of FIG. 31, an area for audio is defined in the lower portion of the multiplexed video frame for output, and an area for video is defined below the area for audio.

In this case, as illustrated in FIG. 31, the output time of the data of the top audio sample of the audio stream #0 is later than the time corresponding to the insertion position of the data in the multiplexed video frame $F_2$.

In addition, since the data extracted from the same multiplexed video frame for output is output at the same timing, time $t_{21}$ at which the individual streams of data extracted from the multiplexed video frame $F_2$ start to be output is later than the time $t_{11}$ illustrated in FIG. 30. The output delay is substantially equal to the time corresponding to one frame period of the multiplexed video frame $F_2$, which is equal to the difference between time $t_1$ and time $t_{21}$.

Figure 32:
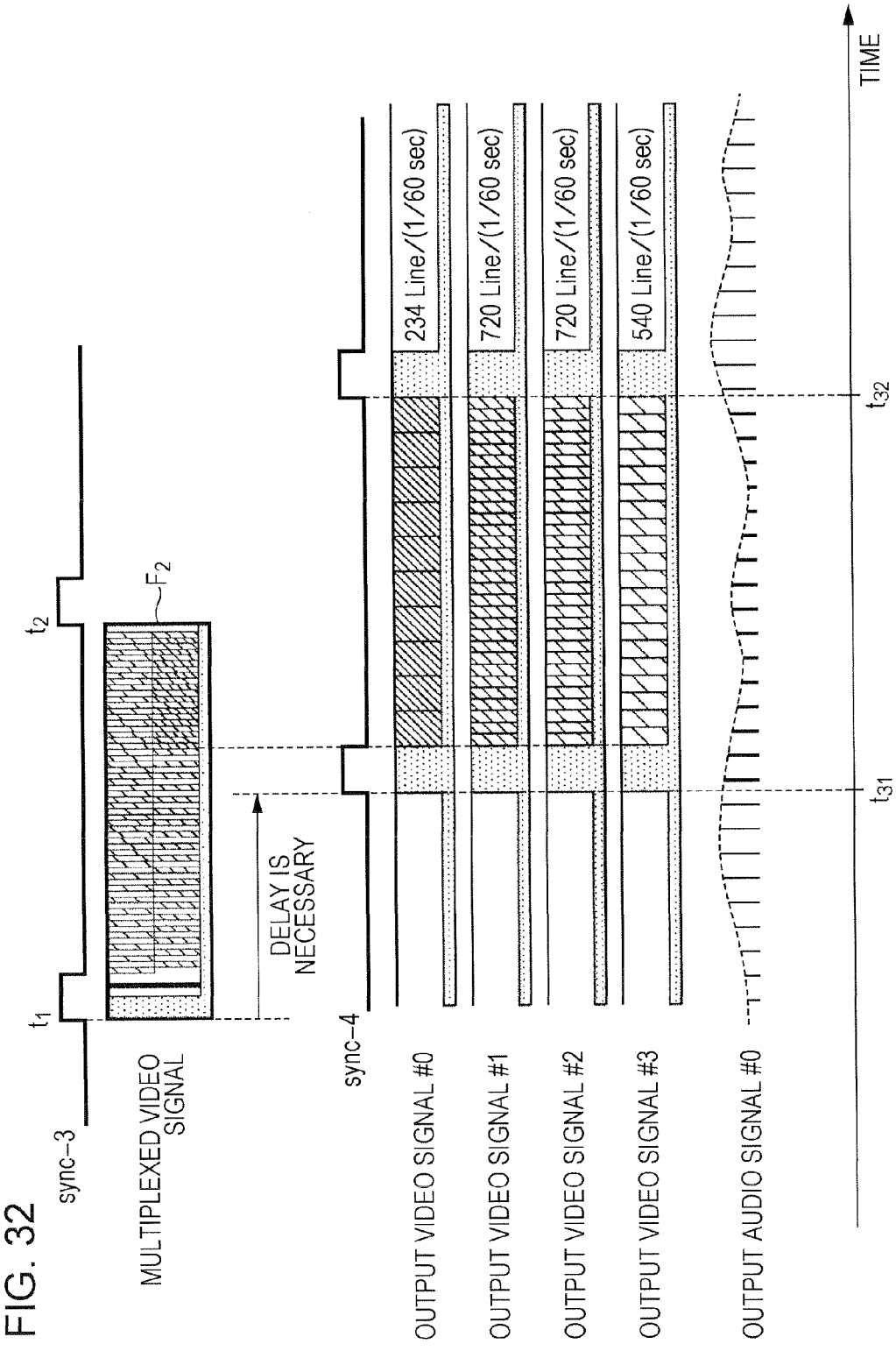
FIG. 32 is a diagram illustrating the disadvantages of bottom-to-top arrangement of video.

FIG. 32 is a diagram illustrating the disadvantages of the bottom-to-top attachment of video frames.

In FIG. 32, the timing of the synchronization signal sync-3 is the same as the timing illustrated in FIG. 30. Redundant description will be omitted as appropriate.

In the example of FIG. 32, similarly to the case of FIG. 30, an audio area $A_{11}$ is defined in the upper portion of a multiplexed video frame for output, and a video area $A_{12}$ is defined below the audio area $A_{11}$.

It is assumed that the data of the frame of the video stream #0 having a small number of lines is output. In this case, the data of the top line of the frame of the video stream #0 is inserted in the multiplexed video frame $F_2$ at a position below that when inserted from top to bottom. Thus, as indicated by a dotted line, the data of the top line of the frame of the video stream #0 is output at the time corresponding to the insertion position.

In addition, since the data extracted from the same multiplexed video frame for output is output at the same timing, time $t_{31}$ at which the individual streams of data extracted from the multiplexed video frame $F_2$ start to be output is later than the time $t_{11}$ illustrated in FIG. 30. The output delay is substantially equal to the time represented by the difference between time $t_1$ and time $t_{31}$.

Operation of Information Processing Apparatus

Here, a process of the information processing apparatus 1 will be described with reference to a flowchart of FIG. 33.

In the information processing apparatus 1 illustrated in FIG. 1, two streams of video data and two streams of audio data are multiplexed using a multiplexed video frame for input, and are input to the processor 43. Further, two streams of video data and two streams of audio data extracted from a multiplexed video frame for output in which data obtained after processing has been are multiplexed by the processor 43 is output to the outside.

In step S101, the video receiving circuits 21-1 and 21-2 perform a video receiving process. The data of the frames of the video stream #1 received by the video receiving circuit 21-1 is stored in the frame memory 23-1. Further, the data of the frames of the video stream #2 received by the video receiving circuit 21-2 is stored in the frame memory 23-2.

In step S102, the audio receiving circuits 31-1 and 31-2 perform an audio receiving process. The audio samples of the audio stream #1 input during one frame period of the multiplexed video frame and the number-of-samples information, which are cut out by the audio receiving circuit 31-1, are stored in the memory 33-1. Further, the audio samples of the audio stream #2 input during one frame period of the multiplexed video frame and the number-of-samples information, which are cut out by the audio receiving circuit 31-2, are stored in the memory 33-2.

In step S103, the multiplexed video signal generating circuit 41 generates a multiplexed video frame, and outputs data and a synchronization signal of the multiplexed video frame.

In step S104, a multiplexing process is performed. Specifically, one frame of the video stream #1 is attached to the multiplexed video frame by the multiplexing circuit 42-1, and one frame of the video stream #2 is attached to the multiplexed video frame by the multiplexing circuit 42-2. Further, the data of the audio samples of the audio stream #1 and the number-of-samples information are inserted into the multiplexed video frame by the multiplexing circuit 42-3, and the audio data of the audio stream #2 and the number-of-samples information are inserted into the multiplexed video frame by the multiplexing circuit 42-4.

In the multiplexing process, as described above, the individual data items are inserted from bottom to top in the multiplexed video frame for input.

In step S105, the processor 43 performs predetermined processing on the video data and audio data multiplexed in the data of the multiplexed video frame input to the video port.

In step S106, the processor 43 inserts the data obtained after processing into the multiplexed video frame from top to bottom. The processor 43 outputs the data of a multiplexed video frame for output in which the data obtained after processing has been multiplexed from the video port.

In step S107, an extraction process is performed. Specifically, the audio data of the audio stream #2 is extracted from the data of the multiplexed video frame by the extraction circuit 45-1, and the audio data of the audio stream #1 is extracted from the data of the multiplexed video frame by the extraction circuit 45-2. Further, the video data of the video stream #2 is extracted from the data of the multiplexed video frame by the extraction circuit 45-3, and the video data of the video stream #1 is extracted from the data of the multiplexed video frame by the extraction circuit 45-4.

In step S108, an audio output process is performed. The data of the audio stream #1 extracted from the data of multiplexed video frame is temporarily stored in the memory 62-1, and is then output to the outside sample-by-sample. Further, the data of the audio stream #2 is temporarily stored in the memory 62-2, and is then output to the outside sample-by-sample.

In step S109, a video output process is performed. The frame data of the video stream #1 extracted from the multiplexed video frame is temporarily stored in the frame memory 52-1, and is then output to the outside. Further, the frame data of the video stream #2 is temporarily stored in the frame memory 52-2, and is then output to the outside. After the video output process has been completed, the process ends.

Next, the video receiving process performed in step S101 of FIG. 33 will be described with reference to a flowchart of FIG. 34.

In step S111, the video receiving circuit 21-1 receives an input video signal, and performs various processing such as A/D conversion to generate data of frames of the video stream #1. The video receiving circuit 21-2 also performs similar processing to generate data of frames of the video stream #2.

In step S112, the frame synchronizer 22-1 causes the frame data of the video stream #1 generated by the video receiving circuit 21-1 to be stored in the frame memory 23-1. The frame synchronizer 22-2 also causes the frame data of the video stream #2 to be stored in the frame memory 23-2.

Figure 33:
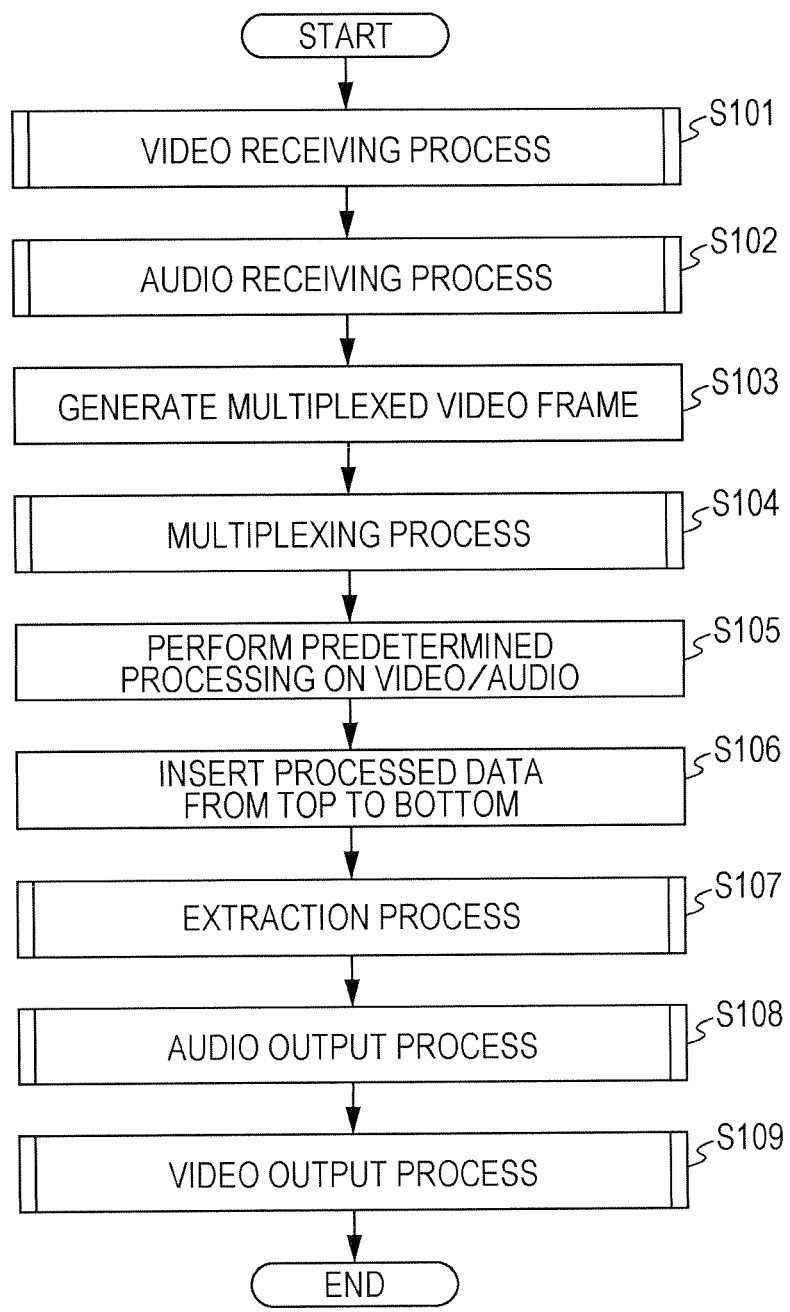
FIG. 33 is a flowchart illustrating a process of the information processing apparatus.
Figure 34:
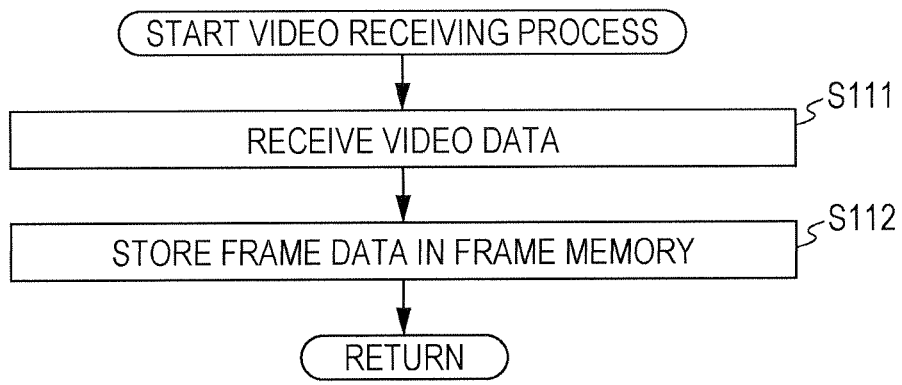
FIG. 34 is a flowchart illustrating a video receiving process performed in step S101 of FIG. 33.

After the frame data of the video streams #1 and #2 are stored in the frame memories 23, the process returns to step S101 of FIG. 33, and the subsequent processing is performed.

Figure 35:
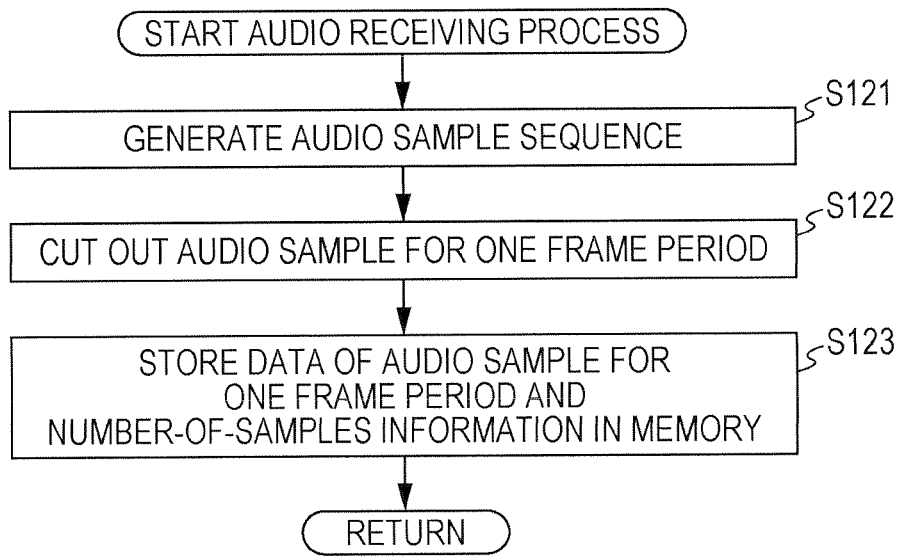
FIG. 35 is a flowchart illustrating an audio receiving process performed in step S102 of FIG. 33.

Next, the audio receiving process performed in step S102 of FIG. 33 will be described with reference to a flowchart of FIG. 35.

In step S121, the audio receiving circuit 31-1 receives an input audio signal, and performs processing such as A/D conversion to generate audio data of the audio stream #1 composed of a time sequence of audio samples. The audio receiving circuit 31-2 also performs similar processing to generate audio data of the audio stream #2.

In step S122, the audio receiving circuit 31-1 cuts out, while counting the number of samples, audio samples of the audio stream #1 that are input within one frame period of the multiplexed video frame. The audio receiving circuit 31-2 also performs similar processing, and cuts out audio samples of the audio stream #2 that are input within one frame period of the multiplexed video frame.

In step S123, the memory control circuit 32-1 causes the cut out audio samples of the audio stream #1 and the number-of-samples information to be stored in the memory 33-1. The memory control circuit 32-2 also causes the cut out audio samples of the audio stream #2 and the number-of-samples information to be stored in the memory 33-2.

After the audio samples of the audio streams #1 and #2 are stored in the memories 33, the process returns to step S102 of FIG. 33, and the subsequent processing is performed.

Figure 36:
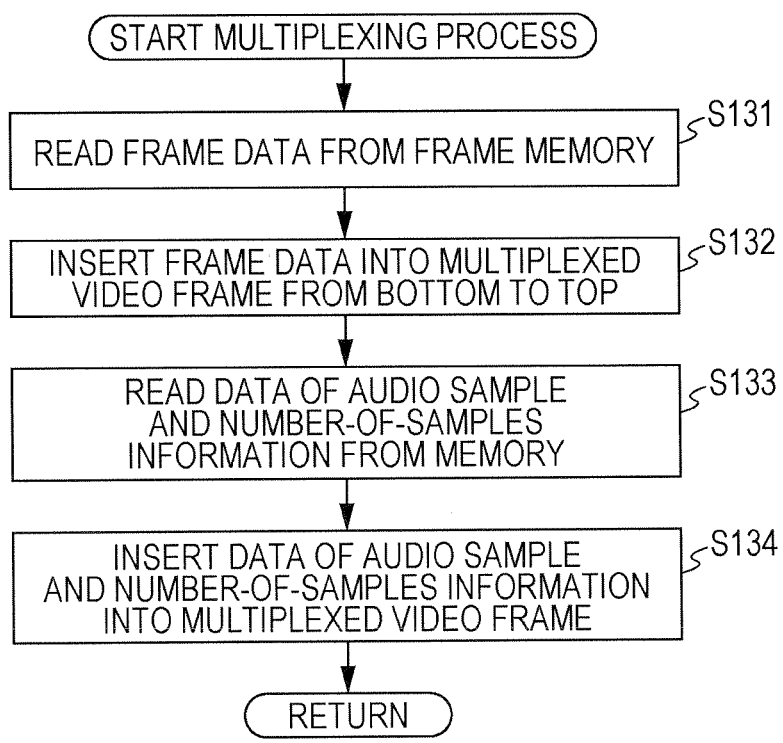
FIG. 36 is a flowchart illustrating a multiplexing process performed in step S104 of FIG. 33.

Next, the multiplexing process performed in step S104 of FIG. 33 will be described with reference to a flowchart of FIG. 36. The data of the multiplexed video frame generated in step S103 of FIG. 33 is supplied to the multiplexing circuit 42-1.

In step S131, the multiplexing circuit 42-1 requests the frame synchronizer 22-1 to read the frame data of the video stream #1 from the frame memory 23-1.

In step S132, the multiplexing circuit 42-1 interleaves line-by-line a frame of the video stream #1 whose data has been read from the frame memory 23-1, and inserts into the video area $A_1$ of the multiplexed video frame for input the frame from bottom to top.

Processing similar to that of steps S131 and S132 is also performed by the multiplexing circuit 42-2, and a frame of the video stream #2 whose data has been read from the frame memory 23-2 is inserted from bottom to top in the video area $A_1$ of the multiplexed video frame for input supplied from the multiplexing circuit 42-1.

In step S133, the multiplexing circuit 42-3 requests the memory control circuit 32-1 to read the audio data of the audio stream #1 and the number-of-samples information from the memory 33-1.

In step S134, the multiplexing circuit 42-3 inserts the audio data of the audio stream #1 and the number-of-samples information read from the memory 33-1 into the audio area A2 of the multiplexed video frame for input supplied from the multiplexing circuit 42-2.

Processing similar to that of steps S133 and S134 is also performed by the multiplexing circuit 42-4. The data of the audio samples of the audio stream #2 read from the memory 33-2 is inserted into the audio area A2 of the multiplexed video frame for input supplied from the multiplexing circuit 42-3, together with the number-of-samples information.

After all the streams of video data and audio data have been inserted from bottom to top in the multiplexed video frame for input, the process returns to step S104 of FIG. 33, and the subsequent processing is performed. The processor 43 performs processing on the video data and audio data multiplexed using the multiplexed video frame for input, and the data of a multiplexed video frame for output in which the data obtained after processing has been multiplexed is supplied to the extraction circuit 45-1.

Figure 37:
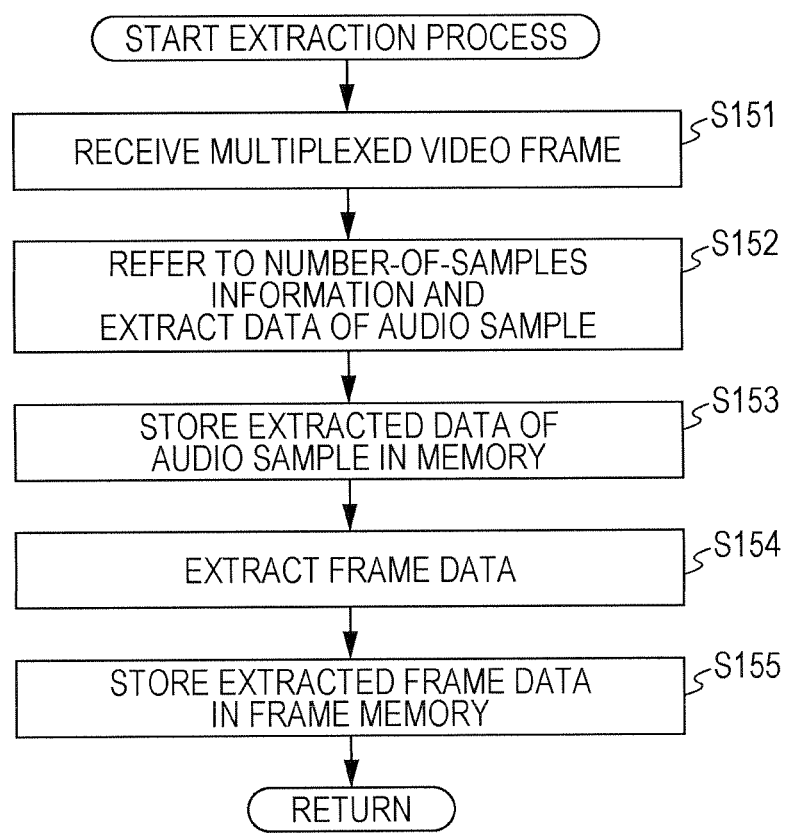
FIG. 37 is a flowchart illustrating an extraction process performed in step S107 of FIG. 33.

Next, the extraction process performed in step S107 of FIG. 33 will be described with reference to a flowchart of FIG. 37.

In step S151, the extraction circuit 45-1 receives the data of the multiplexed video frame output from the processor 43.

In step S152, the extraction circuit 45-1 refers to the number-of-samples information, and extracts the data of the audio samples of the audio stream #2 inserted from top to bottom, from the data of the multiplexed video frame.

In step S153, the memory control circuit 61-2 causes the data of the audio samples of the audio stream #2 extracted by the extraction circuit 45-1 to be stored in the memory 62-2.

Processing similar to that of steps S152 and S153 is also performed by the extraction circuit 45-2 and the memory control circuit 61-1, and the data of the audio samples of the audio stream #1 extracted from the multiplexed video frame for output is stored in the memory 62-1.

In step S154, the extraction circuit 45-3 extracts the frame data of the video stream #2 inserted from top to bottom, from the multiplexed video frame for output.

In step S155, the frame synchronizer 51-2 causes the frame data of the video stream #2 extracted by the extraction circuit 45-3 to be stored in the frame memory 52-2.

Processing similar to that of steps S154 and S155 is also performed by the extraction circuit 45-4 and the frame synchronizer 51-1, and the frame data of the video stream #1 extracted from the multiplexed video frame for output is stored in the frame memory 52-1.

After all the streams of video data and audio data have been extracted from the multiplexed video frame for output, the process returns to step S107 of FIG. 33, and the subsequent processing is performed.

Figure 38:
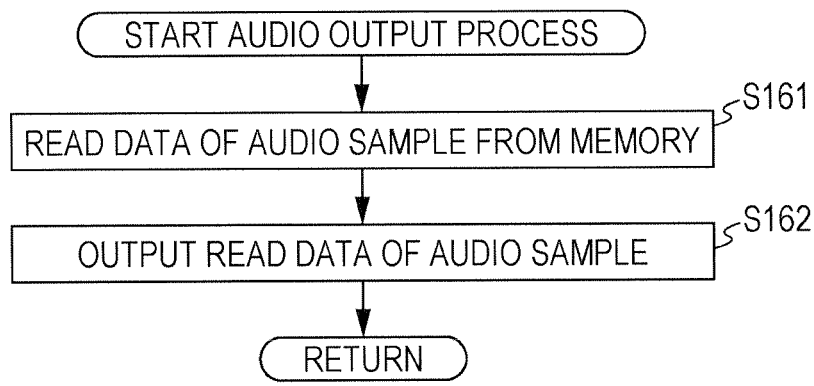
FIG. 38 is a flowchart illustrating an audio output process performed in step S108 of FIG. 33.

Next, the audio output process performed in step S108 of FIG. 33 will be described with reference to a flowchart of FIG. 38.

In step S161, the audio transmitting circuit 63-2 requests the memory control circuit 61-2 to read the data of the audio samples of the audio stream #2 from the memory 62-2.

In step S162, the audio transmitting circuit 63-2 outputs the audio data of the audio stream #2 read from the memory 62-2 to the outside in units of the data of one sample.

Processing similar to that of steps S161 and S162 is also performed by the audio transmitting circuit 63-1, and the audio data of the audio stream #1 read from the memory 62-1 is output to the outside.

After all the streams of audio data have been output, the process returns to step S108 of FIG. 33, and the subsequent processing is performed.

Figure 39:
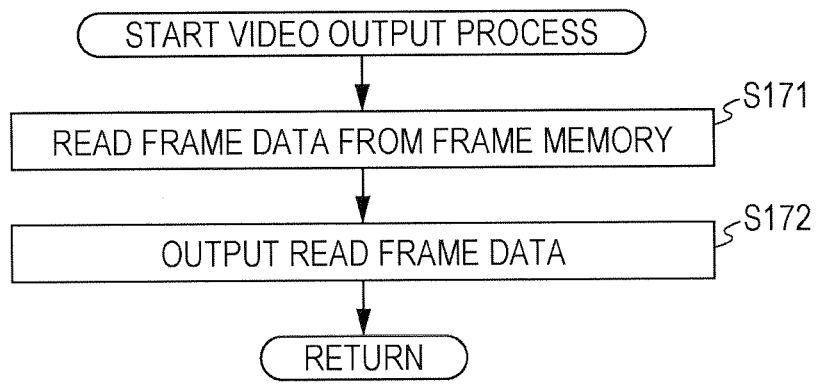
FIG. 39 is a flowchart illustrating a video output process performed in step S109 of FIG. 33.

Next, the video output process performed in step S109 of FIG. 33 will be described with reference to a flowchart of FIG. 39.

In step S171, the video transmitting circuit 53-2 requests the frame synchronizer 51-2 to read the frame data of the video stream #2 from the frame memory 52-2.

In step S172, the video transmitting circuit 53-2 outputs the frame data of the video stream #2 read from the frame memory 52-2 to the outside.

Processing similar to that of steps S171 and S172 is also performed by the video transmitting circuit 53-1, and the frame data of the video stream #1 read from the frame memory 52-1 is output to the outside.

After the frame data of all the streams of video have been output, the process returns to step S109 of FIG. 33, and the subsequent processing is performed.

The processing of the steps described above may not necessarily be performed in the order illustrated in the figures, and may be performed in parallel to the processing of other steps or before or after the processing of other steps, as appropriate.

With the series of processes described above, a plurality of streams of audio data can be input to the processor 43 including one input video port. Further, a plurality of streams of audio data can be output from the processor 43 including one output video port. In other words, the input of audio data to the processor 43 and the output of audio data from the processor 43 can be efficiently performed using one video port.

Furthermore, data can be input to the processor 43 with a reduced input delay. In addition, data can be output from the processor 43 with a reduced output delay.

First Exemplary Modification

Figure 40:
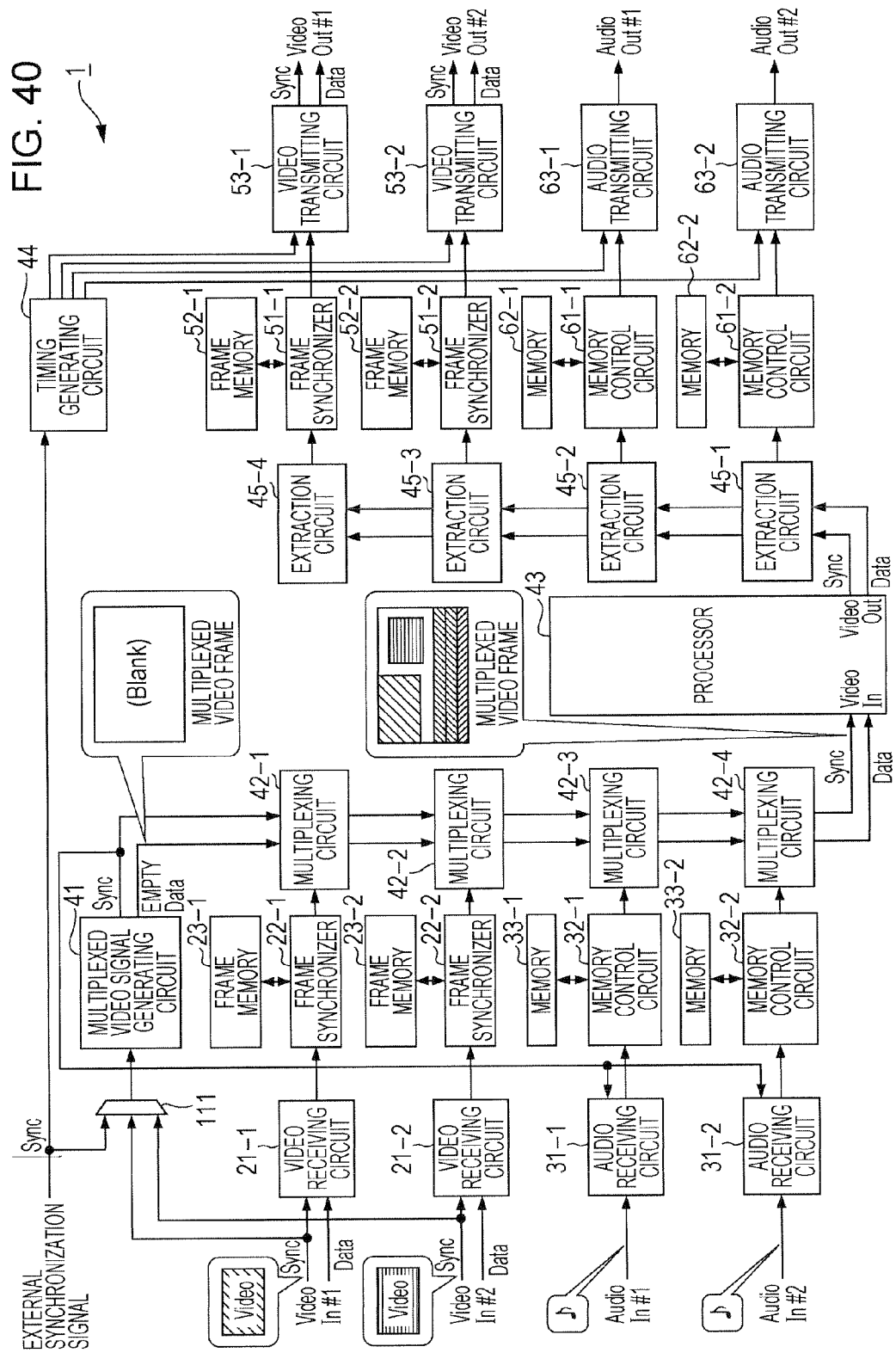
FIG. 40 is a block diagram illustrating another example configuration of the information processing apparatus.

FIG. 40 is a block diagram illustrating another example configuration of the information processing apparatus 1.

In the configuration illustrated in FIG. 40, elements that are the same as or similar to those illustrated in FIG. 1 are assigned the same numerals. Redundant description will be omitted as appropriate.

The configuration illustrated in FIG. 40 is different from the configuration of the information processing apparatus 1 illustrated in FIG. 1 in that a switching circuit 111 is provided before the multiplexed video signal generating circuit 41.

The synchronization signal of the video stream #1, the synchronization signal of the video stream #2, and an external synchronization signal that is a synchronization signal input from the outside separately from the above two synchronization signals are input to the switching circuit 111. The external synchronization signal is also supplied to the timing generating circuit 44.

The switching circuit 111 selects a desired synchronization signal among the synchronization signal of the video stream #1, the synchronization signal of the video stream #2, and the external synchronization signal, and outputs the selected synchronization signal to the multiplexed video signal generating circuit 41.

The multiplexed video signal generating circuit 41 generates a multiplexed video frame at a cycle defined by the synchronization signal supplied from the switching circuit 111, and outputs the data of the generated multiplexed video frame to the multiplexing circuit 42-1, together with the synchronization signal supplied from the switching circuit 111.

The timing generating circuit 44 generates a synchronization signal based on which the output timing of frame data of video and audio data of the individual streams is determined, in accordance with the external synchronization signal or the format of video and audio of the individual streams, and outputs the synchronization signal.

In this manner, a synchronization signal input from the outside can also be switched and used as a synchronization signal that defines the period at which a multiplexed video frame is generated.

Second Exemplary Modification

Figure 41:
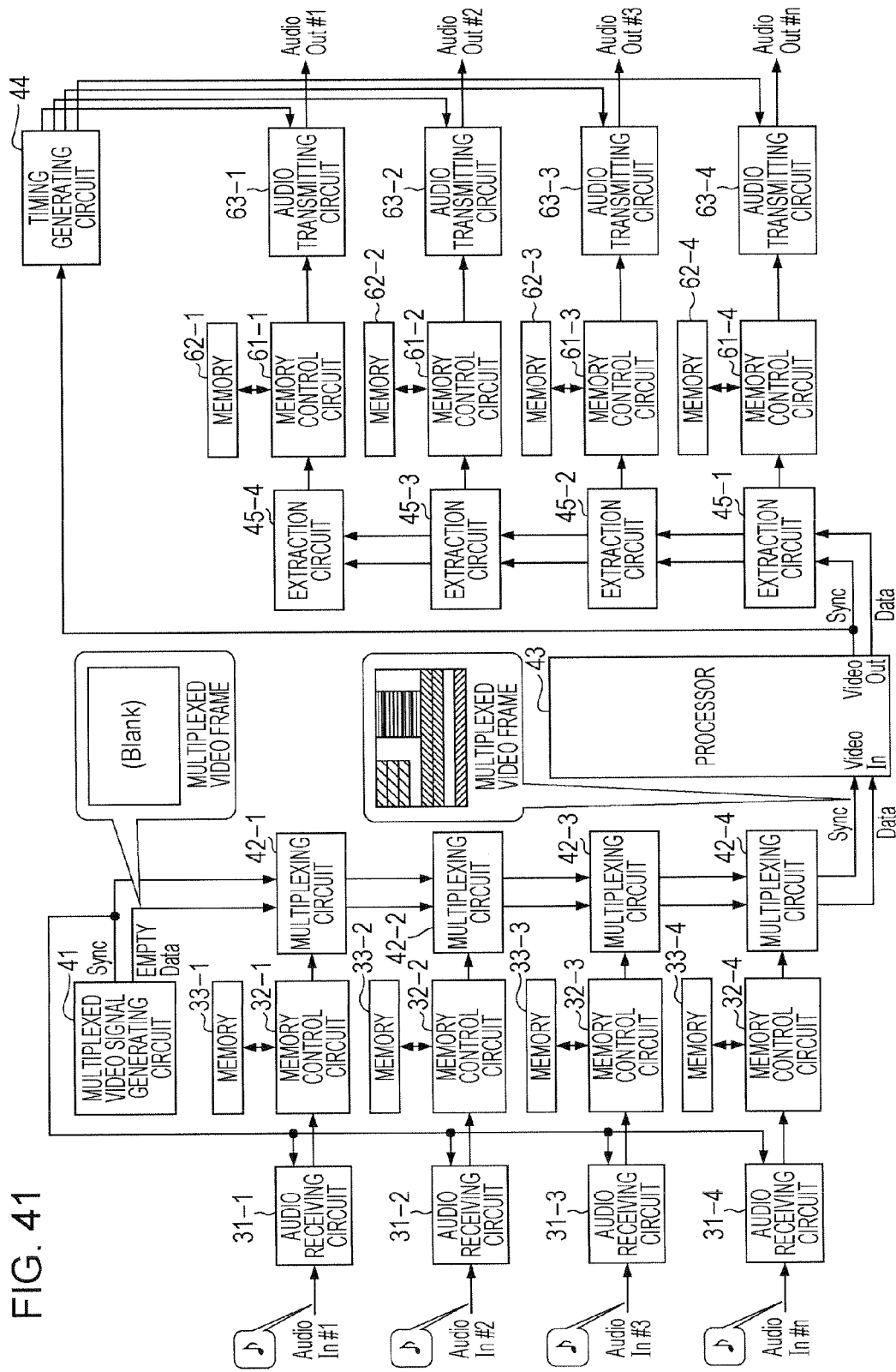
FIG. 41 is a block diagram illustrating another example configuration of the information processing apparatus.

FIG. 41 is a block diagram illustrating another example configuration of the information processing apparatus 1.

In FIG. 41, four streams of audio data are input to the information processing apparatus 1. That is, the information processing apparatus 1 illustrated in FIG. 41 may be an audio data-specific device. The number of audio data items to be input may also be set to a value other than 4. Redundant description will be omitted as appropriate.

In FIG. 41, audio receiving circuits 31-1 and 31-2 are similar to the audio receiving circuits 31-1 and 31-2 illustrated in FIG. 1, respectively. In the audio receiving circuit 31-1, the audio data of the audio stream #1 is cut out, and is stored in the memory 33-1 together with number-of-samples information. In the audio receiving circuit 31-2, the audio data of the audio stream #2 is cut out, and is stored in the memory 33-2 together with number-of-samples information.

An audio receiving circuit 31-3 performs various processing on the input audio signal, and generates audio data of the audio stream #3. The audio receiving circuit 31-3 divides the audio data of the audio stream #3 into audio data items each having samples input during a period of time corresponding to one frame period of a multiplexed video frame, and outputs each of the resulting audio data items to a memory control circuit 32-3 together with number-of-samples information.

The memory control circuit 32-3 causes the audio data and the number-of-samples information supplied from the audio receiving circuit 31-3 to be stored in a memory 33-3. In accordance with a request from a multiplexing circuit 42-3, the memory control circuit 32-3 reads the audio data and the number-of-samples information from the memory 33-3, and outputs the audio data and the number-of-samples information.

An audio receiving circuit 31-4 also performs various processing on the input audio signal, and generates audio data of the audio stream #4. The audio receiving circuit 31-4 divides the audio data of the audio stream #4 into audio data items each having samples input during a period of time corresponding to one frame period of the multiplexed video frame, and outputs each of the resulting audio data items to a memory control circuit 32-3 together with number-of-samples information.

The memory control circuit 32-3 causes the audio data and the number-of-samples information supplied from the audio receiving circuit 31-3 to be stored in a memory 33-43 In accordance with a request from a multiplexing circuit 42-3, the memory control circuit 32-3 reads the audio data and the number-of-samples information from the memory 33-3, and outputs the audio data and the number-of-samples information.

The multiplexing circuit 42-1 inserts the audio data of the audio stream #1 and the number-of-samples information supplied from the memory control circuit 32-1 into the data of the multiplexed video frame supplied from a multiplexed video signal generating circuit 41. The multiplexing circuit 42-1 outputs the data of the multiplexed video frame in which the audio data of the audio stream #1 and the number-of-samples information have been inserted to the multiplexing circuit 42-2.

The multiplexing circuit 42-2 inserts the audio data of the audio stream #2 and the number-of-samples information supplied from the memory control circuit 32-2 into the data of the multiplexed video frame supplied from the multiplexing circuit 42-1. The multiplexing circuit 42-2 outputs the data of the multiplexed video frame in which the audio data of the audio stream #2 and the number-of-samples information have been inserted to the multiplexing circuit 42-3.

The multiplexing circuit 42-3 inserts the audio data of the audio stream #3 and the number-of-samples information supplied from the memory control circuit 32-3 into the data of the multiplexed video frame supplied from the multiplexing circuit 42-2. The multiplexing circuit 42-3 outputs the data of the multiplexed video frame in which the audio data of the audio stream #3 and the number-of-samples information have been inserted to the multiplexing circuit 42-4.

The multiplexing circuit 42-4 inserts the audio data of the audio stream #4 and the number-of-samples information supplied from the memory control circuit 32-4 into the data of the multiplexed video frame supplied from the multiplexing circuit 42-3. The multiplexing circuit 42-4 outputs the data of the multiplexed video frame in which the audio data of the audio stream #4 and the number-of-samples information have been inserted to a processor 43.

An extraction circuit 45-1 extracts the audio data of the audio stream #4 from the data of the multiplexed video frame supplied from the processor 43, and outputs the extracted audio data to a memory control circuit 61-4. The extraction circuit 45-1 further outputs the data of the multiplexed video frame supplied from the processor 43 to an extraction circuit 45-2.

The extraction circuit 45-2 extracts the audio data of the audio stream #3 from the data of the multiplexed video frame supplied from the extraction circuit 45-1, and outputs the extracted audio data to a memory control circuit 61-3. The extraction circuit 45-2 further outputs the data of the multiplexed video frame supplied from the extraction circuit 45-1 to an extraction circuit 45-3.

The extraction circuit 45-3 extracts the audio data of the audio stream #2 from the data of the multiplexed video frame supplied from the extraction circuit 45-2, and outputs the extracted audio data to a memory control circuit 61-2. The extraction circuit 45-3 further outputs the data of the multiplexed video frame supplied from the extraction circuit 45-2 to an extraction circuit 45-4.

The extraction circuit 45-4 extracts the audio data of the audio stream #1 from the data of the multiplexed video frame supplied from the extraction circuit 45-3, and outputs the extracted audio data to a memory control circuit 61-1.

The memory control circuit 61-1 causes the audio data of the audio stream #1 supplied from the extraction circuit 45-4 to be temporarily stored in a memory 62-1.

An audio transmitting circuit 63-1 outputs the audio data of the audio stream #1 supplied from the memory control circuit 61-1, in units of the data of one sample, to the outside in accordance with the synchronization signal supplied from the timing generating circuit 44.

The memory control circuit 61-2 causes the audio data of the audio stream #2 supplied from the extraction circuit 45-3 to be temporarily stored in a memory 62-2.

An audio transmitting circuit 63-2 outputs the audio data of the audio stream #2 supplied from the memory control circuit 61-2, in units of the data of one sample, to the outside in accordance with the synchronization signal supplied from the timing generating circuit 44.

The memory control circuit 61-3 causes the audio data of the audio stream #3 supplied from the extraction circuit 45-2 to be temporarily stored in a memory 62-3.

An audio transmitting circuit 63-3 outputs the audio data of the audio stream #3 supplied from the memory control circuit 61-3, in units of the data of one sample, to the outside in accordance with the synchronization signal supplied from the timing generating circuit 44.

The memory control circuit 61-4 causes the audio data of the audio stream #4 supplied from the extraction circuit 45-1 to be temporarily stored in a memory 62-4.

An audio transmitting circuit 63-4 outputs the audio data of the audio stream #4 supplied from the memory control circuit 61-4, in units of the data of one sample, to the outside in accordance with the synchronization signal supplied from the timing generating circuit 44.

In this manner, a multiplexed video frame in which only audio data has been multiplexed can be input to the processor 43 or can be output from the processor 43.

The insertion of audio data into a multiplexed video frame can also be performed by, instead of inserting one stream of audio data into the entirety of one line of the multiplexed video frame, inserting a plurality of streams of audio data into one line.

Figure 42:
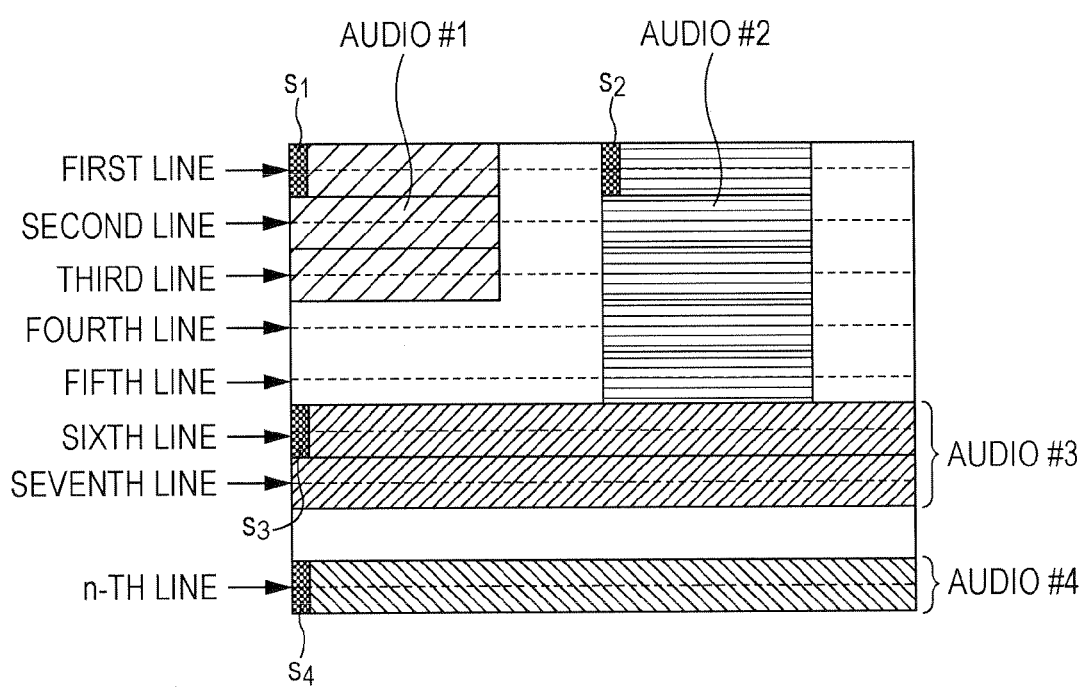
FIG. 42 is an enlarged view of the multiplexed video frame illustrated in FIG. 41.

FIG. 42 is an enlarged view of the multiplexed video frame that is to be input to the processor 43 illustrated in FIG. 41.

In the example of FIG. 42, the audio data of the audio streams #1 and #2 is inserted into each of the lines ranging from the first line to the third line of the multiplexed video frame. Number-of-samples information $s_1$ representing the number of audio samples of the audio stream #1 is inserted at the beginning of the data of the audio stream #1 in the first line, and number-of-samples information $s_2$ representing the number of audio samples of the audio stream #2 is inserted at the beginning of the data of the audio stream #2.

The audio data of the audio stream #2 is inserted in a portion of each of the fourth line and the fifth line.

The audio data of the audio stream #3 is inserted in the entirety of each of the sixth line and the seventh line. The audio data of the audio stream #4 is inserted in the entirety of the n-th line that is the last line.

Three Exemplary Modification

Figure 43:
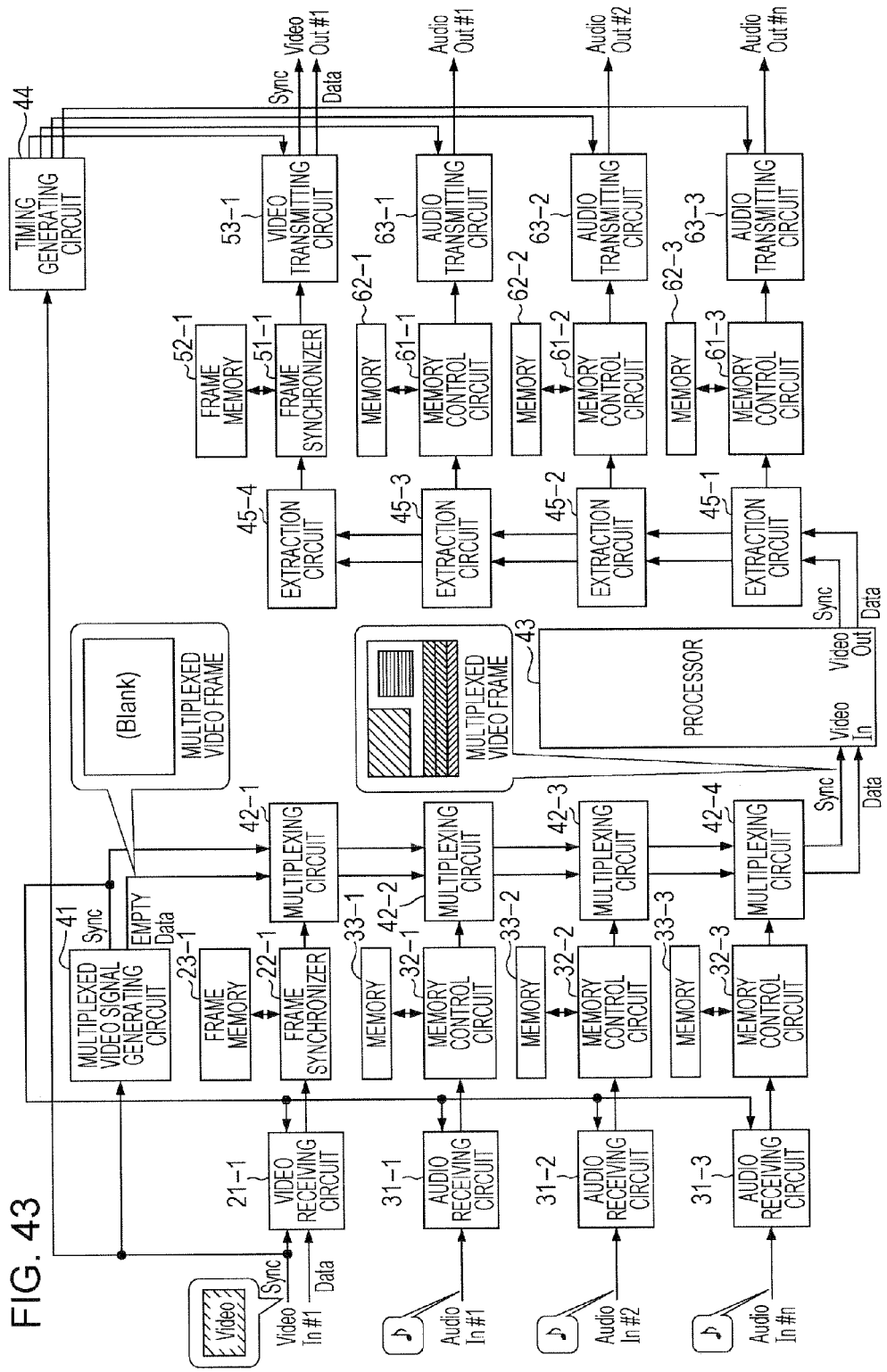
FIG. 43 is a block diagram illustrating another example configuration of the information processing apparatus.

FIG. 43 is a block diagram illustrating another example configuration of the information processing apparatus 1.

In the configuration illustrated in FIG. 43, elements that are the same as or similar to those illustrated in FIG. 1 or 41 are assigned the same numerals. Redundant description will be omitted as appropriate.

In FIG. 43, one stream of video signal and three streams of audio signals are input to the information processing apparatus 1. The video signal of the video stream #1 is input to the video receiving circuit 21-1, and the audio signals of the audio streams #1 to #3 are input to the audio receiving circuits 31-1 to 31-3. The synchronization signal of the video stream #1 is also input to the multiplexed video signal generating circuit 41 and the timing generating circuit 44.

The multiplexed video signal generating circuit 41 generates a multiplexed video frame at a period defined by the synchronization signal of the video stream #1, and outputs the generated multiplexed video frame to the multiplexing circuit 42-1 together with the synchronization signal. In the configuration of FIG. 1, a signal that is self-generated within the information processing apparatus 1 is used as a synchronization signal of a multiplexed video frame. In contrast, in the configuration of FIG. 43, a synchronization signal of an input video signal is used.

The timing generating circuit 44 generates a synchronization signal, based on which the output timing of video of frame data and audio samples of data of the individual streams is determined, in accordance with the synchronization signal of the video stream #1 of the format of video and audio of the individual streams.

Fourth Exemplary Modification

Figure 44:
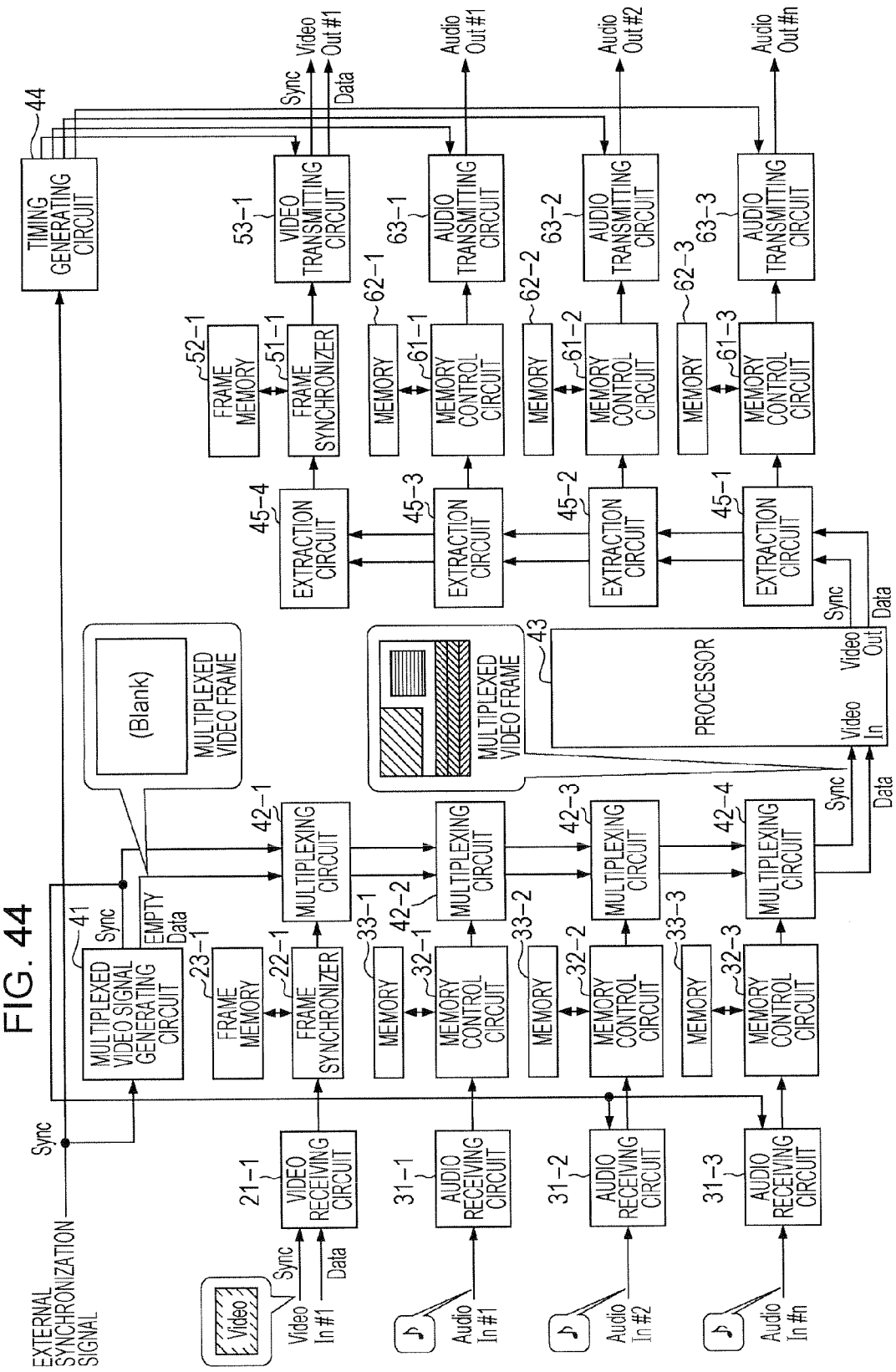
FIG. 44 is a block diagram illustrating another example configuration of the information processing apparatus.

FIG. 44 is a block diagram illustrating another example configuration of the information processing apparatus 1.

In the configuration illustrated in FIG. 44, elements that are the same as or similar to those illustrated in FIG. 43 are assigned the same numerals. Redundant description will be omitted as appropriate.

In FIG. 44, an external synchronization signal that is a synchronization signal input from the outside is input to the multiplexed video signal generating circuit 41 and the timing generating circuit 44.

The multiplexed video signal generating circuit 41 generates a multiplexed video frame at a period defined by the external synchronization signal, and outputs the generated multiplexed video frame to the multiplexing circuit 42-1 together with the synchronization signal. In the configuration illustrated in FIG. 44, an external synchronization signal is used as a synchronization signal of a multiplexed video frame.

The timing generating circuit 44 generates a synchronization signal, based on which the output timing of frame data of video and data of audio samples of the individual streams is determined, in accordance with the external synchronization signal or the format of video and audio of the individual streams, and outputs the generated synchronization signal.

Fifth Exemplary Modification

Figure 45:
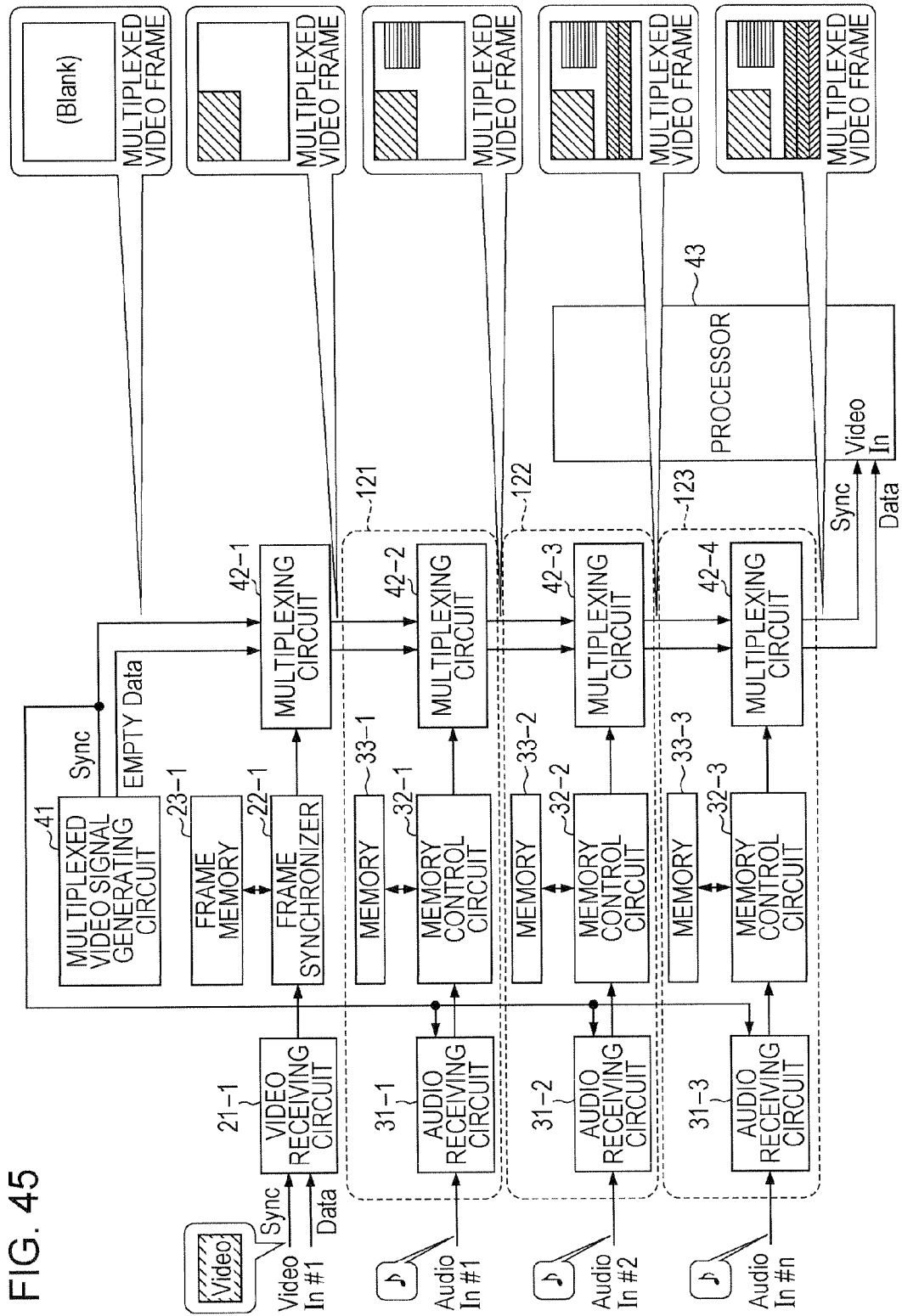
FIG. 45 is a block diagram illustrating another example configuration of the information processing apparatus.
Figure 46:
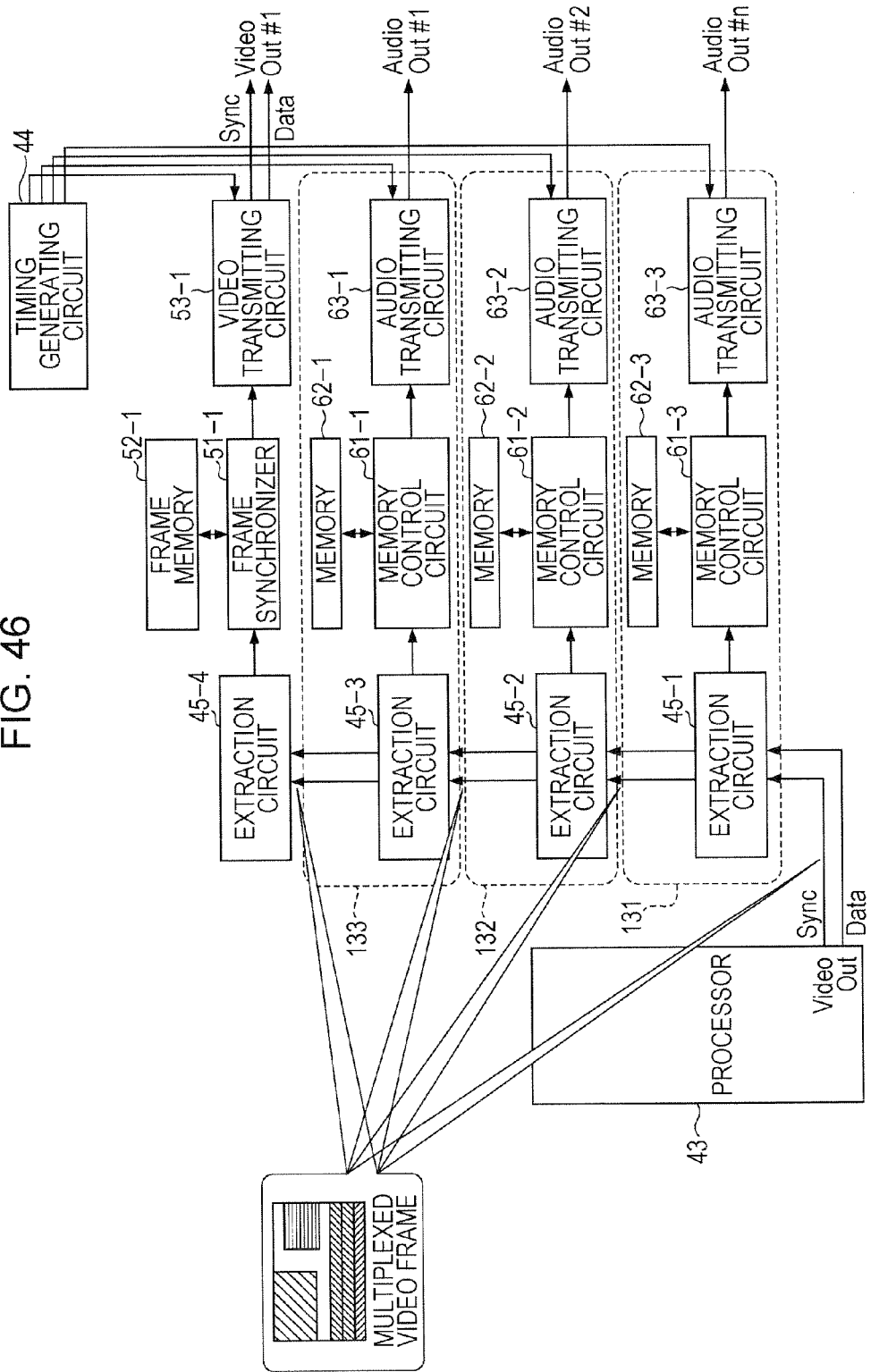
FIG. 46 is a block diagram illustrating another example configuration of the information processing apparatus.

FIGS. 45 and 46 are block diagrams illustrating another example configuration of the information processing apparatus 1.

FIG. 45 illustrates the configuration of the input side on which a multiplexed video frame input to the processor 43 is processed, and FIG. 46 illustrates the configuration of the output side on which a multiplexed video frame output from the processor 43 is processed. In the configurations illustrated in FIGS. 45 and 46, elements that are the same as or similar to those illustrated in FIG. 43 are assigned the same numerals. Redundant description will be omitted as appropriate.

In the example of FIG. 45, modules 121 to 123 are connected in series after the multiplexing circuit 42-1. The module 121 includes the audio receiving circuit 31-1, the memory control circuit 32-1, the memory 33-1, and the multiplexing circuit 42-2. The module 122 includes the audio receiving circuit 31-2, the memory control circuit 32-2, the memory 33-2, and the multiplexing circuit 42-3. The module 123 includes the audio receiving circuit 31-3, the memory control circuit 32-3, the memory 33-3, and the multiplexing circuit 42-4.

In the example of FIG. 46, modules 131 to 133 are connected in series after the processor 43. The module 131 includes the extraction circuit 45-1, the memory control circuit 61-3, the memory 62-3, and the audio transmitting circuit 63-3, and the module 132 includes the extraction circuit 45-2, the memory control circuit 61-2, the memory 62-2, and the audio transmitting circuit 63-2. The module 133 includes the extraction circuit 45-3, the memory control circuit 61-1, the memory 62-1, and the audio transmitting circuit 63-1.

In the information processing apparatus 1, there is no interdependence within the input/output conditions of the individual video data and audio data items or the processing of the individual video data and audio data items, and there is no limitation on the multiplexing method or the multiplexing order. Therefore, a circuit in which the individual video data and audio data items are input and multiplexed can be made completely independent from a circuit in which the individual video data and audio data items are extracted and output.

That is, a desired input circuit can be implemented by connecting in series simple input circuits each configured to multiplex one stream of video data and simple input circuits each configured to multiple one stream of audio data, the number of which is equal to the total number of streams. Further, a desired output circuit can be implemented by connecting in series simple circuits each configured to output one stream of video data and simple circuits each configured to output one stream of audio data, the number of which is equal to the total number of streams.

Common circuits are formed into a module, thus simplifying the configuration of the information processing apparatus 1.

Other Exemplary Modifications

In the foregoing description, the processor 43 has a one-input and one-output video port. However, multiple inputs and multiple outputs may be provided. A multiplexed video frame is input and output using each video port, thus enabling a larger number of streams of data to be input to the processor 43 and enabling data obtained after processing to be output from the processor 43.

In the foregoing description, input video data and a multiplexed video frame are processed frame-by-frame. However, processing may also be performed field-by-field. In the foregoing description, the term "frame" may be replaced by the term "field".

Example Configuration of Computer

The series of processes described above may be executed by hardware or software. If the series of processes is executed by software, a program constituting the software may be installed from a program recording medium into a computer incorporated in dedicated hardware, a general-purpose personal computer, or the like.

Figure 47:
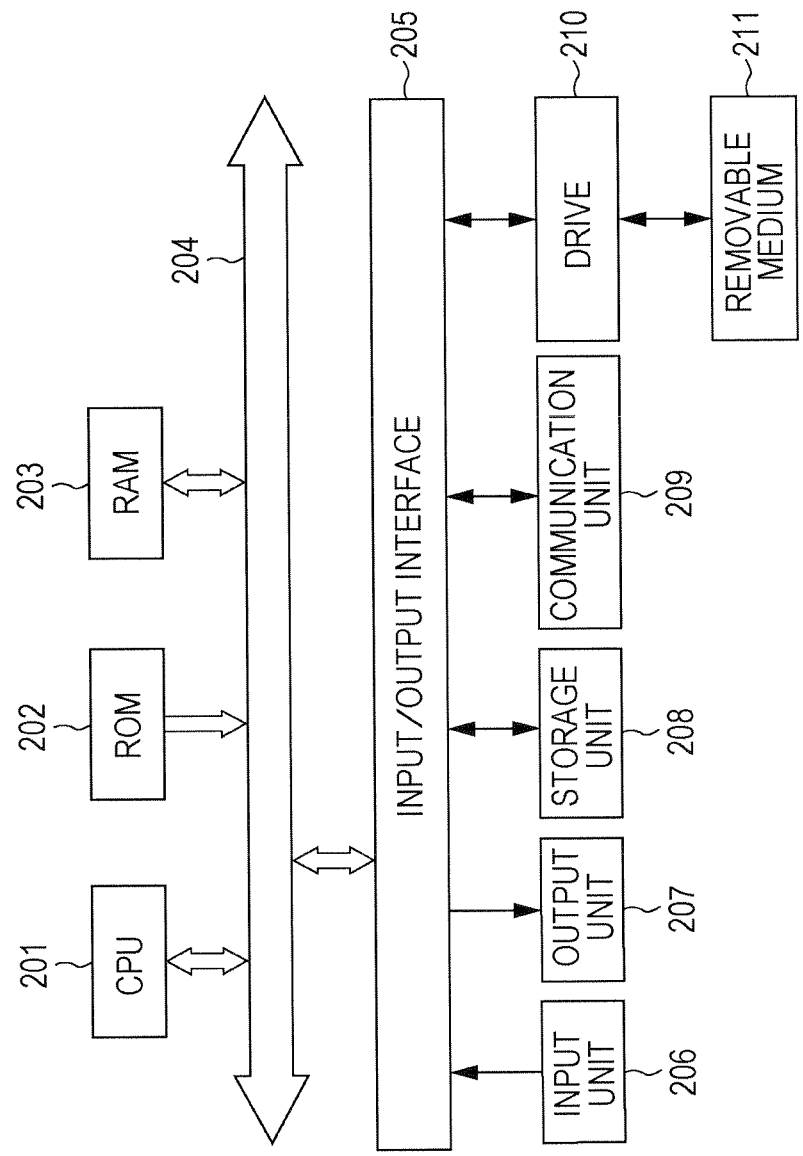
FIG. 47 is a block diagram illustrating an example configuration of a computer.

FIG. 47 is a block diagram illustrating an example configuration of hardware of a computer that executes the series of processes described above in accordance with a program.

A central processing unit (CPU) 201, a read only memory (ROM) 202, and a random access memory (RAM) 203 are connected to one another via a bus 204.

An input/output interface 205 is also connected to the bus 204. The input/output interface 205 is connected to an input unit 206 including a keyboard and a mouse, and an output unit 207 including a display and speakers. The input/output interface 205 is also connected to a storage unit 208 including a hard disk and a non-volatile memory, a communication unit 209 including a network interface, and a drive 210 that drives a removable medium 211.

In the computer having the above configuration, the CPU 201 loads a program stored in, for example, the storage unit 208 into the RAM 203 via the input/output interface 205 and the bus 204, and executes the program, thereby performing the series of processes described above.

The program executed by the CPU 201 may be provided in the form recorded on, for example, the removable medium 211 or via a wired or wireless transmission medium such as a local area network, the Internet, or digital broadcasting, and may be installed into the storage unit 208.

The program executed by the computer may be a program according to which processes are performed in a time-series manner in the order described herein, or may be a program according to which processes are performed in parallel or at a necessary timing such as when called.

Embodiments of the present invention are not limited to the embodiments described above, and a variety of modifications can be made without departing from the scope of the present invention.

The present application contains subject matter related to that disclosed in Japanese Priority Patent Application JP 2010-006135 filed in the Japan Patent Office on Jan. 14, 2010 and Japanese Priority Patent Application JP 2010-006136 filed in the Japan Patent Office on Jan. 14, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
generating means for generating a multiplexed video frame that is a video frame having a predetermined screen size;
dividing means for dividing input audio data into audio data items, each having samples input during a period of time corresponding to a period of one frame of the multiplexed video frame, in order, starting from a first sample of the audio data;
multiplexing means for multiplexing, as data of the multiplexed video frame, a plurality of audio data items and number-of-samples information representing the number of samples included in the audio data items, the audio data items being obtained by division from audio data that is input as each of a plurality of streams of data, the number of samples included in the audio data items provided at a first position of each line which is a beginning of a line allocated to the audio stream in the multiplexed video frame;
processing means for performing processing on the audio data items obtained by division, which are multiplexed in a multiplexed video frame obtained after multiplexing, the multiplexed video frame obtained after multiplexing being input to the processing means from an input video port thereof, and for outputting from an output video port thereof a multiplexed video frame in which the audio data items obtained by division, on which processing has been performed, and the number-of-samples information are multiplexed;
extracting means for extracting each stream of audio data items obtained by division, which is multiplexed in the multiplexed video frame output from the processing means, in accordance with the number-of-samples information; and
transmitting means for outputting the extracted streams of audio data items obtained by division to outside in order, starting from the first sample of the audio data items,
wherein the processing means divides one frame of each of the plurality of formats, which is obtained after processing, into lines, arranges the frame in the multiplexed video frame so that the lines of the frame are arranged from top to bottom in a second video area provided in the multiplexed video frame, in such a manner that the lines of the same frame are not consecutive, and multiplexes the frame so as to be transmitted as data of the multiplexed video frame corresponding to an arrangement position of the frame,
wherein the processing means multiplexes the audio data items obtained through division, which are obtained after processing, and the number-of-samples information so as to be transmitted as data of a second audio area defined below the second video area of the multiplexed video frame, and
wherein the processing means outputs from an output video port thereof a multiplexed video frame in which data obtained after multiplexing is transmitted.

2. The information processing apparatus according to claim 1, wherein the dividing means are provided in a number equal to the number of streams of audio data to be input, and the transmitting means are provided in a number equal to the number of streams of audio data to be input, and
wherein each of the dividing means and each of the transmitting means perform processing on one stream of audio data.

3. The information processing apparatus according to claim 1, wherein the multiplexing means multiplexes, as data at a predetermined position for each stream, a plurality of audio data items obtained by division and number-of-samples information associated therewith.

4. The information processing apparatus according to claim 3, wherein the extracting means extracts each stream of audio data items obtained by division by extracting samples, the number of which is represented by the number-of-samples information multiplexed as the data at the predetermined position.

5. The information processing apparatus according to claim 1, wherein the multiplexed video frame has a screen size that is greater than or equal to a sum of screen sizes of frame images of a plurality of video data items having different formats, the screen sizes being defined by the formats of the plurality of video data items, the frame images being configured to be attached so as not to overlap each other.

6. The information processing apparatus according to claim 5, wherein the multiplexing means further multiplexes the plurality of video data items by attaching the frame images of the plurality of video data items to the multiplexed video frame so as not to overlap each other with the screen sizes defined by the formats being maintained.

7. An information processing method comprising the steps of:
generating a multiplexed video frame that is a video frame having a predetermined screen size;
dividing input audio data into audio data items, each having samples input during a period of time corresponding to a period of one frame of the multiplexed video frame, in order, starting from a first sample of the audio data;
multiplexing, as data of the multiplexed video frame, a plurality of audio data items and number-of-samples information representing the number of samples included in the audio data items, the audio data items being obtained by division from audio data that is input as each of a plurality of streams of data, the number of samples included in the audio data items provided at a first position of each line which is a beginning of a line allocated to the audio stream in the multiplexed video frame;
performing, by processing means, processing on the audio data items obtained by division, which are multiplexed in a multiplexed video frame obtained after multiplexing, the multiplexed video frame obtained after multiplexing being input to the processing means from an input video port thereof, and outputting from an output video port of the processing means a multiplexed video frame in which the audio data items obtained by division, on which processing has been performed, and the number-of-samples information are multiplexed;
extracting each stream of audio data items obtained by division, which is multiplexed in the multiplexed video frame output from the processing means, in accordance with the number-of-samples information; and
outputting the extracted streams of audio data items obtained by division to outside in order, starting from the first sample of the audio data items,
wherein the processing means divides one frame of each of the plurality of formats, which is obtained after processing, into lines, arranges the frame in the multiplexed video frame so that the lines of the frame are arranged from top to bottom in a second video area provided in the multiplexed video frame, in such a manner that the lines of the same frame are not consecutive, and multiplexes the frame so as to be transmitted as data of the multiplexed video frame corresponding to an arrangement position of the frame, wherein the processing means multiplexes the audio data items obtained through division, which are obtained after processing, and the number-of-samples information so as to be transmitted as data of a second audio area defined below the second video area of the multiplexed video frame, and wherein the processing means outputs from an output video port thereof a multiplexed video frame in which data obtained after multiplexing is transmitted.

8. An information processing apparatus comprising:

generating means for generating a multiplexed video frame that is a video frame having a predetermined screen size;

first multiplexing means for dividing one frame of each of a plurality of formats of input video data into lines, for arranging the frame in the multiplexed video frame so that the lines of the frame are arranged from bottom to top in a first video area provided in the multiplexed video frame, in such a manner that the lines of the same frame are not consecutive, and for multiplexing data of one frame of each of the plurality of formats so as to be transmitted as data of the multiplexed video frame in accordance with an arrangement position of the frame;

dividing means for dividing input audio data into audio data items, each having samples input during a period of time corresponding to a period of one frame of the multiplexed video frame, in order, starting from a first sample of the audio data;

second multiplexing means for multiplexing each of the audio data items obtained through division by the dividing means and number-of-samples information representing the number of samples included in the audio data item so as to be transmitted as data in a first audio area provided below the first video area of the multiplexed video frame, the number of samples included in the audio data item provided at a first position of each line which is a beginning of a line allocated to the audio stream in the multiplexed video frame; and processing means for performing processing on data multiplexed in a multiplexed video frame obtained after multiplexing by the first multiplexing means and the second multiplexing means, the multiplexed video frame obtained after multiplexing being input to the processing means from an input video port thereof, wherein the processing means divides one frame of each of the plurality of formats, which is obtained after processing, into lines, arranges the frame in the multiplexed video frame so that the lines of the frame are arranged from top to bottom in a second video area provided in the multiplexed video frame, in such a manner that the lines of the same frame are not consecutive, and multiplexes the frame so as to be transmitted as data of the multiplexed video frame corresponding to an arrangement position of the frame, wherein the processing means multiplexes the audio data items obtained through division, which are obtained after processing, and the number-of-samples information so as to be transmitted as data of a second audio area defined below the second video area of the multiplexed video frame, and wherein the processing means outputs from an output video port thereof a multiplexed video frame in which data obtained after multiplexing is transmitted.

9. The information processing apparatus according to claim 8, further comprising:

first extracting means for extracting data of one frame of each of the plurality of formats from the multiplexed video frame output from the processing means; and first transmitting means for outputting the extracted data of one frame of each of the plurality of formats to outside.

10. The information processing apparatus according to claim 9, further comprising:

second extracting means for extracting the audio data items obtained through division from the multiplexed video frame output from the processing means in accordance with the number-of-samples information; and second transmitting means for outputting the extracted audio data items obtained through division to outside in order, starting from the first sample of the audio data items.

11. The information processing apparatus according to claim 10, wherein the dividing means are provided in a number equal to the number of streams of audio data to be input, and the second transmitting means are provided in a number equal to the number of streams of audio data to be input, and wherein each of the dividing means and each of the second transmitting means perform processing one stream of audio data.

12. The information processing apparatus according to claim 8, wherein the multiplexed video frame has a screen size that is greater than or equal to a sum of screen sizes of frames, the screen sizes being defined by the plurality of formats, one frame of each of the plurality of formats being configured to be attached so as not to overlap another frame.

13. An information processing method comprising the steps of:

generating a multiplexed video frame that is a video frame having a predetermined screen size;

dividing one frame of each of a plurality of formats of input video data into lines;

arranging the frame in the multiplexed video frame so that the lines of the frame are arranged from bottom to top in a video area provided in the multiplexed video frame, in such a manner that the lines of the same frame are not consecutive;

multiplexing data of one frame of each of the plurality of formats so as to be transmitted as data of the multiplexed video frame in accordance with an arrangement position of the frame;

dividing input audio data into audio data items, each having samples input during a period of time corresponding to a period of one frame of the multiplexed video frame, in order, starting from a first sample of the audio data;

multiplexing each of the audio data items obtained by division and number-of-samples information representing the number of samples included in the audio data item so as to be transmitted as data in an audio area provided below the video area of the multiplexed video frame, the number of samples included in the audio data item provided at a first position of each line which is a beginning of a line allocated to the audio stream in the multiplexed video frame; and performing processing on data multiplexed in a multiplexed video frame obtained after multiplexing, the multiplexed video frame obtained after multiplexing being input from an input video port, wherein the performing processing step divides one frame of each of the plurality of formats, which is obtained after processing, into lines, arranges the frame in the multiplexed video frame so that the lines of the frame are arranged from top to bottom in a second video area provided in the multiplexed video frame, in such a manner that the lines of the same frame are not consecutive, and multiplexes the frame so as to be transmitted as data of the multiplexed video frame corresponding to an arrangement position of the frame, wherein the performing processing step multiplexes the audio data items obtained through division, which are obtained after processing, and the number-of-samples information so as to be transmitted as data of a second audio area defined below the second video area of the multiplexed video frame, and wherein the performing processing step outputs from an output video port thereof a multiplexed video frame in which data obtained after multiplexing is transmitted.

14. An infoimation processing apparatus comprising:

a generation unit configured to generate a multiplexed video frame that is a video frame having a predetermined screen size;

a dividing unit configured to divide input audio data into audio data items, each having samples input during a period of time corresponding to a period of one frame of the multiplexed video frame, in order, starting from a first sample of the audio data;

a multiplexing unit configured to multiplex, as data of the multiplexed video frame, a plurality of audio data items and number-of-samples information representing the number of samples included in the audio data items, the audio data items being obtained by division from audio data that is input as each of a plurality of streams of data, the number of samples included in the audio data items provided at a first position of each line which is a beginning of a line allocated to the audio stream in the multiplexed video frame;

a processing unit configured to perform processing on the audio data items obtained by division, which are multiplexed in a multiplexed video frame obtained after multiplexing, the multiplexed video frame obtained after multiplexing being input to the processing unit from an input video port thereof, and to output from an output video port thereof a multiplexed video frame in which the audio data items obtained by division, on which processing has been performed, and the number-of-samples information are multiplexed;

an extraction unit configured to extract each stream of audio data items obtained by division, which is multiplexed in the multiplexed video frame output from the processing unit, in accordance with the number-of-samples information; and a transmission unit configured to output the extracted streams of audio data items obtained by division to outside in order, starting from the first sample of the audio data items, wherein the processing unit divides one frame of each of the plurality of formats, which is obtained after processing, into lines, arranges the frame in the multiplexed video frame so that the lines of the frame are arranged from top to bottom in a second video area provided in the multiplexed video frame, in such a manner that the lines of the same frame are not consecutive, and multiplexes the frame so as to be transmitted as data of the multiplexed video frame corresponding to an arrangement position of the frame, wherein the processing unit multiplexes the audio data items obtained through division, which are obtained after processing, and the number-of-samples information so as to be transmitted as data of a second audio area defined below the second video area of the multiplexed video frame, and wherein the processing unit outputs from an output video port thereof a multiplexed video frame in which data obtained after multiplexing is transmitted.

15. An information processing apparatus comprising:

a generation unit configured to generate a multiplexed video frame that is a video frame having a predetermined screen size;

a first multiplexing unit configured to divide one frame of each of a plurality of formats of input video data into lines, to arrange the frame in the multiplexed video frame so that the lines of the frame are arranged from bottom to top in a first video area provided in the multiplexed video frame, in such a manner that the lines of the same frame are not consecutive, and to multiplex data of one frame of each of the plurality of formats so as to be transmitted as data of the multiplexed video frame in accordance with an arrangement position of the frame;

a dividing unit configured to divide input audio data into audio data items, each having samples input during a period of time corresponding to a period of one frame of the multiplexed video frame, in order, starting from a first sample of the audio data;

a second multiplexing unit configured to multiplex each of the audio data items obtained through division by the dividing unit and number-of-samples information representing the number of samples included in the audio data item so as to be transmitted as data in a first audio area provided below the first video area of the multiplexed video frame, the number of samples included in the audio data items provided at a first position of each line which is a beginning of a line allocated to the audio stream in the multiplexed video frame; and a processing unit configured to perform processing on data multiplexed in a multiplexed video frame obtained after multiplexing by the first multiplexing unit and the second multiplexing unit, the multiplexed video frame obtained after multiplexing being input to the processing unit from an input video port thereof, wherein the processing unit divides one frame of each of the plurality of formats, which is obtained after processing, into lines, arranges the frame in the multiplexed video frame so that the lines of the frame are arranged from top to bottom in a second video area provided in the multiplexed video frame, in such a manner that the lines of the same frame are not consecutive, and multiplexes the frame so as to be transmitted as data of the multiplexed video frame corresponding to an arrangement position of the frame, wherein the processing unit multiplexes the audio data items obtained through division, which are obtained after processing, and the number-of-samples information so as to be transmitted as data of a second audio area defined below the second video area of the multiplexed video frame, and wherein the processing unit outputs from an output video port thereof a multiplexed video frame in which data obtained after multiplexing is transmitted.

* * * * *